(12) United States Patent
Yang et al.

(10) Patent No.: US 10,015,298 B2
(45) Date of Patent: Jul. 3, 2018

(54) PHONE USER INTERFACE

(71) Applicant: Apple Inc., Cupertino, CA (US)

(72) Inventors: Lawrence Y. Yang, San Francisco, CA (US); Alan C. Dye, San Francisco, CA (US); Imran Chaudhri, San Francisco, CA (US); Stephen O. Lemay, San Francisco, CA (US); Christopher Patrick Foss, San Francisco, CA (US); Anton M. Davydov, Gilroy, CA (US); Zachery Kennedy, San Jose, CA (US); Dylan Ross Edwards, San Jose, CA (US); Jonathan P. Ive, San Francisco, CA (US); Giovanni M. Agnoli, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/841,623

(22) Filed: Aug. 31, 2015

(65) Prior Publication Data

US 2016/0066277 A1 Mar. 3, 2016

Related U.S. Application Data

(60) Provisional application No. 62/044,939, filed on Sep. 2, 2014, provisional application No. 62/129,853, filed on Mar. 8, 2015.

(51) Int. Cl.
*H04W 4/00* (2018.01)
*H04M 1/60* (2006.01)
(Continued)

(52) U.S. Cl.
CPC .......... *H04M 1/6066* (2013.01); *G06F 1/163* (2013.01); *G06F 3/0414* (2013.01);
(Continued)

(58) Field of Classification Search
CPC . H04W 4/16; H04W 52/0254; H04W 52/027; H04W 4/02; H04W 4/021; H04W 4/04; H04W 4/023
See application file for complete search history.

(56) References Cited

U.S. PATENT DOCUMENTS

| 5,475,653 A | 12/1995 | Yamada et al. |
| 5,801,700 A | 9/1998 | Ferguson |

(Continued)

FOREIGN PATENT DOCUMENTS

| CN | 201928419 U | 8/2011 |
| CN | 102695302 A | 9/2012 |

(Continued)

OTHER PUBLICATIONS

"WeChat TVC—Hold to Talk", Available online at YouTube video: https://www.youtube.com/watch?v=E_UxteOWVSo, May 11, 2013, 1 page.

(Continued)

*Primary Examiner* — Quan M Hua
(74) *Attorney, Agent, or Firm* — Dentons US LLP

(57) ABSTRACT

An electronic device having a user interface for accessing phone features. The user interface accounts for whether the electronic device is connected to a companion cellular phone. The user interface accounts for a headset is available for use to carry on a call. The user interface permits transition between using one or more of cellular phone, headset, and/or the electronic device to be used for carrying on incoming or outgoing calls.

57 Claims, 54 Drawing Sheets

(51) Int. Cl.
| | | |
|---|---|---|
| *H04M 1/02* | (2006.01) | |
| *H04M 1/725* | (2006.01) | |
| *H04M 3/428* | (2006.01) | |
| *H04W 4/16* | (2009.01) | |
| *H04W 52/02* | (2009.01) | |
| *G06F 3/0488* | (2013.01) | |
| *G06F 1/16* | (2006.01) | |
| *G06F 3/041* | (2006.01) | |
| *H04M 1/2745* | (2006.01) | |
| *G06F 3/0484* | (2013.01) | |
| *H04M 1/663* | (2006.01) | |

(52) U.S. Cl.
CPC ........ *G06F 3/0488* (2013.01); *G06F 3/04842* (2013.01); *G06F 3/04883* (2013.01); *H04M 1/0258* (2013.01); *H04M 1/2745* (2013.01); *H04M 1/7253* (2013.01); *H04M 1/72569* (2013.01); *H04M 1/72583* (2013.01); *H04M 1/72597* (2013.01); *H04M 3/428* (2013.01); *H04M 3/4285* (2013.01); *H04W 4/16* (2013.01); *H04W 52/027* (2013.01); *H04W 52/0254* (2013.01); *G06F 2203/04105* (2013.01); *H04M 1/663* (2013.01); *H04M 2250/02* (2013.01); *H04M 2250/12* (2013.01); *H04M 2250/22* (2013.01); *H04M 2250/60* (2013.01); *Y02D 70/00* (2018.01); *Y02D 70/1244* (2018.01); *Y02D 70/1246* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/23* (2018.01); *Y02D 70/26* (2018.01)

(56) References Cited

U.S. PATENT DOCUMENTS

| | | |
|---|---|---|
| 6,002,402 A | 12/1999 | Schacher |
| 6,191,807 B1 | 2/2001 | Hamada et al. |
| 6,266,098 B1 | 7/2001 | Cove et al. |
| 6,323,846 B1 | 11/2001 | Westerman et al. |
| 6,362,842 B1 | 3/2002 | Tahara et al. |
| 6,570,557 B1 | 5/2003 | Westerman et al. |
| 6,661,438 B1 | 12/2003 | Shiraishi et al. |
| 6,662,023 B1 | 12/2003 | Helle |
| 6,677,932 B1 | 1/2004 | Westerman |
| 6,809,724 B1 | 10/2004 | Shiraishi et al. |
| 7,081,905 B1 | 7/2006 | Raghunath |
| 7,130,664 B1 | 10/2006 | Williams |
| 7,365,736 B2 | 4/2008 | Marvit et al. |
| 7,593,749 B2 | 9/2009 | Vallstrom et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,789,225 B2 | 9/2010 | Whiteis |
| 7,834,861 B2 | 11/2010 | Lee |
| 7,844,914 B2 | 11/2010 | Andre et al. |
| 7,908,219 B2 | 3/2011 | Abanami et al. |
| 7,957,762 B2 | 6/2011 | Herz et al. |
| 8,006,002 B2 | 8/2011 | Kalayjian et al. |
| 8,050,997 B1 | 11/2011 | Nosek et al. |
| 8,121,586 B2 | 2/2012 | Araradian et al. |
| 8,239,784 B2 | 8/2012 | Hotelling et al. |
| 8,255,830 B2 | 8/2012 | Ording et al. |
| 8,279,180 B2 | 10/2012 | Hotelling et al. |
| 8,285,258 B2 | 10/2012 | Schultz et al. |
| 8,381,135 B2 | 2/2013 | Hotelling et al. |
| 8,479,122 B2 | 7/2013 | Hotelling et al. |
| 8,543,081 B2 | 9/2013 | Scott et al. |
| 8,572,493 B2 | 10/2013 | Qureshi |
| 8,613,070 B1 | 12/2013 | Borzycki et al. |
| 8,666,361 B2 | 3/2014 | Chu et al. |
| 8,675,084 B2 | 3/2014 | Bolton et al. |
| 8,811,951 B1 | 8/2014 | Faaborg et al. |
| 8,922,485 B1 | 12/2014 | Lloyd |
| 9,100,944 B2 | 8/2015 | Newham et al. |
| 9,185,062 B1 | 11/2015 | Yang et al. |
| 9,191,988 B2 | 11/2015 | Newham |
| 9,207,835 B1 | 12/2015 | Yang et al. |
| 9,400,489 B2 | 7/2016 | Kim et al. |
| 9,477,208 B2 | 10/2016 | Lee et al. |
| 9,575,591 B2 | 2/2017 | Yang et al. |
| 2002/0015024 A1 | 2/2002 | Westerman et al. |
| 2002/0037715 A1 | 3/2002 | Mauney et al. |
| 2002/0115478 A1 | 8/2002 | Fujisawa et al. |
| 2003/0081506 A1 | 5/2003 | Karhu |
| 2004/0070511 A1 | 4/2004 | Kim |
| 2005/0187873 A1 | 8/2005 | Labrou et al. |
| 2005/0190059 A1 | 9/2005 | Wehrenberg |
| 2005/0191159 A1 | 9/2005 | Benko |
| 2005/0268237 A1 | 12/2005 | Crane et al. |
| 2006/0017692 A1 | 1/2006 | Wehrenberg et al. |
| 2006/0019649 A1* | 1/2006 | Feinleib ............ H04M 1/7253 455/420 |
| 2006/0026245 A1 | 2/2006 | Cunningham et al. |
| 2006/0026536 A1 | 2/2006 | Hotelling et al. |
| 2006/0033724 A1 | 2/2006 | Chaudhri et al. |
| 2006/0195787 A1 | 8/2006 | Topiwala et al. |
| 2006/0197753 A1 | 9/2006 | Hotelling |
| 2006/0294025 A1 | 12/2006 | Mengerink |
| 2007/0036300 A1 | 2/2007 | Brown et al. |
| 2007/0085157 A1 | 4/2007 | Fadell et al. |
| 2007/0135043 A1 | 6/2007 | Hayes et al. |
| 2007/0150834 A1 | 6/2007 | Muller et al. |
| 2007/0150836 A1 | 6/2007 | Deggelmann et al. |
| 2007/0150842 A1 | 6/2007 | Chaudhri et al. |
| 2007/0216659 A1 | 9/2007 | Amineh |
| 2007/0236475 A1 | 10/2007 | Wherry |
| 2008/0014989 A1 | 1/2008 | Sandegard et al. |
| 2008/0057926 A1 | 3/2008 | Forstall et al. |
| 2008/0070593 A1 | 3/2008 | Altman et al. |
| 2008/0079589 A1 | 4/2008 | Blackadar |
| 2008/0165136 A1 | 7/2008 | Christie et al. |
| 2008/0320391 A1 | 12/2008 | Lemay et al. |
| 2009/0005011 A1 | 1/2009 | Christie et al. |
| 2009/0036165 A1 | 2/2009 | Brede |
| 2009/0037536 A1 | 2/2009 | Braam |
| 2009/0049502 A1 | 2/2009 | Levien et al. |
| 2009/0051648 A1 | 2/2009 | Shamaie et al. |
| 2009/0051649 A1 | 2/2009 | Rondel |
| 2009/0055494 A1 | 2/2009 | Fukumoto |
| 2009/0164219 A1 | 6/2009 | Yeung et al. |
| 2009/0181726 A1 | 7/2009 | Vargas et al. |
| 2009/0187842 A1 | 7/2009 | Collins et al. |
| 2009/0199130 A1 | 8/2009 | Tsern et al. |
| 2009/0205041 A1 | 8/2009 | Michalske |
| 2009/0244015 A1 | 10/2009 | Sengupta et al. |
| 2009/0298444 A1 | 12/2009 | Shigeta |
| 2010/0058231 A1 | 3/2010 | Duarte et al. |
| 2010/0082481 A1 | 4/2010 | Lin et al. |
| 2010/0124906 A1 | 5/2010 | Hautala |
| 2010/0223145 A1 | 9/2010 | Dragt |
| 2010/0267362 A1 | 10/2010 | Smith et al. |
| 2010/0281409 A1 | 11/2010 | Rainisto et al. |
| 2010/0325194 A1 | 12/2010 | Williamson et al. |
| 2010/0332518 A1 | 12/2010 | Song et al. |
| 2011/0003587 A1* | 1/2011 | Belz ............... H04M 19/04 455/419 |
| 2011/0022472 A1 | 1/2011 | Zon et al. |
| 2011/0059769 A1 | 3/2011 | Brunolli |
| 2011/0080356 A1 | 4/2011 | Kang et al. |
| 2011/0088086 A1 | 4/2011 | Swink et al. |
| 2011/0151418 A1 | 6/2011 | Delespaul et al. |
| 2011/0157046 A1 | 6/2011 | Lee et al. |
| 2011/0164058 A1 | 7/2011 | Lemay |
| 2011/0167383 A1 | 7/2011 | Schuller et al. |
| 2011/0183650 A1* | 7/2011 | McKee ............ H04M 1/72519 455/413 |
| 2011/0251892 A1 | 10/2011 | Laracey et al. |

(56) References Cited

U.S. PATENT DOCUMENTS

| | | |
|---|---|---|
| 2011/0254684 A1 | 10/2011 | Antoci |
| 2011/0265041 A1 | 10/2011 | Ganetakos et al. |
| 2011/0279323 A1 | 11/2011 | Hung et al. |
| 2011/0306393 A1 | 12/2011 | Goldman et al. |
| 2011/0316769 A1 | 12/2011 | Boettcher et al. |
| 2012/0008526 A1 | 1/2012 | Borghei et al. |
| 2012/0022872 A1 | 1/2012 | Gruber et al. |
| 2012/0089507 A1 | 4/2012 | Zhang et al. |
| 2012/0102437 A1 | 4/2012 | Worley et al. |
| 2012/0105358 A1 | 5/2012 | Momeyer et al. |
| 2012/0108215 A1 | 5/2012 | Kameli |
| 2012/0117507 A1 | 5/2012 | Tseng et al. |
| 2012/0131458 A1 | 5/2012 | Hayes |
| 2012/0150970 A1 | 6/2012 | Peterson et al. |
| 2012/0158511 A1 | 6/2012 | Lucero et al. |
| 2012/0159380 A1 | 6/2012 | Kocienda et al. |
| 2012/0172088 A1 | 7/2012 | Kirch et al. |
| 2012/0197743 A1 | 8/2012 | Grigg et al. |
| 2012/0218177 A1* | 8/2012 | Pang ............... G06F 3/0346 345/156 |
| 2012/0239949 A1 | 9/2012 | Kalyanasundaram et al. |
| 2012/0258684 A1 | 10/2012 | Franz et al. |
| 2012/0290449 A1 | 11/2012 | Mullen et al. |
| 2012/0302256 A1 | 11/2012 | Pai et al. |
| 2012/0304084 A1 | 11/2012 | Kim et al. |
| 2012/0306770 A1 | 12/2012 | Moore et al. |
| 2012/0310760 A1 | 12/2012 | Phillips et al. |
| 2012/0322370 A1 | 12/2012 | Lee |
| 2012/0322371 A1 | 12/2012 | Lee |
| 2013/0007665 A1 | 1/2013 | Chaudhri et al. |
| 2013/0063364 A1 | 3/2013 | Moore |
| 2013/0065566 A1 | 3/2013 | Gisby et al. |
| 2013/0085931 A1 | 4/2013 | Runyan |
| 2013/0091298 A1 | 4/2013 | Ozzie et al. |
| 2013/0097566 A1 | 4/2013 | Berglund |
| 2013/0103519 A1 | 4/2013 | Kountotsis et al. |
| 2013/0110719 A1 | 5/2013 | Carter et al. |
| 2013/0120106 A1 | 5/2013 | Cauwels et al. |
| 2013/0143512 A1 | 6/2013 | Hernandez et al. |
| 2013/0159941 A1 | 6/2013 | Langlois et al. |
| 2013/0212470 A1 | 8/2013 | Karunamuni et al. |
| 2013/0222236 A1 | 8/2013 | Gardenfors et al. |
| 2013/0225118 A1 | 8/2013 | Jang et al. |
| 2013/0234924 A1* | 9/2013 | Janefalkar ............ G06F 1/1694 345/156 |
| 2013/0244615 A1 | 9/2013 | Miller et al. |
| 2013/0244633 A1 | 9/2013 | Jacobs et al. |
| 2013/0254714 A1 | 9/2013 | Shin et al. |
| 2013/0262298 A1* | 10/2013 | Morley ............... H04M 1/05 705/39 |
| 2013/0295872 A1 | 11/2013 | Guday et al. |
| 2013/0304651 A1 | 11/2013 | Smith et al. |
| 2013/0310089 A1 | 11/2013 | Gianoukos et al. |
| 2013/0322634 A1 | 12/2013 | Bennett et al. |
| 2013/0332358 A1 | 12/2013 | Zhao |
| 2013/0332364 A1 | 12/2013 | Templeton et al. |
| 2013/0346882 A1 | 12/2013 | Shiplacoff et al. |
| 2013/0347018 A1 | 12/2013 | Limp et al. |
| 2014/0028735 A1 | 1/2014 | Williams et al. |
| 2014/0055552 A1 | 2/2014 | Song et al. |
| 2014/0058935 A1 | 2/2014 | Mijares |
| 2014/0068751 A1 | 3/2014 | Last et al. |
| 2014/0073256 A1 | 3/2014 | Newham et al. |
| 2014/0074716 A1 | 3/2014 | Ni |
| 2014/0085487 A1 | 3/2014 | Park et al. |
| 2014/0101056 A1 | 4/2014 | Wendling |
| 2014/0122331 A1 | 5/2014 | Vaish et al. |
| 2014/0129441 A1 | 5/2014 | Blanco et al. |
| 2014/0136990 A1 | 5/2014 | Gonnen et al. |
| 2014/0143145 A1 | 5/2014 | Kortina et al. |
| 2014/0155031 A1 | 6/2014 | Lee et al. |
| 2014/0181183 A1 | 6/2014 | Houjou et al. |
| 2014/0240122 A1 | 8/2014 | Roberts et al. |
| 2014/0279442 A1 | 9/2014 | Luoma et al. |
| 2014/0279556 A1 | 9/2014 | Priebatsch et al. |
| 2014/0365944 A1 | 12/2014 | Moore et al. |
| 2015/0007049 A1 | 1/2015 | Langlois |
| 2015/0040029 A1 | 2/2015 | Koum et al. |
| 2015/0102992 A1 | 4/2015 | Klement et al. |
| 2015/0172393 A1 | 6/2015 | Oplinger et al. |
| 2015/0185849 A1 | 7/2015 | Levesque et al. |
| 2015/0248389 A1 | 9/2015 | Kahn et al. |
| 2015/0286387 A1 | 10/2015 | Gu et al. |
| 2015/0286391 A1 | 10/2015 | Jacobs et al. |
| 2015/0350141 A1 | 12/2015 | Yang et al. |
| 2016/0036996 A1* | 2/2016 | Midholt ............... G06F 1/3206 455/567 |
| 2016/0041597 A1 | 2/2016 | Graham et al. |
| 2016/0054841 A1 | 2/2016 | Yang et al. |
| 2016/0062540 A1 | 3/2016 | Yang et al. |
| 2016/0065707 A1 | 3/2016 | Yang et al. |
| 2016/0065708 A1 | 3/2016 | Yang et al. |
| 2016/0073223 A1 | 3/2016 | Woolsey et al. |
| 2016/0299526 A1 | 10/2016 | Inagaki al. |
| 2016/0342141 A1 | 11/2016 | Koumaiha |
| 2017/0048686 A1 | 2/2017 | Chang et al. |
| 2017/0083189 A1 | 3/2017 | Yang et al. |
| 2017/0083202 A1 | 3/2017 | Yang et al. |
| 2017/0147197 A1 | 5/2017 | Yang et al. |
| 2017/0153795 A1 | 6/2017 | Yang et al. |
| 2017/0220212 A1 | 8/2017 | Yang et al. |
| 2017/0354845 A1 | 12/2017 | Williams et al. |

FOREIGN PATENT DOCUMENTS

| | | |
|---|---|---|
| CN | 103500079 A | 1/2014 |
| CN | 104205785 A | 12/2014 |
| EP | 1052566 A1 | 11/2000 |
| EP | 2551784 A1 | 1/2013 |
| EP | 2574026 A1 | 3/2013 |
| EP | 2610701 A1 | 7/2013 |
| EP | 2610701 A9 | 4/2014 |
| EP | 2725537 A1 | 4/2014 |
| EP | 2733598 A2 | 5/2014 |
| EP | 2849042 A1 | 3/2015 |
| JP | 55-80084 A | 6/1980 |
| JP | 2002-366485 A | 12/2002 |
| JP | 2006-113637 A | 4/2006 |
| JP | 2006-129429 A | 5/2006 |
| JP | 2013-048389 A | 3/2013 |
| KR | 10-2004-0089329 A | 10/2004 |
| WO | 2005/109829 A1 | 11/2005 |
| WO | 2006/037545 A2 | 4/2006 |
| WO | 2009/071112 A1 | 6/2009 |
| WO | 2010/039337 A2 | 4/2010 |
| WO | 2012/128824 A1 | 9/2012 |
| WO | 2012/170446 A2 | 12/2012 |
| WO | 2013/023224 A2 | 2/2013 |
| WO | 2013/093558 A1 | 6/2013 |
| WO | 2013/097895 A1 | 7/2013 |
| WO | 2013/135270 A1 | 9/2013 |
| WO | 2013/169842 A2 | 11/2013 |
| WO | 2013/169875 A2 | 11/2013 |
| WO | 2014/078965 A1 | 5/2014 |
| WO | 2014/105276 A1 | 7/2014 |
| WO | 2015/038684 A1 | 3/2015 |
| WO | 2015/120358 A1 | 8/2015 |

OTHER PUBLICATIONS

Non-Final Office Action received for U.S. Appl. No. 14/503,376, dated Dec. 22, 2014, 21 pages.
Notice of Allowance received for U.S. Appl. No. 14/503,376, dated Jul. 29, 2015, 13 pages.
Notice of Allowance received for U.S. Appl. No. 14/503,376, dated Sep. 2, 2015, 2 pages.
Notice of Allowance received for U.S. Appl. No. 14/503,376, dated Sep. 24, 2015, 5 pages.
Non Final Office Action received for U.S. Appl. No. 14/503,386, dated Jan. 7, 2015, 19 pages.
Notice of Allowance received for U.S. Appl. No. 14/503,386, dated Jul. 30, 2015, 12 pages.

(56) References Cited

OTHER PUBLICATIONS

Notice of Allowance received for U.S. Appl. No. 14/503,386, dated Sep. 24, 2015, 5 pages.
Office Action received for Australian Patent Application No. 2015100711, dated Jul. 27, 2015, 7 pages.
Office Action Received for Australian Patent Application No. 2015100711, dated Nov. 19, 2015, 6 pages.
Notice of Allowance received for Chinese Patent Application No. 201520365358.4, dated Nov. 20, 2015, 4 pages (2 pages of English Translation and 2 pages of Official Copy).
Office Action received for Chinese Patent Application No. 201520365358.4, dated Aug. 11, 2015, 4 pages (2 pages of English Translation and 2 pages of Official Copy).
Office Action received for Chinese Patent Application No. 201520365843.1, dated Aug. 25, 2015, 4 pages (2 pages of English Translation and 2 pages of Official Copy).
Office Action Received for Chinese Patent Application No. 201520365843.1, dated Nov. 16, 2015, 3 pages (3 pages of English Translation).
"WeChat for Android", CNET Download.com, Available at http://download.cnet.com/WeChat/3000-2150_4-75739423.html, Jan. 7, 2013, 6 pages.
"Why WeChat might kill Whatsapp's future", Digitalstreetsa.com, Available at http://digitalstreetsa.com/why-wechatmight-kill-whatsapps-future/, Jul. 3, 2013, 10 pages.
Grothaus, Michael, "WhatsApp Introduces Major New Audio Features", Available at http://www.engadget.com/2013/08/07/whatsapp-introduces-major-new-audio-features/, Aug. 7, 2013, 4 pages.
Norman, Don, "Affordances and Design", Jng.org, Available at http://jnd.org/dn.mss/affordances_and.html., 5 pages.
Office Action received for Danish Patent Application No. PA201570550, dated Dec. 7, 2015, 6 pages.
International Search Report and Written Opinion received for PCT Patent Application No. PCT/US2015/032305, dated Sep. 10, 2015, 10 pages.
International Search Report and Written Opinion received for PCT Patent Application No. PCT/US2015/032309, dated Sep. 2, 2015, 10 pages.
Invitation to Pay Additional Fees and Partial Search Report received for PCT Patent Application No. PCT/US2015/043487, dated Nov. 9, 2015, 4 pages.
Invitation to Pay Additional Fees received for PCT Patent Application No. PCT/US2015/046787, dated Dec. 15, 2015, 8 pages.
S. Rohan, "WeChat Review—Communication Application with Screenshots", Absolute Blogger, Available at <http://www.absoluteblogger.com/2012/10/wechat-review-communication-application.html>, Oct. 19, 2010, 5 pages.
WeChat Wiki, "WeChat Wik", Available on http://web.archive.org/web/20130514131044/http://wechat.wikia.com/wiki/WeChat_Wiki (Last Accessed on Jan. 4, 2014), May 14, 2013, 12 pages.
Non-Final Office Action received for U.S. Appl. No. 14/838,235, dated Jan. 5, 2016, 3 pages.
"Samsung Gear 2 User Manual", Available online at < http://www.manualsllb.com/download/754923/Samsung-Gear-2.html>, 2014, pp. 1-97.
Office Action received for Danish Patent Application No. PA201570550, dated Jan. 19, 2016, 2 pages.
Office Action received for Australian Patent Application No. 2015101188, dated Apr. 14, 2016, 3 pages.
Notice of Allowance received for Chinese Patent Application No. 201520365843.1, dated Feb. 5, 2016, 5 pages (3 pages of English Translation and 2 pages of official copy).
Office Action received for Chinese Patent Application No. 201520669842.6, dated Dec. 4, 2015, 7 pages (4 pages of English Translation and 3 Pages of Official Copy).
International Search Report and Written Opinion received for PCT Patent Application No. PCT/US2015/043487, dated Jan. 29, 2016, 19 pages.
International Search Report and Written Opinion received for PCT Patent Application No. PCT/US2015/044083, dated Feb. 4, 2016, 33 pages.
International Search Report and Written Opinion received for PCT Patent Application No. PCT/US2015/046787, dated Apr. 1, 2016, 26 pages.
Final Office Action received for U.S. Appl. No. 14/838,235, dated Jun. 15, 2016, 18 pages.
Notice of Allowance received for Chinese Patent Application No. 201520669842.6, dated May 18, 2016, 4 pages (2 pages of English Translation and 2 pages of Official copy).
Smasung, "SM-R380", User Manual, 2014, 78 pages.
Invitation to Pay Additional Fees received for PCT Patent Application No. PCT/US2015/044083, dated Nov. 4, 2015, 11 pages.
Non Final Office Action received for U.S. Appl. No. 14/817,572, dated Sep. 12, 2016, 9 pages.
Office Action received for Chinese Patent Application No. 201620393549.6, dated Aug. 18, 2016, 2 pages (1 page of English Translation and 1 page of Official Copy).
Office Action received for Chinese Patent Application No. 201620393748.7, dated Aug. 18, 2016, 2 pages (1 page of English Translation and 1 page of Official Copy).
Intention to Grant received for Denmark Patent Application No. PA201570550, dated Dec. 22, 2016, 2 pages.
International Preliminary Report on Patentability received for PCT Application No. PCT/US2015/032309, dated Dec. 15, 2016, 8 pages.
International Preliminary Report on Patentability received for PCT Patent Application No. PCT/US2015/032305, dated Dec. 15, 2016, 8 pages.
Non-Final Office Action received for U.S. Appl. No. 14/503,355, dated Dec. 30, 2016, 22 pages.
Office Action received for Taiwanese Patent Application No. 104128704, dated Nov. 2, 2016, 12 pages (5 pages of English Translation and 7 pages of Official Copy).
"Samsung Gear 2 User manual", Available at http://www.slideshare.net/badaindonesia/samsung-gear-2-user-manual, Apr. 2014, 5 pages.
Final Office Action received for U.S. Appl. No. 14/503,072, dated Sep. 1, 2015, 16 pages.
Non Final Office Action received for U.S. Appl. No. 14/503,072, dated Jan. 26, 2015, 12 pages.
Non Final Office Action received for U.S. Appl. No. 14/503,296, dated Jan. 30, 2015, 16 pages.
Non-Final Office Action received for U.S. Appl. No. 14/503,372, dated Dec. 5, 2014, 11 pages.
Non-Final Office Action received for U.S. Appl. No. 14/503,381, dated May 13, 2015, 13 pages.
Non-Final Office Action received for U.S. Appl. No. 14/599,425, dated Mar. 17, 2015, 16 pages.
Office Action received for Australian Patent Application No. 2015100734, dated Jul. 29, 2015, 5 pages.
Kamijo, Noboru, "Next Generation Mobile System—WatchPad1. 5", Available at "http://researcher.ibm.com/researcher/view_group_subpage.php?id=5617", retrieved on Jul. 4, 2015, 2 pages.
Lemay et al., U.S. Appl. No. 60/936,562, filed Jun. 20, 2007, titled "Portable Multifunction Device, Method, and Graphical User Interface for Playing Online Videos", 61 pages.
NDTV, "Sony SmartWatch 2 Launched in India for Rs. 14,990", available at "http://gadgets.ndtv.com/others/news/sony-smartwatch-2-launched-in-india-for-rs-14990-420319", Sep. 18, 2013, 4 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.

(56) References Cited

OTHER PUBLICATIONS

International Search Report and Written Opinion received for PCT Patent Application No. PCT/US2015/019321, dated Jun. 3, 2015, 11 pages.
Apple, "iPhone User's Guide", 2007, 137 pages.
"i Phone User Guide for iOS 7.1 Software", available online at <https://manuals.info.apple.com/MANUALS/1000/MA1681/en_US/iphone_ios7_user_guide.pdf> retrived on Aug. 10, 2015, 162 pages.
Headset Button Controller v7.3 APK Full APP Download for Andriod, Blackberry, iPhone, Jan. 27, 2014, 11 pages.
Colt, Sam, "Here's One Way Apple's Smartwatch Could Be Better Than Anything Else", Business Insider, Aug. 21, 2014, pp. 1-4.
International Search Report and Written Opinion received for PCT Patent Application No. PCT/US2015/019322, dated Jun. 18, 2015, 16 pages.
Final Office Action received for U.S. Appl. No. 14/503,296, dated Jul. 2, 2015, 7 pages.
Yang et al., "U.S. Appl. No. 62/006,211, filed Jun. 1, 2014, titled Displaying Options, Assigning Notification, Ignoring Messages, and Simultaneous User Interface Displays in a Messaging Application", 254 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/019298, dated Jul. 13, 2015, 17 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2015/032474, dated Aug. 19, 2015, 8 pages.
International Search Report and Written Opinion received for PCT Patent Application No. PCT/US2015/019317, dated Aug. 25, 2015, 24 pages.
Fuji Film, "Taking Pictures Remotely : Free iPhone/Android App Fuji Film Camera Remote", Available at <http://app.fujifilm-dsc.com/en/camera_remote/guide05.html>, Apr. 22, 2014, 3 pages.
PlayMemories Camera Apps, "PlayMemories Camera Apps Help Guide", Available at <https://www.playmemoriescameraapps.com/portal/manual/IS9104-NPIA09014_00-F00002/en/index.html>, 2012, 3 pages.
Techsmith, "Snagit 11-Snagit 11.4 Help", Available at <http://assets.techsmith.com/Downloads/ua-tutorials-snagit-11/Snagit_11.pdf>, Jan. 2014, 146 pages.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Frakes, Dan, "How to Get Started with Airplay", Macworld, May 2013, 8 pages.
Shankland, Stephen, "Chrome OS Gets 'OK Google' Voice Search Control", available online at http://www.cnet.com/news/chrome-os-gets-ok-google-voice-search-control/, May 21, 2014, 4 page.
Notice of Allowance Received for U.S. Appl. No. 14/838,235, dated Oct. 4, 2016, 7 pages.
Office Action received for Danish Patent Application No. PA201570550, dated Oct. 19, 2016, 3 pages.
Office Action received for Australian Patent Application No. 2016102029, dated Feb. 22, 2017, 4 pages.
International Preliminary Report on Patentability received for PCT Patent Application No. PCT/US2015/043487, dated Feb. 16, 2017, 13 pages.

International Search Report and Written Opinion received for PCT Patent Application No. PCT/US2016/046828, dated Dec. 15, 2016, 22 pages.
Invitation to Pay Additional Fees received for PCT Patent Application No. PCT/US2016/046828, dated Sep. 23, 2016, 2 pages.
Non-Final Office Action received for U.S. Appl. No. 15/142,661, dated Jan. 25, 2017, 29 Pages.
Notice of Allowance received for U.S. Appl. No. 14/838,235, dated Dec. 29, 2016, 4 pages.
Office Action received for Australian Patent Application No. 2016102028, dated Feb. 13, 2017, 4 pages.
Office Action received for Chinese Patent Application No. 201620393549.6, dated Jan. 13, 2017, 2 pages (Official Copy only). (See Communication Under 37 CFR § 1.98(a)(3)).
Office Action received for Chinese Patent Application No. 201620393748.7, dated Jan. 13, 2017, 2 pages (Official Copy only). (See Communication Under 37 CFR § 1.98(a)(3)).
Final Office Action received for U.S. Appl. No. 14/817,572, dated Mar. 23, 2017, 14 pages.
International Preliminary Report on Patentability received for PCT Patent Application No. PCT/US2015/044083, dated Mar. 16, 2017, 24 pages.
International Preliminary Report on Patentability received for PCT Patent Application No. PCT/US2015/046787, dated Mar. 16, 2017 19 pages.
Notice of Allowance received for Danish Patent Application No. PA201570550, dated Mar. 20, 2017, 2 pages.
Office Action received for Australian Patent Application No. 2015312369, dated Mar. 29, 2017, 3 Pages.
"How to Move Mail to Different Folders in Gmail", Available online at <https://web.archive.org/web/20140731230338/http://www.wikihow.com/Move-Mail-to-Different-Folders-in-Gmail>, Jul. 31, 2014, pp. 1-4.
Non-Final Office Action received for U.S. Appl. No. 14/841,608, dated Apr. 12, 2017, 9 pages.
Office Action received for Australian Patent Application No. 2017100198, dated Apr. 20, 2017, 4 pages.
Office Action received for Danish Patent Application No. PA201770089, dated Apr. 25, 2017, 10 pages.
Office Action received for German Patent Application No. 212015000194.6, dated Mar. 16, 2017, 2 pages (1 page of English Translation and 1 page of Official Copy).
Basu, Saikat, "MS Outlook Tip: How to Automatically Organize Incoming Emails", Available online at <http://www.makeuseof.com/tag/ms-outlook-productivity-tip-how-to-move-emails-to-individual-folders-automatically/>, Sep. 27, 2009, pp. 1-6.
Airize, "Notification & Control Center Problem Issue Solution", Available online at :—"https://www.youtube.com/watch?v=K0zCueYlaTA", Dec. 6, 2013, 1 page.
Iosvlog Daily, "iOS 7 Notification Center Complete Walkthrough", Available online at :—"https://www.youtube.com/watch?v=gATXt-o42LA", Jun. 10, 2013, 1 page.
Leonard, Jonathan OH, "How to: Dismiss Banner Notifications or Toast Notifications on ios7", Available online at :—"https://www.youtube.com/watch?v=vSjHnBFIW_M", Dec. 17, 2013, 1 page.
Lewis, Jeffery, "iOS Notification Banner Pull Down to Notification Center in iOS 7 Beta 5", Available online at :—"https://www.youtube.com/watch?v=nP0s6ETPxDg", Aug. 6, 2013, 1 page.
Office Action received for Australian Patent Application No. 2017100197, dated Apr. 28, 2017, 4 Pages.
Office Action received for Korean Patent Application No. 10-2017-7005628, dated May 10, 2017, 12 pages (5 pages of English Translation and 7 pages of Official Copy).
Office Action received for Taiwanese Patent Application No. 104128519, dated Mar. 29, 2017, 16 pages (7 pages of English Translation and 9 pages of Official Copy).
Patterson, Ben, "iOS 7 tip: Alerts, Banners, and Badgesâwhats the Difference?", Available online at :—"https://web.archive.org/web/20140128072440/http://heresthethingblog.com/2014/01/22/ios-7-tip-whats-difference-alert/", Jan. 22, 2014, 5 Pages.
Search Report received for Danish Patent Application No. PA201770125, dated May 5, 2017, 10 pages.

(56) References Cited

OTHER PUBLICATIONS

Search Report received for Danish Patent Application No. PA201770126, dated Apr. 26, 2017, 8 Pages.
Final Office Action received for U.S. Appl. No. 14/503,355, dated Sep. 8, 2017, 25 pages.
IPhone, "User Guide for iOS 7.1 Software", Mar. 2014, 162 pages.
Non-Final Office Action received for U.S. Appl. No. 14/841,614, dated Jul. 27, 2017, 13 pages.
Notice of Allowance received for Chinese Patent Application No. 201620830403.3, dated Sep. 8, 2017, 1 page. (Official copy only). {See Communication Under 37 CFR § 1.98(a) (3)}.
Notice of Allowance received for Taiwanese Patent Application No. 104128519, dated Nov. 20, 2017, 5 pages (2 page of English Translation and 3 pages of Official Copy).
Notice of Allowance received for U.S. Appl. No. 14/841,608, dated Nov. 14, 2017, 5 pages.
Notice of Allowance received for U.S. Appl. No. 14/817,572, dated Nov. 30, 2017, 26 pages.
Notice of Allowance received for U.S. Appl. No. 15/142,661, dated Oct. 4, 2017, 22 pages.
Office Action received for Australian Patent Application No. 2017100760, dated Aug. 10, 2017, 4 pages.
Office Action received for Danish Patent Application No. PA201770126, dated Oct. 18, 2017, 3 pages.
Office Action received for Japanese Patent Application No. 2017-510297, dated Jul. 10, 2017, 10 pages (5 pages of English Translation and 5 pages of Official Copy).
Office Action received for Taiwanese Patent Application No. 104128704, dated Jul. 31, 2017, 7 pages (3 pages of English Translation and 4 pages of Official Copy).
Samsung, "SM-G900F User Manual", English (EU). Rev.1.0, Mar. 2014, 249 pages.
Extended European Search Report received for European Patent Application No. 17167629.9, dated Jun. 2, 2017, 7 pages.
Non-Final Office Action received for U.S. Appl. No. 15/431,435, dated Jun. 8, 2017, 13 pages.
Office Action received for Australian Patent Application No. 2015267259, dated Jun. 2, 2017, 2 pages.
Office Action received for Australian Patent Application No. 2015267260, dated Jun. 2, 2017, 2 pages.
Office Action received for Chinese Patent Application No. 201620830403.3, dated Mar. 7, 2017, 1 page.
Office Action Received for Chinese Patent Application No. 201620830403.3, dated Jun. 7, 2017, 1 page.
Search Report and Opinion received for Netherlands Patent Application No. 2015354, completed on Jun. 22, 2017, 24 pages (10 pages of English Translation and 14 pages of Official Copy).

* cited by examiner

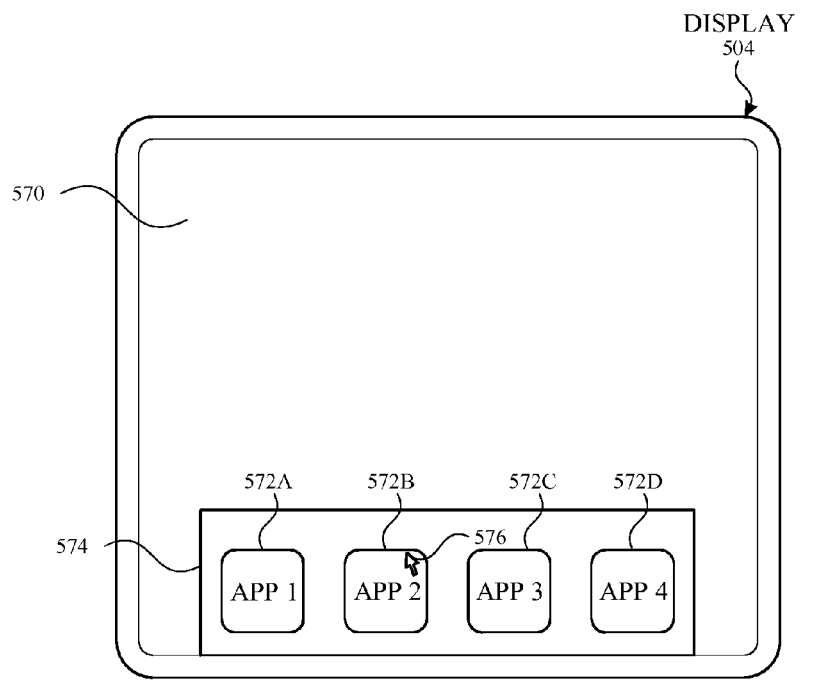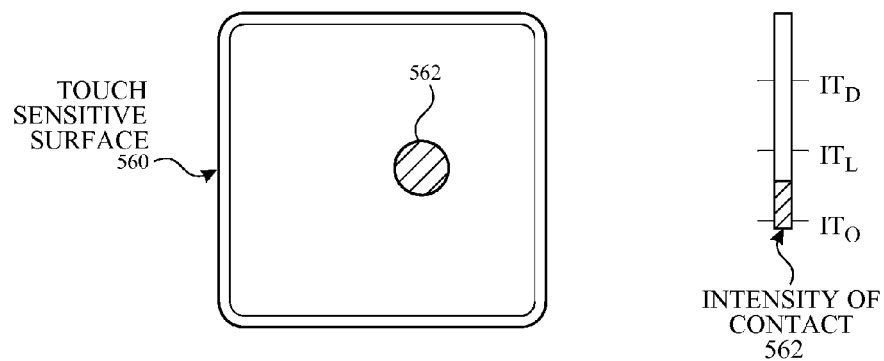
*FIG. 5E*

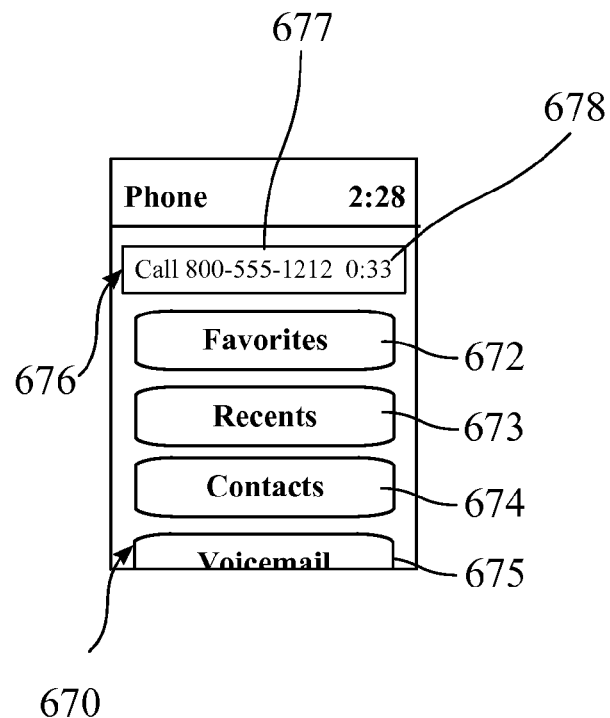
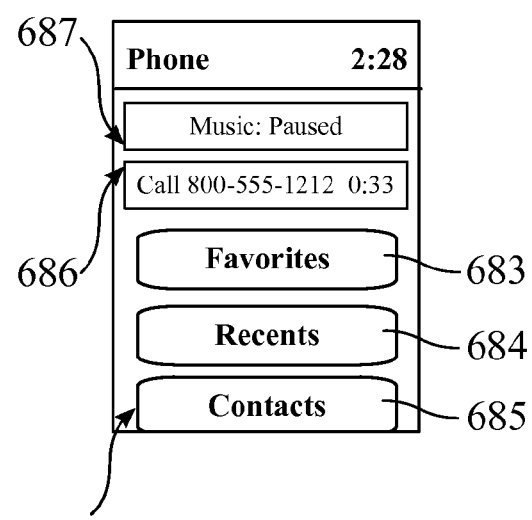
*FIG. 6G*

1300

1302

DETERMINE FIRST COMMUNICATION STATUS: THE FIRST COMMUNICATION STATUS INDICATES WHETHER THE PHONE HEADSET IS OPERATIVELY CONNECTED TO THE ELECTRONIC DEVICE

1304

DETERMINE SECOND COMMUNICATION STATUS: THE SECOND COMMUNICATION INDICATES WHETHER THE PHONE HEADSET AND THE CELLULAR PHONE ARE OPERATIVELY CONNECTED.

1306

DISPLAY AN INDICATION OF AT LEAST ONE OF THE FIRST AND SECOND STATUSES.

1308

OPTIONALLY, DETERMINE THIRD COMMUNICATION STATUS: THE THIRD COMMUNICATION STATUS INDICATES WHETHER THE ELECTRONIC DEVICE IS OPERATIVELY CONNECTED TO THE CELLULAR PHONE.

OPTIONALLY, DETERMINE WEHTHER AN INCOMING OR OUTGOING CALL IS TO BE ROUTED (E.G., TO THE MICRPHONE/SPEAKER OF A HEADSET OR OF A CELLULAR PHONE) BASED ON ONE OR MORE OF THE DETERMINED STATUSES.

DISPLAYING AN INDICATION OF AN INCOMING CALL THAT IS BEING RECEIVED ON A CELLULAR PHONE THAT IS WITHIN COMMUNICATIONS RANGE OF THE ELECTRONIC DEVICE

1504

DISPLAYS AT LEAST AN AFFORDANCE FOR ANSWERING THE CALL AND AN AFFORDANCE FOR DECLINING CALL

1506

RECEIVES USER INPUT OTHER THAN A SELECTION OF THE ACCEPT AND DECLINE AFFORDANCES (E.G., SWIPE INPUT)

1508

DISPLAY AN AFFORDANCE FOR PASSING THE CALL TO THE CELLULAR PHONE BY PLACING THE CALL ON HOLD AND BY SENDING AN INSTRUCTION TO THE CELLULAR PHONE INSTRUCTING THE CELLULAR PHONE TO DISPLAY A SECOND ANSWER AFFORDANCE, WHERE THE SECOND ANSWER AFFORDANCE, WHEN SELECTED, CAUSES THE CELLULAR PHONE TO ANSWER THE INCOMING CALL.

```
┌─────────────────────────────────────────┐
│                 2402                    │
│                                         │
│  DISPLAYING AN INDICATION OF AN         │
│           INCOMING CALL                 │
└─────────────────────────────────────────┘
                    │
                    ▼
┌─────────────────────────────────────────┐
│                 2404                    │
│                                         │
│  DISPLAYING AT LEAST AN AFFORDANCE FOR  │
│  ANSWERING THE CALL AND AN AFFORDANCE   │
│          FOR DECLINING CALL             │
└─────────────────────────────────────────┘
                    │
                    ▼
┌─────────────────────────────────────────┐
│                 2406                    │
│                                         │
│  RECEIVING USER INPUT OTHER THAN A      │
│  SELECTION OF THE ACCEPT AND DECLINE    │
│    AFFORDANCES (E.G., SWIPE INPUT)      │
└─────────────────────────────────────────┘
                    │
                    ▼
┌─────────────────────────────────────────┐
│                 2408                    │
│                                         │
│  IN RESPONSE TO RECEIVING THE USER      │
│  INPUT OTHER THAN A SELECTION OF THE    │
│  ACCEPT AND DECLINE AFFORDANCES,        │
│  DISPLAYING AN AFFORDANCE TO            │
│         MESSAGE THE CALLER              │
└─────────────────────────────────────────┘
```

*FIG. 24*

PHONE USER INTERFACE

CROSS-REFERENCE TO RELATED APPLICATIONS

This application claims the benefit of priority of U.S. Provisional Patent Application Ser. No. 62/044,939, entitled "PHONE USER INTERFACE," filed Sep. 2, 2014; and U.S. Provisional Patent Application Ser. No. 62/129,853, entitled "PHONE USER INTERFACE," filed Mar. 8, 2015. The content of these applications is hereby incorporated by reference in its entirety.

BACKGROUND

The present disclosure relates generally to computer user interfaces, and more specifically to user interfaces for carrying on phone calls.

BRIEF SUMMARY

Some techniques for controlling phone operations using electronic devices are generally cumbersome and inefficient. For example, some existing techniques use a complex and time-consuming user interface, which may include multiple key presses or keystrokes on multiple devices. Some existing techniques require specific interactions with specific devices even (e.g., headset and phone) when the multiple devices are otherwise capable of communication with one another. Some existing techniques require more time than necessary, wasting user time and device energy. This latter consideration is particularly important in battery-operated devices.

Accordingly, the present technique provides electronic devices with faster, more efficient methods and interfaces for managing phone operations. Such methods and interfaces optionally complement or replace other methods for managing phone operations. Such methods and interfaces reduce the cognitive burden on a user and produce a more efficient human-machine interface. For battery-operated computing devices, such methods and interfaces conserve power and increase the time between battery charges.

In some embodiments, a method of providing phone functionalities comprises: at an electronic device having one or more motion sensors: receiving an indication of an event; in response to receiving the indication, providing an event notification; while providing the event notification, receiving data, from the one or more motion sensors, representing a user input; determining, based on the data representing the user input, whether the user input corresponds to movement of the electronic device satisfying a predetermined condition; and in accordance with a determination that the user input corresponds to movement of the electronic device satisfying the predetermined condition, modifying the event notification.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a non-transitory computer readable storage medium stores one or more programs, the one or more programs comprising instructions, which when executed by one or more processors of an electronic device with a display and having one or more motion sensors, cause the device to: receive an indication of an event; in response to receiving the indication, provide an event notification; while providing the event notification, receive data, from the one or more motion sensors, representing a user input; determine, based on the data representing the user input, whether the user input corresponds to movement of the electronic device satisfying a predetermined condition; in accordance with a determination that the user input corresponds to movement of the electronic device satisfying the predetermined condition, modify the event notification.

In some embodiments, an electronic device, comprises: a display, one or more processors; one or more motion sensors a memory; and one or more programs, wherein the one or more programs are stored in the memory and configured to be executed by the one or more processors, the one or more programs including instructions for: receiving an indication of an event; in response to receiving the indication, providing an event notification; while providing the event notification, receiving data, from the one or more motion sensors, representing a user input; determining, based on the data representing the user input, whether the user input corresponds to movement of the electronic device satisfying a predetermined condition; in accordance with a determination that the user input corresponds to movement of the electronic device satisfying the predetermined condition, modifying the event notification.

Thus, devices are provided with faster, more efficient methods and interfaces for managing phone operations, thereby increasing the effectiveness, efficiency, and user satisfaction with such devices. Such methods and interfaces may complement or replace other methods for managing phone operations.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 5E-5H illustrate exemplary components and user interfaces of a personal electronic device in accordance with some embodiments.

FIGS. 6A-6H illustrate exemplary user interfaces for accessing phone features.

FIG. 13 is a flow diagram illustrating a process for accessing phone features in accordance with some embodiments.

FIG. 15 is a flow diagram illustrating a process for accessing phone features in accordance with some embodiments.

FIG. 24 is a flow diagram illustrating a process for modifying event notifications in accordance with some embodiments.

DESCRIPTION OF EMBODIMENTS

Figure 1A:
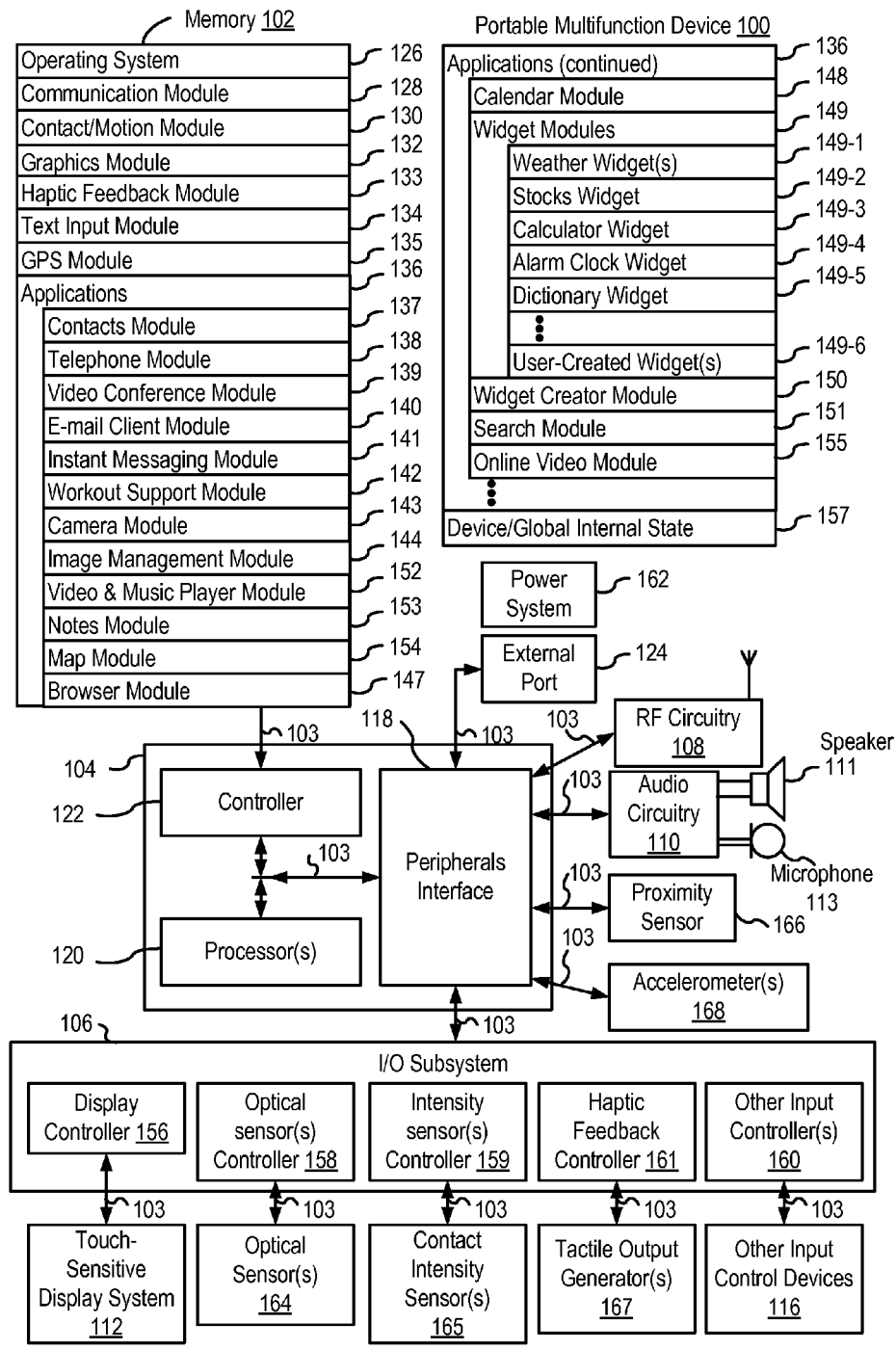
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

It is desirable for a user who is in the proximity of multiple electronic devices to be able to efficiently control how phone call operations are to be handled by not just one but one or more of those devices. For example, a user may have a cellular phone in his pocket, a wearable headset worn on his head, and a wearable multi-function device worn on his arm. When a phone call is received by the cellular phone (in his pocket), it may be more convenient for the user to (i) answer the call using a user interface on the wearable device but (ii) physically participate in the call through the worn headset, while (iii) the cellular phone remains in his pocket. Thus, a versatile user interface that provides a user efficient with control over aspects of phone call operations occurring on one or across multiple devices is desirable.

Below, FIGS. 1A-1B, 2, 3, 4A-4B, and 5A-5B, provide a description of exemplary devices that may participate in the handling of a phone. FIGS. 6A-6H, 7A-7E, 8A-8E, 9A-9B, 10A-10C, and 11A-11C illustrate exemplary user interfaces for controlling aspects of phone operations. The user interfaces in the figures are also used to illustrate the processes described below, including the processes in FIGS. 12-15.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes one or more computer-readable storage mediums. The computer-readable storage mediums are optionally tangible and non-transitory. The computer-readable storage mediums are optionally transitory. Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HS-DPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.1 lac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety.

In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
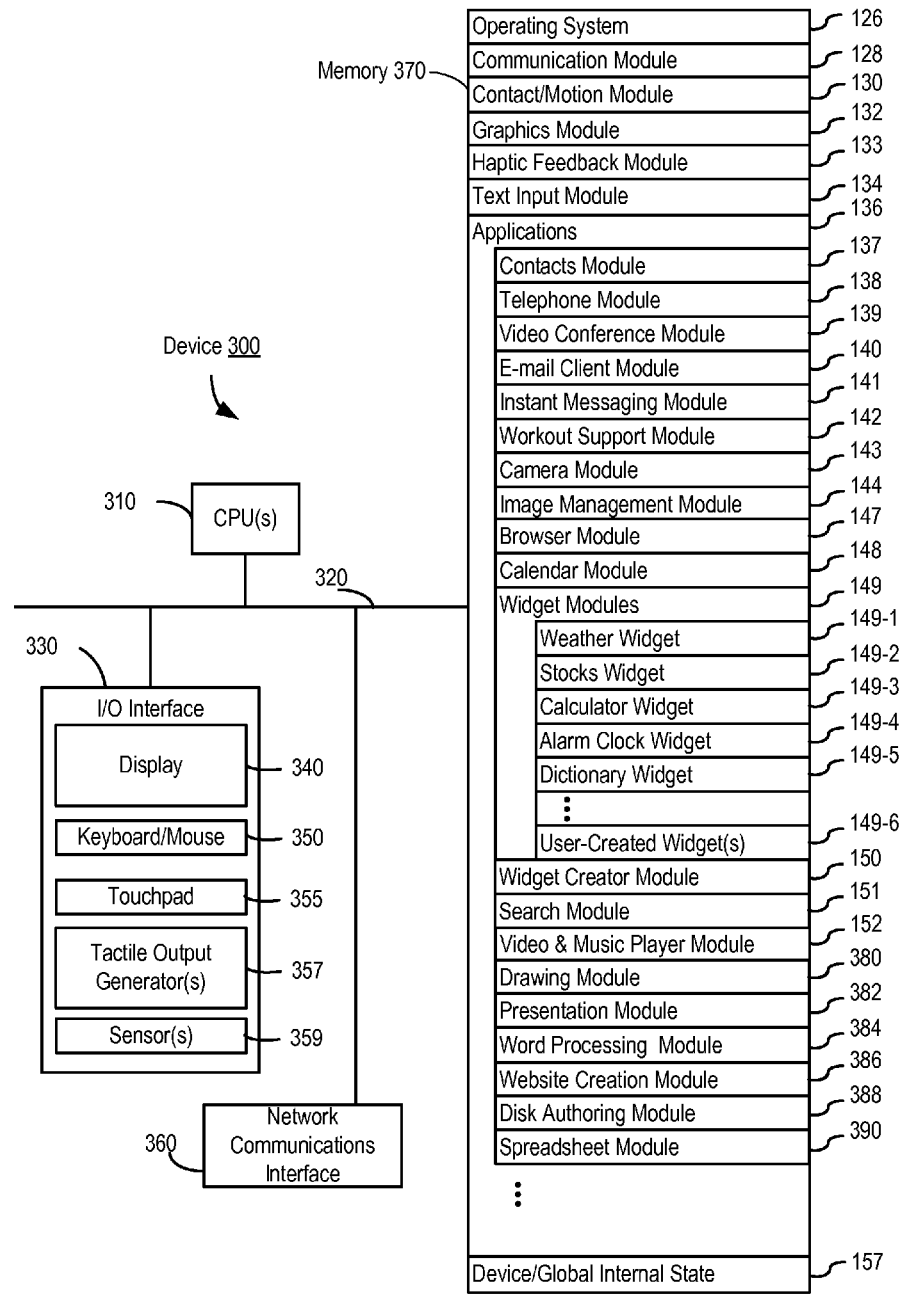
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
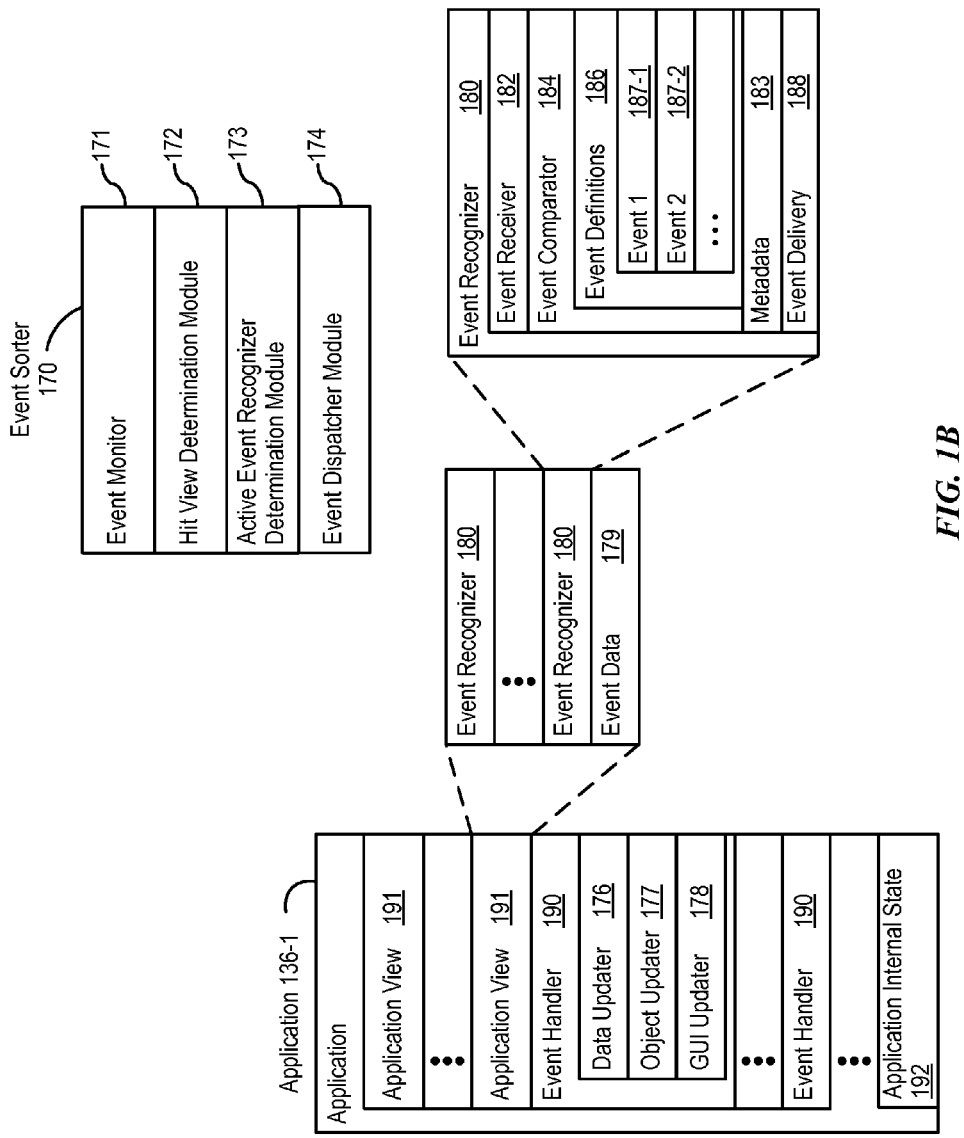
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
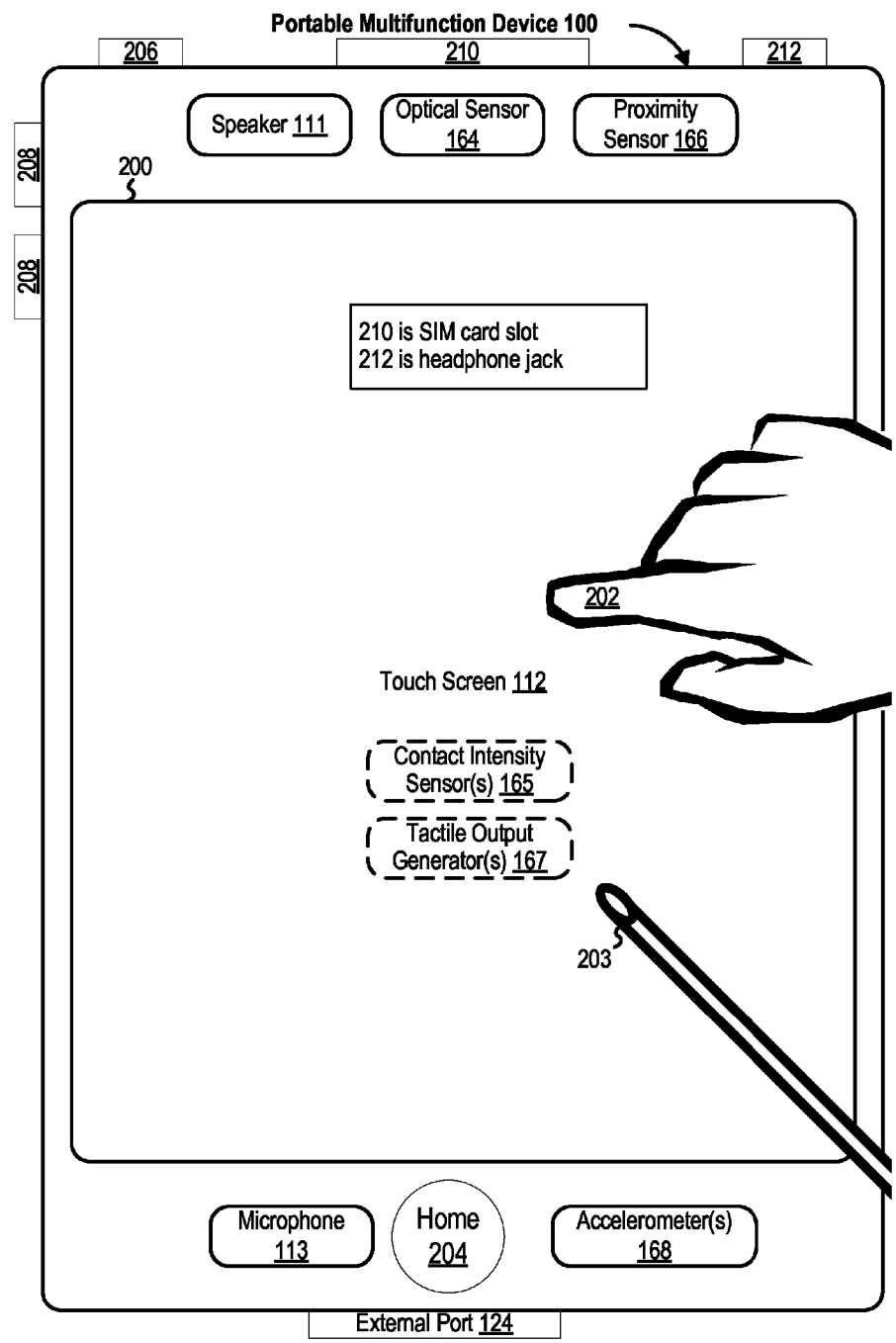
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multi-media player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 are, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that is, optionally, implemented on, for example, portable multifunction device 100.

Figure 4A:
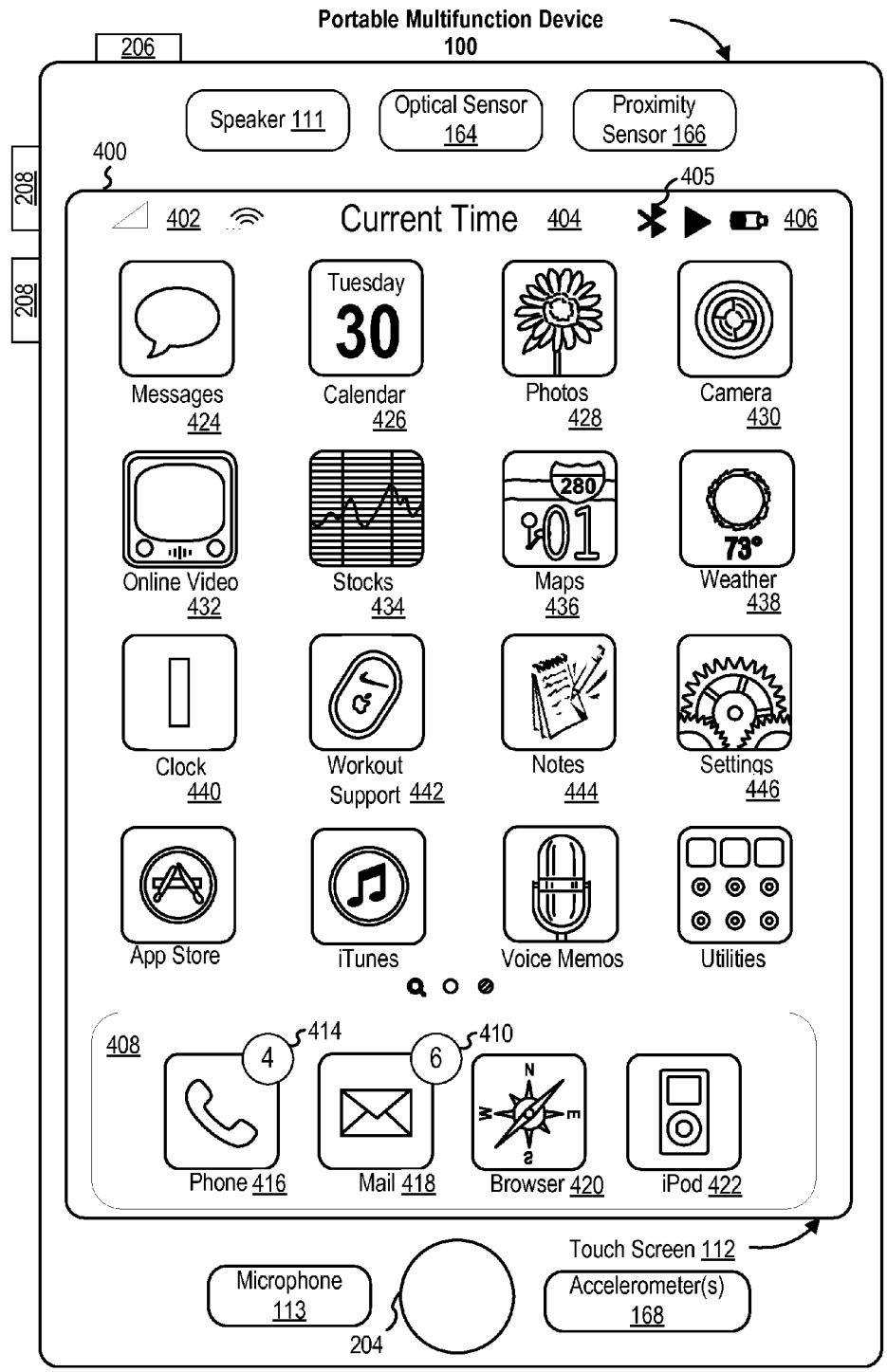
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
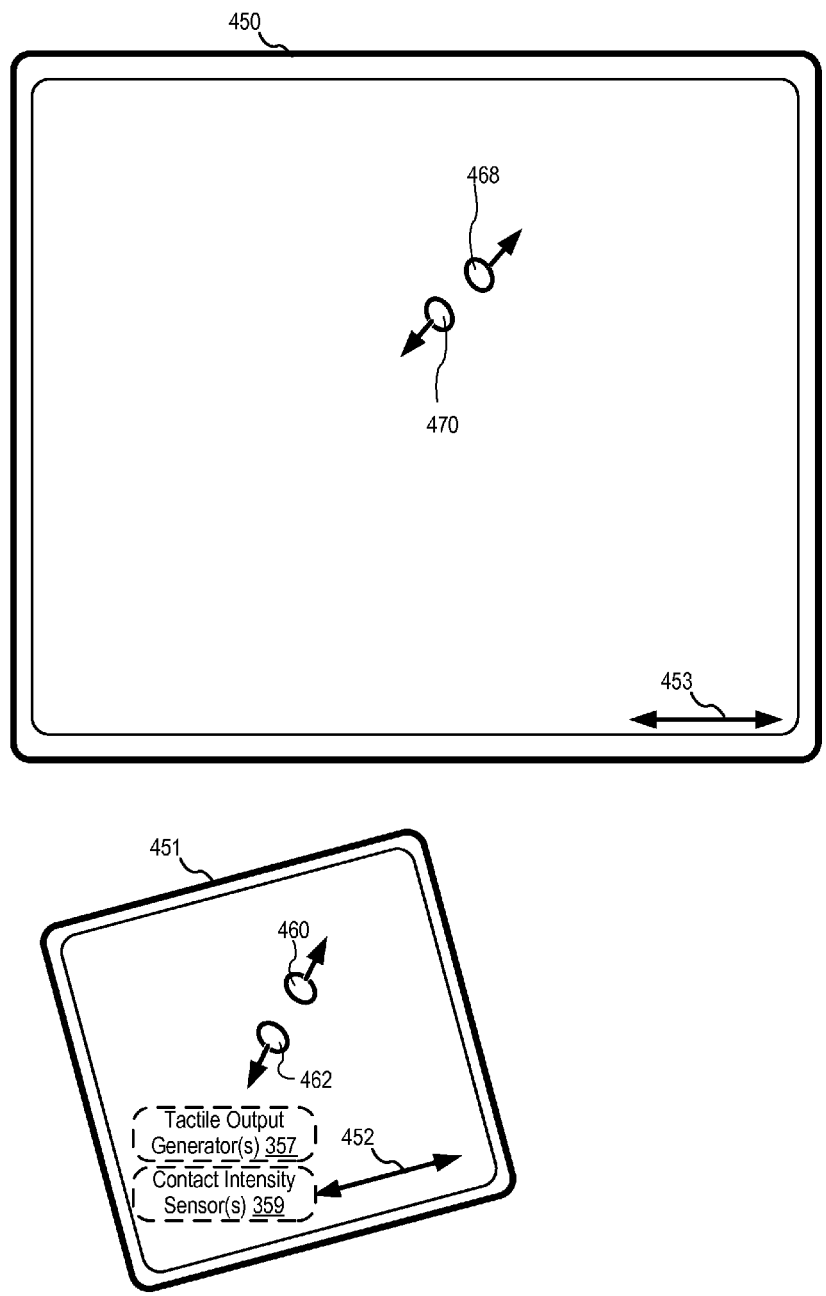
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
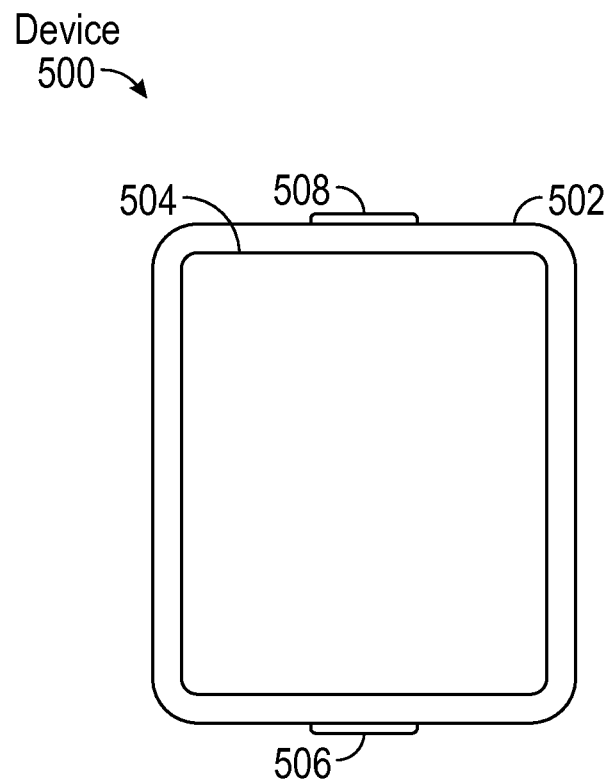
FIG. 5A is a block diagram illustrating a portable multifunction device with a touch-sensitive display and a rotatable input mechanism in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
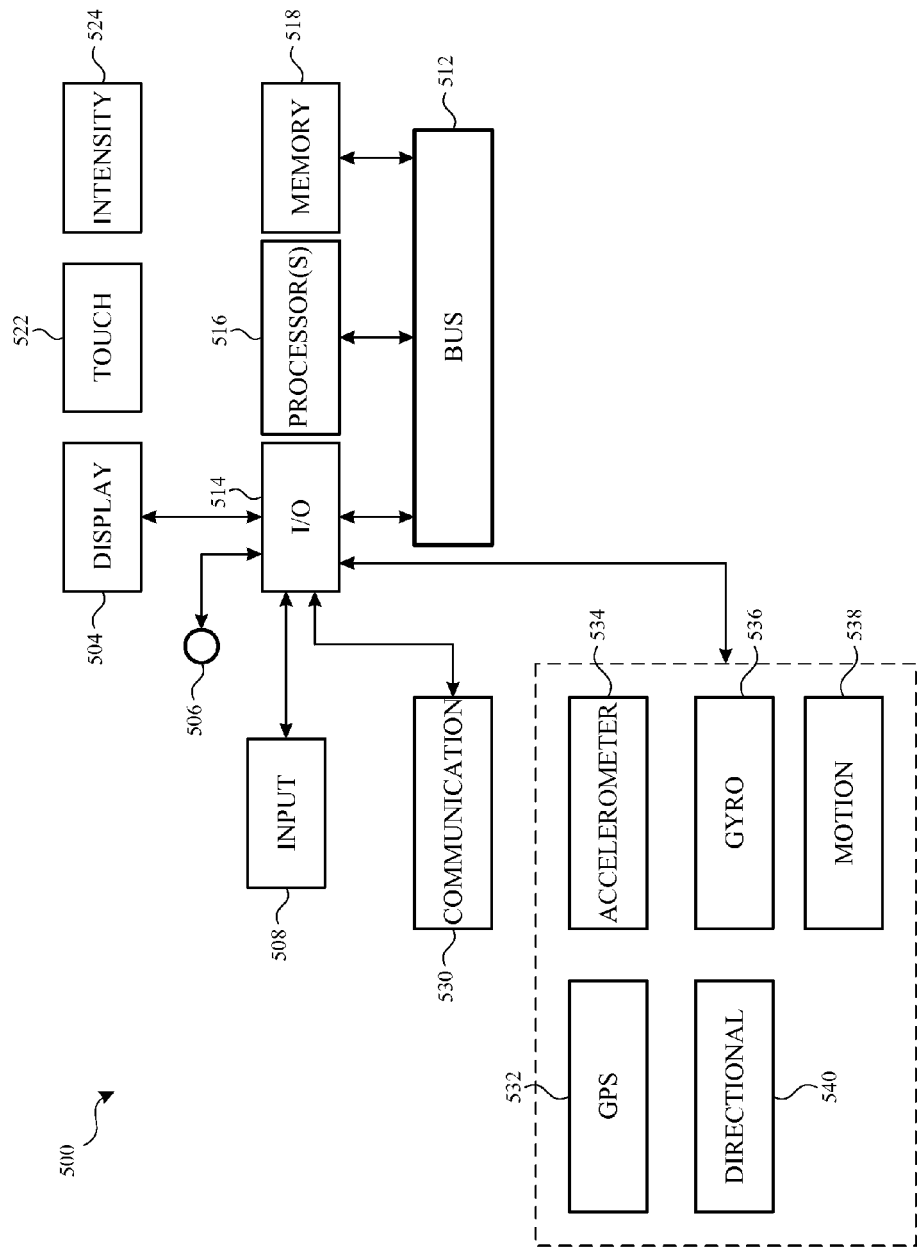
FIG. 5B illustrates a portable multifunction device having a touch-sensitive display and a rotatable input mechanism in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 1200-1500, 2100, and 2400 (FIGS. 12-15, 21, and 24). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5C:
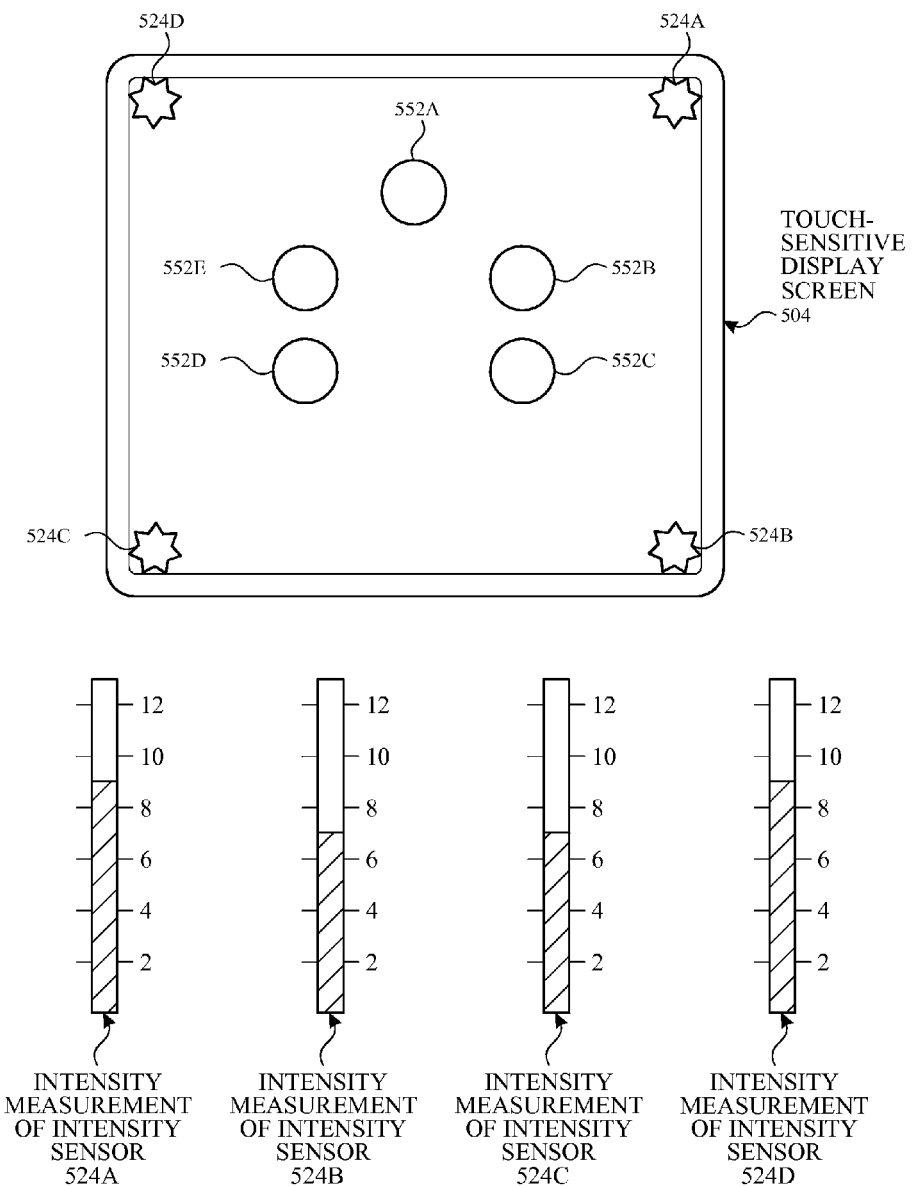
FIGS. 5C-5D illustrate exemplary components of a personal electronic device having a touch-sensitive display and intensity sensors in accordance with some embodiments.
Figure 5D:
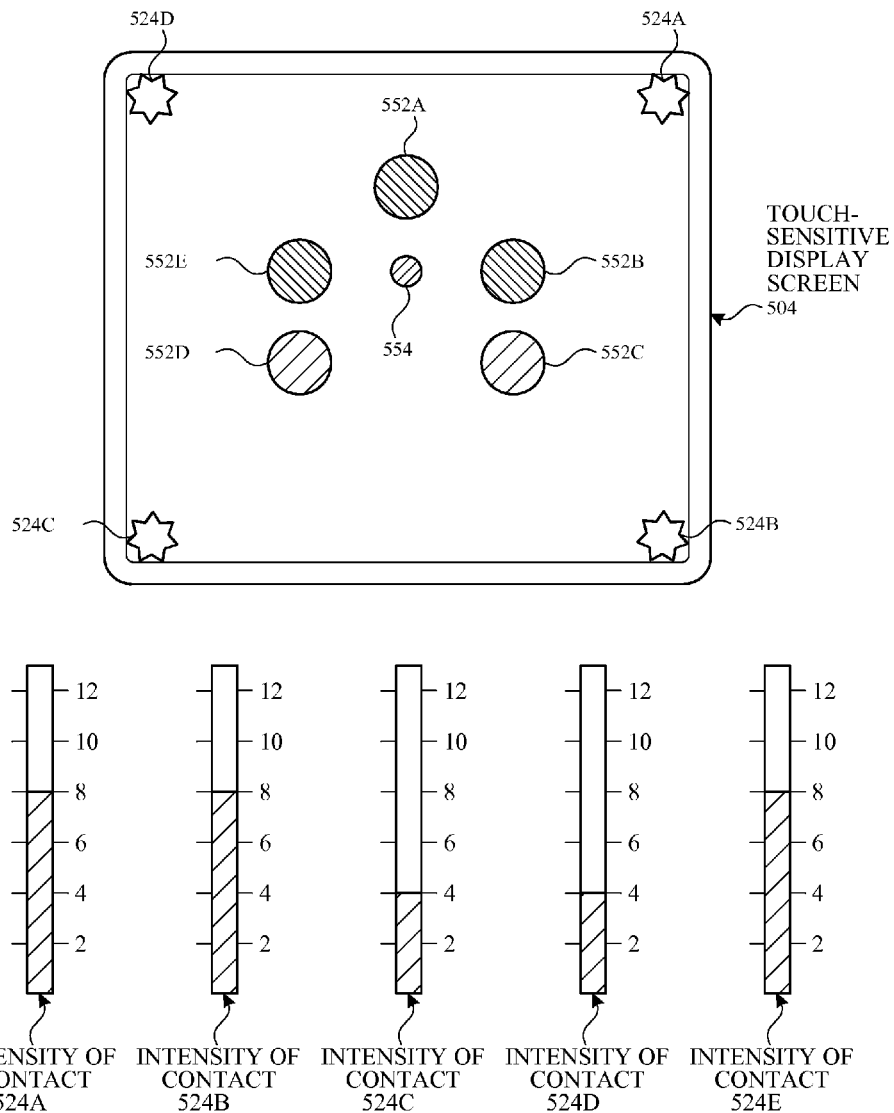

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $I_j = A \cdot (D_j / \Sigma D_i)$, where Dj is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
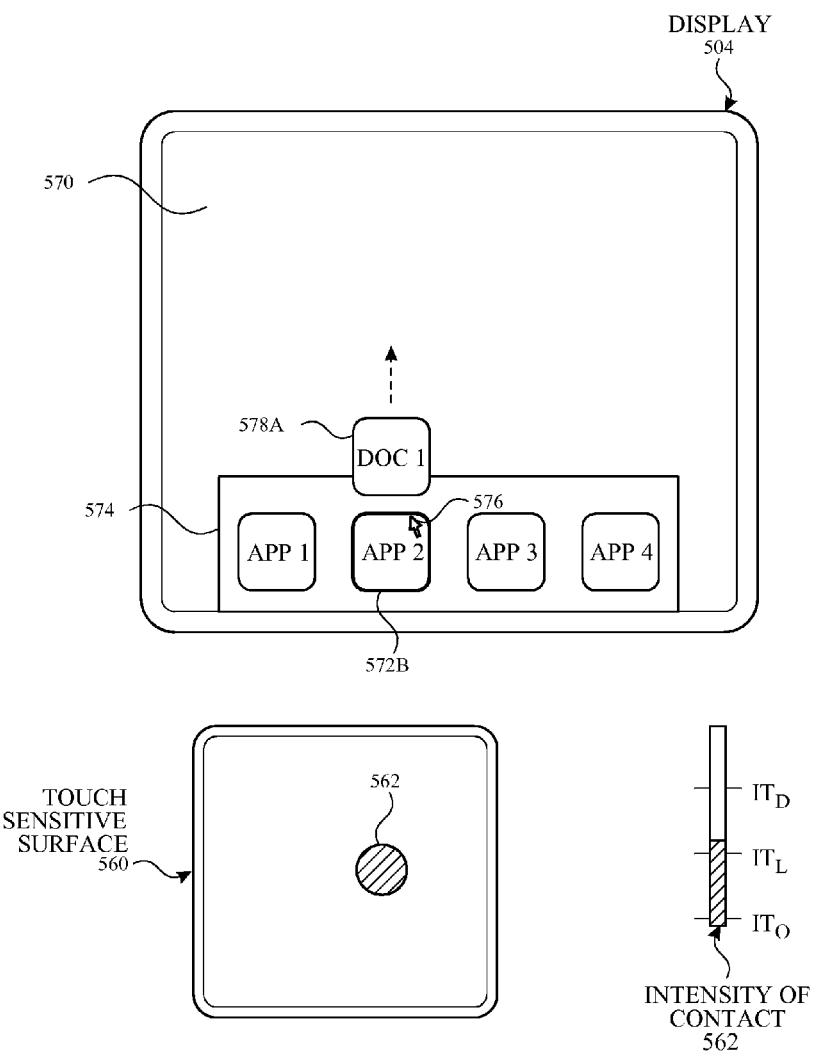
Figure 5G:
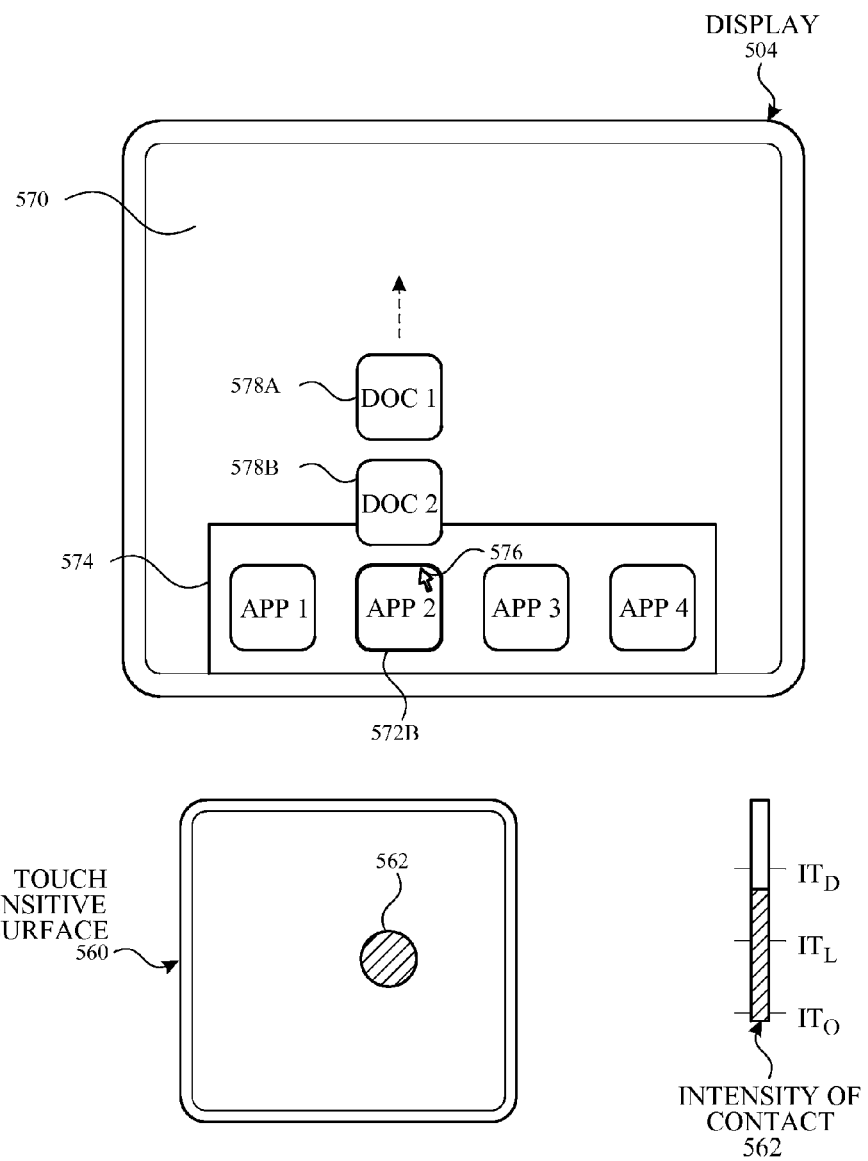
Figure 5H:
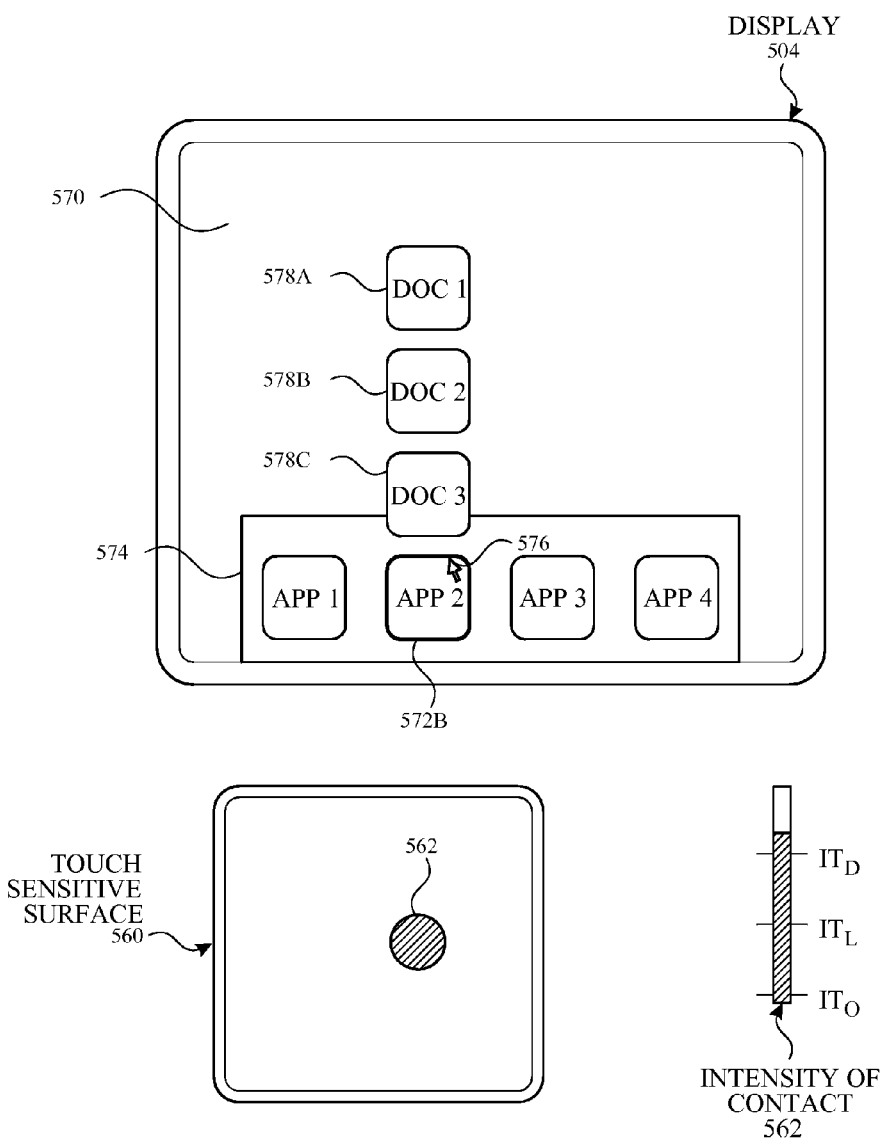

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:
- an active application, which is currently displayed on a display screen of the device that the application is being used on;
- a background application (or background processes) which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500 (FIGS. 1A, 3A, and/or 5A), to provide phone functionalities.

1. Exemplary Phone User Interfaces

Figure 6A:
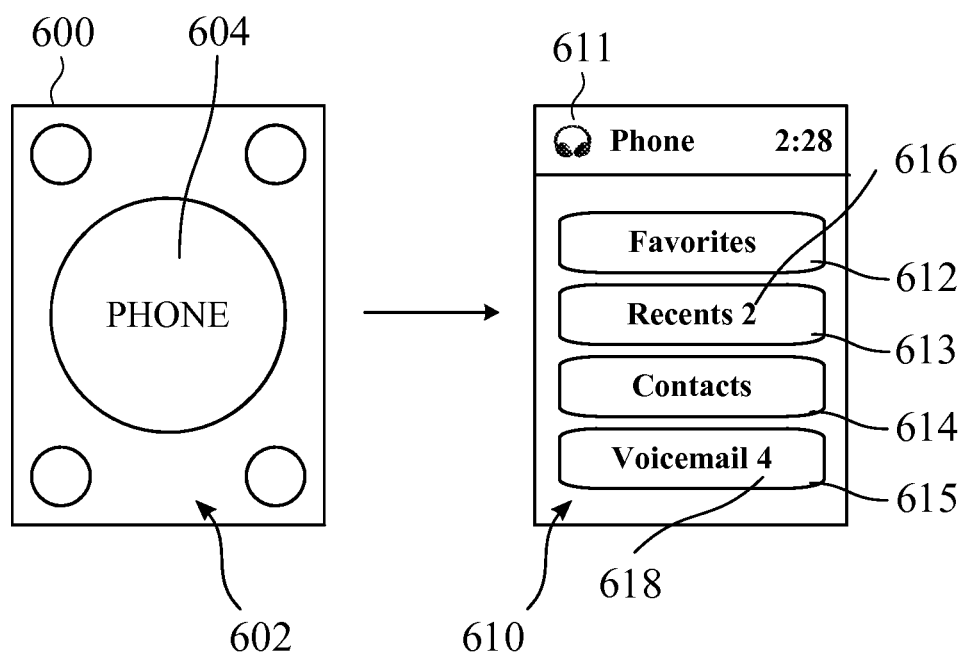

FIG. 6A illustrates exemplary wearable electronic device 600. Wearable electronic device 600 is device 500 (FIG. 5A) in some embodiments. As shown, device 600 is displaying user interface screen 602. User interface screen 602 in some embodiments has icons for launching features on device 600, including icon 604 for launching a phone user interface. In response to a user selection (e.g., touch) of icon 605, device 600 displays exemplary phone user interface screen 610. Screen 610 is referred to as a landing screen, as it is the user interface screen that is displayed when phone features are initially launched on device 600.

Landing screen 610, displayed in some embodiments, has status indicator 611 indicating whether a cellular phone and/or a headset are operatively connected for use for phone calls. Landing screen 610 also has affordance 612, which, when selected, displays a list of contacts that have been designated by a user to be favorite contacts. Landing screen 610 also has affordance 613, which, when selected, displays a list of recent incoming and/or outgoing calls. Landing screen 610 also has affordance 614, which, when selected, displays a list of address book contacts accessible to device 600. Landing screen 610 also has affordance 615, which, when selected, displays a listing of voicemail messages that have been left for the user.

Optionally, affordance 613 has missed-call indicator 616 indicating the number of missed calls. Optionally, affordance 615 has new voicemail indicator 618 indicating the number of new voicemail messages. Optional indicators 616 and/or 618 may be hidden from view when there is no missed call or new voicemail message. Landing screen 610 is scrollable to reveal additional content such as affordances for accessing additional phone features. In some embodiments, landing screen 610 is scrolled via touch input. In some embodiments, landing screen 610 is scrolled in response to movement of a rotatable input mechanism of device 600.

Figure 6B:
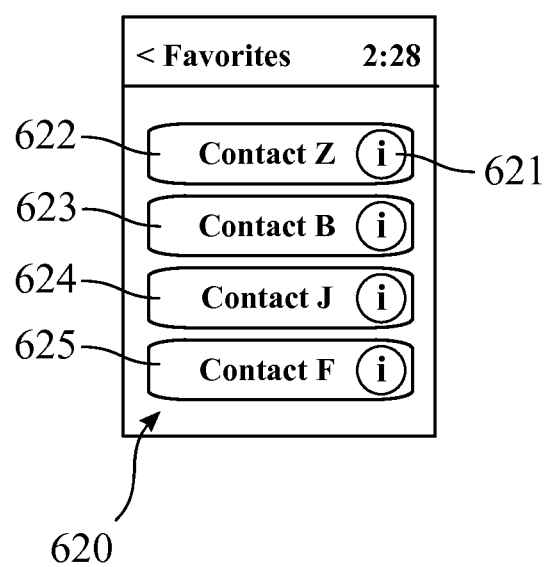

FIG. 6B illustrates an exemplary user-designated favorites screen 620 that is displayed in some embodiments in response to a user selection of affordance 612 (FIG. 6A). Favorites screen 620 has one or more affordances (e.g., 622-625) identifying user-designated contacts. A call may be placed by selecting one of affordances 622-625. An affordance representing a user-designated contact may optionally include an information icon 621 for accessing additional information regarding the contact on a user interface screen referred to as a contact card. A contract card provides contact information such as contact name, phone number and/or addresses (optionally shown on a map). A contact card may also have affordances for initiating communication with contact, such as by audio and/or video call, as well as via messages (e.g., short messages via services such as SMS and MMS, text messages via services such as iMessage® provided by Apple, Inc. of Cupertino, Calif., e-mail messages). User-designated favorites screen 620 is scrollable to reveal additional affordances representing user-designated contacts. In some embodiments, favorites screen 620 is scrolled via touch input. In some embodiments, favorites screen 620 is scrolled in response to movement of a rotatable input mechanism of device 600.

Figure 6C:
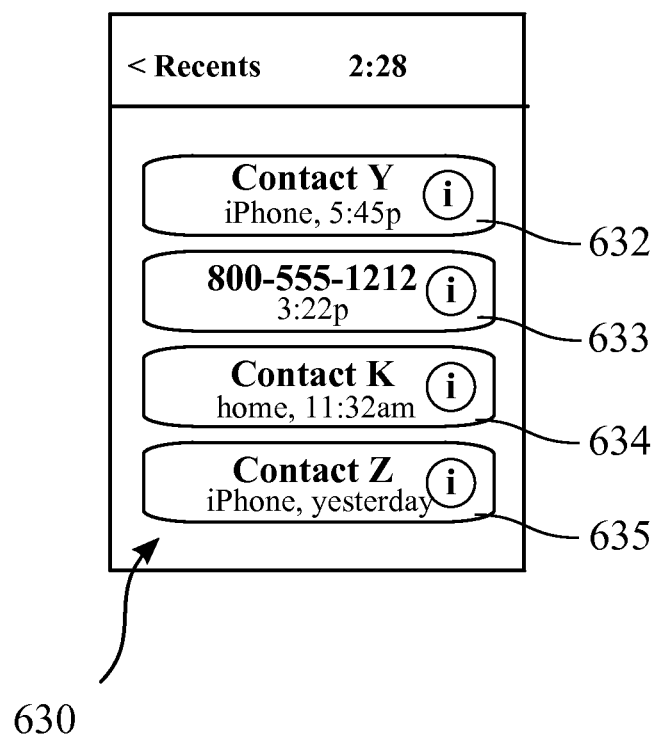

FIG. 6C illustrates exemplary recent calls screen 630, which is displayed in some embodiments in response to a user selection of affordance 613 (FIG. 6A). Recent calls screen 630 has affordances indicating recent incoming and/or outgoing calls, such as affordance 632-635. Affordances representing recent calls may include additional information about the call—such as the identity of the call's participant (s), a phone number or other identifier associated with the call, the duration of the call, the time of the call, so forth. A user may select a displayed affordance to call the represented participant(s). An affordance representing a recent call may optionally include an information icon for accessing additional information regarding the represented contact, e.g., by displaying a corresponding contact card. Recent calls screen 630 is scrollable to reveal additional affordances representing recent calls. In some embodiments, recent calls screen 630 is scrolled via touch input. In some embodiments, recent calls screen 630 is scrolled in response to movement of a rotatable input mechanism of device 600.

Figure 6D:
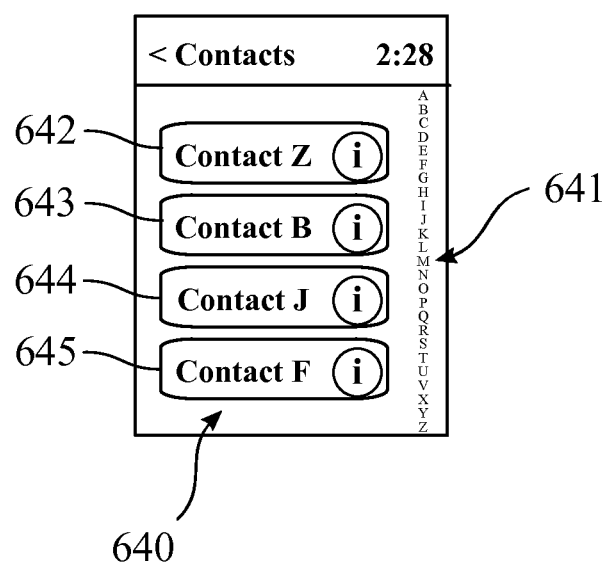

FIG. 6D illustrates exemplary contacts screen 640, which is displayed in some embodiments in response to a user selection of affordance 614 (FIG. 6A). Contacts screen 640 has affordances representing contacts that are accessible to device 600, such as contact affordances 642-645. A user may select a displayed affordance to initiate a call to the represented contact. An affordance representing a contact may optionally include an information icon for accessing additional information regarding the represented contact, e.g., by displaying a corresponding contact card. Contacts screen 640 is scrollable to reveal additional affordances representing user-designated contacts. In some embodiments, contacts screen 640 is scrolled via touch input. In some embodiments, contacts screen 640 is scrolled in response to movement of a rotatable input mechanism of device 600. In some embodiments, contacts screen 621 has index indicator 641 for scrolling through contact affordances.

Figure 6E:
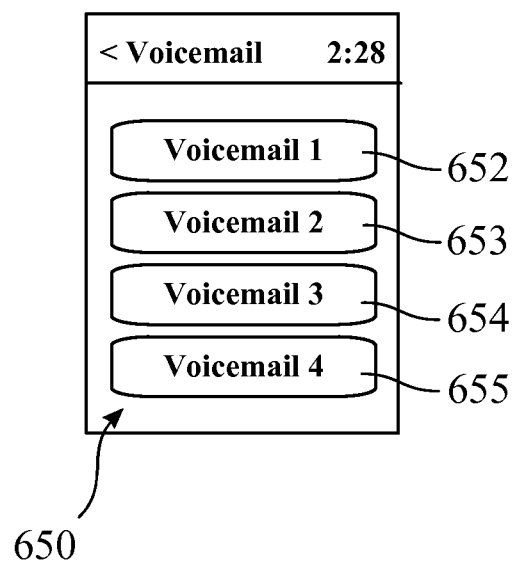

FIG. 6E illustrates exemplary voicemail screen 650, which is displayed in some embodiments in response to a user selection of affordance 615 (FIG. 6A). Voicemail screen 650 has affordances representing voicemail messages that are accessible using device 600, such as affordances 652-655. An affordance representing a voicemail may optionally include information about the voicemail message such as the caller, the duration of the message, the time of the message, an indication of whether the message has been played, so forth.

Figure 6F:
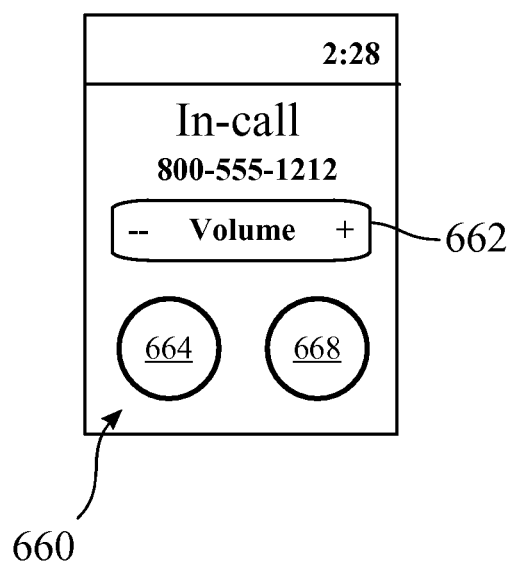

FIG. 6F illustrates exemplary in-call screen 660, which is displayed in some embodiments when a call is in-progress. As shown, in-call screen 660 includes volume control 662, as well as affordance 664 and 668 for accessing call functions. Exemplary call functions include holding the call, ending the call, muting the call, accessing a keypad, and so forth. In-call screen 660 also displays the identity of other call participant(s). In-call screen 660 is responsive to user navigation input. For example, during a call, a user may activate (e.g., touch or a rotate) one of the input mechanisms of device 600 to navigate away from in-call screen 660. When a user navigates away from in-call screen 660 while remaining on a call, device 600 in some embodiments displays an indicator of the in-progress phone call so that the user is aware that the call remains in-progress. This aspect is discussed with reference to FIG. 6G.

FIG. 6G illustrates exemplary user interface screen 670, displayed in response to user navigation away from in-call screen 652 while continuing with a call, in some embodiments. For example, a user may activate (e.g., touch or a rotate) one of the input mechanisms of device 600 while in-call screen 660 is displayed to access another user interface screen on device 600, such as a screen provided by another application. User interface screen 670 may be any user interface screen provided by device 600. In the illustrated example, user interface screen 670 is a modified instance of landing screen 610. In particular, screen 670 includes in-call indicator 676 indicating the status of the in-progress call. In-call indicator 678 includes call participant identifier 677 and a call duration indicator 678. In-call indicator 678 is displayed for the duration of the call (or until the user returns to in-call screen 660). In-call indicator 676 is positioned towards the top of landing screen 670 so as to increase its visibility to a user. The remaining contents of screen 670 are displayed below in-call indicator 676. As shown, voicemail affordance 675 is partially off-screen due to the inclusion of in-call indicator 676. By displaying in-call indicator 686, device 600 provides a user who has navigated away from in-call screen 660 an efficient method of returning to in-call screen 660 for accessing call-related exemplary connection scenarios, and guiding operation principles, is provided in table 1, below. Consider the scenario in which a cellular phone, a wearable electronic device, and a headset are within communication range of one another:

TABLE 1

| Scenario | Operation Principle | Exemplary Illustration |
|---|---|---|
| (1) Headset is paired and connected with cellular phone. Wearable electronic device is paired and connected with cellular phone. | Calling and receiving calls should not require direct user interaction with cellular phone. User may control call functions from wearable electronic device. | FIGS. 7A-7C |
| (2) Headset is not connected with cellular phone. Wearable electronic device is paired and connected with cellular phone | Permit wearable electronic device to queue a call onto cellular phone. | FIGS. 8A-8C |
| (3) Headset is connected to wearable electronic device. Wearable electronic device is not connected with cellular phone. | Subset of phone features still possible, based on user interaction with wearable electronic device. | FIGS. 9A-9B | features. As will be understood, in-call indicator 676 or 686 can be displayed on any user interface screen of the device while a call is in progress in response to user navigation away from in-call screen 652.

FIG. 6G also illustrates exemplary user interface 680 which is a variation of screen 670, displayed in some embodiments under certain usage conditions. In addition to affordances 683-685 for accessing phone features, as well as in-call indicator 686 indicating that a call is in-progress, screen 680 includes an additional application-specific persistent indicator 687. In the illustrated example, application-specific indicator 687 is a music playback indicator showing the current status of a background music player application. Notably, although both indicators 686 and 687 are "persistent" in the sense that they remain displayed to indicate an ongoing process (ceasing to be displayed when the application associated with the process becomes actively displayed), the indicators are still able to accommodate for the presence of one another. In the example of FIG. 6G, in-call indicator 686 moved down-screen in order to accommodate music playback indicator 687.

Figure 6H:
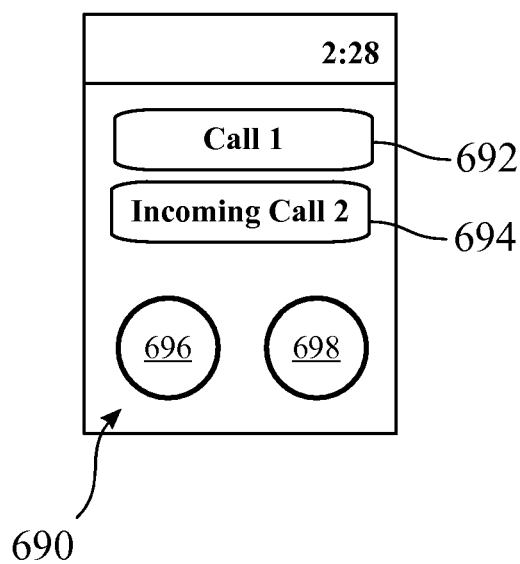

FIG. 6H illustrates exemplary call-waiting screen 690, displayed in some embodiments when an incoming call (e.g., a second call) is received while a first call is in-progress. As shown, call-waiting screen 690 has incoming call identifier 694 identifying the incoming call, affordance text 692 identifying the first call, affordance 696 for answering the second call, and affordance 698 for ignoring the second call. Although not shown, call-waiting screen 690 may have affordances representing additional ways of handling the multiple calls. For example, an affordance can be displayed permitting a user to hang up the first call and answer the second call with a single activation of the affordance.

2. Connection Scenarios

Attention is now directed to how one or more of the above-described user interface screens may be used in handling incoming and outgoing calls, particularly in scenarios where multiple devices that are capable of participating in a call are proximate (e.g., within wireless communication range of one another). Exemplary scenarios are described below with reference to FIGS. 7-9. Before turning to the illustrative examples, however, a brief summary of Turning first to FIGS. 7A-7D, FIG. 7A illustrates an exemplary scenario (1) in which user 700 is in possession of cellular phone 702, wearable electronic device 704, and headset 706. Cellular phone 702 is device 100 (FIG. 1A) in some embodiments. Wearable electronic device 704 is device 500 (FIG. 5A). Headset 706 is a wireless (e.g., Bluetooth-enabled) headset in the illustration but may also be a microphone-equipped, earpiece, headphone, or the like, whether wired or wireless.

Devices 702, 704, 706 are configured to communicate with one another. In some embodiments, operative communication between two devices results from a two-stage process. First, the devices become paired. As used herein, two devices are "paired" if they are registered to communicate with one another. An exemplary pairing process is the Bluetooth pairing process. Another exemplary pairing process is the registration of a WiFi profile for purposes of communicating with another WiFi-enabled device (e.g., an access point or equivalent). Other pairing processes are possible. For example, two devices may each become registered with a cloud-based user identifier, such as an AppleID® provided by Apple, Inc. of Cupertino, Calif. Second, the paired devices share an operative connection. Two paired devices may operatively connect with one another when they come within range of one another. They may rely on information obtained during the pairing process, such as the use of an authentication token, in order to create an operative connection. One situation in which two nearby, paired devices are not operatively connected arise when one device is powered-off or in airplane mode.

In some embodiments actual operative communication can result from an ad hoc connection. Although pairing is sometimes a pre-requisite to establishing communication, (such as under communication protocols like Bluetooth), a lack of pairing in these embodiments do not necessarily preclude two devices from forming an ad hoc communication session, thereby becoming operatively connected, in certain embodiments.

Figure 7A:
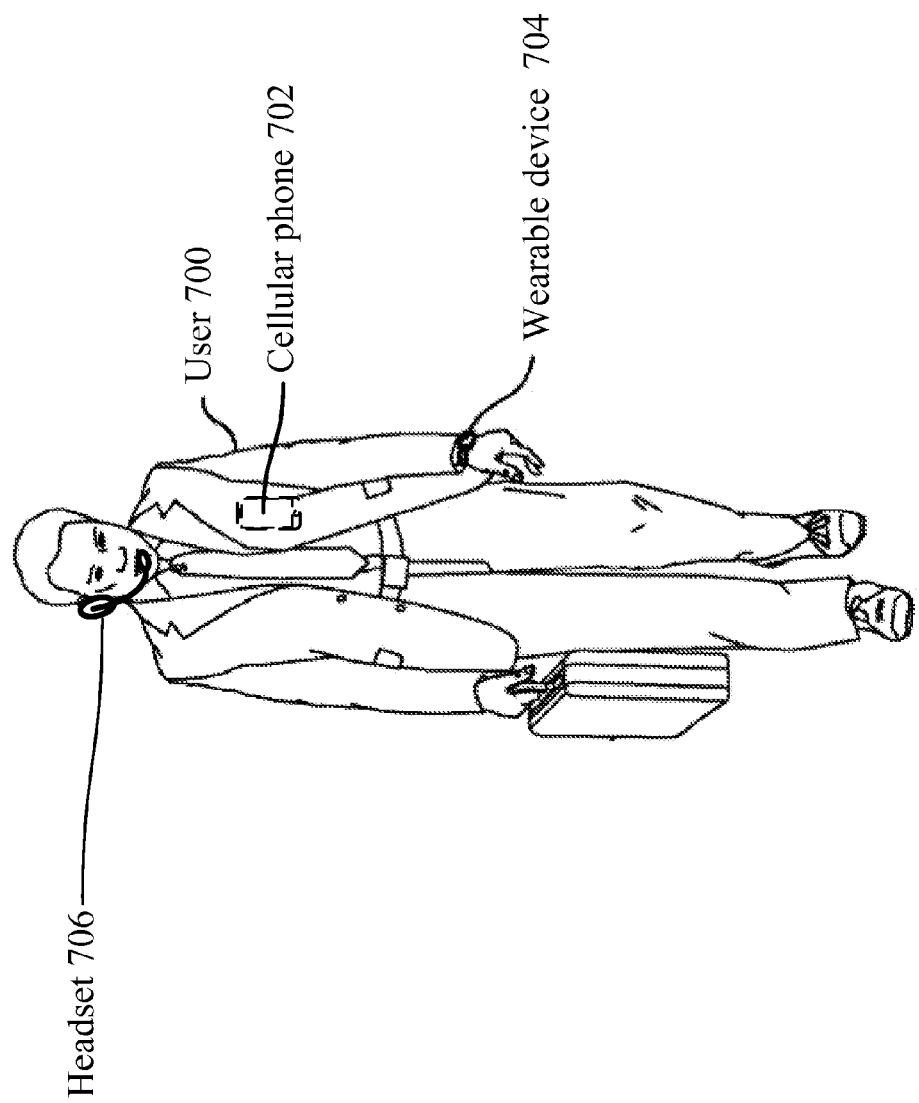
FIGS. 7A-7E illustrate exemplary user interfaces for accessing phone features among multiple devices.

In the illustrated scenario of FIG. 7A, wearable electronic device 704 is paired with and operatively connected to cellular phone 702; headset 706 is paired with and operatively connected to cellular phone 702. Cellular phone 702 has cellular circuitry necessary for placing and receiving a (cellular) phone call.

Figure 7B:
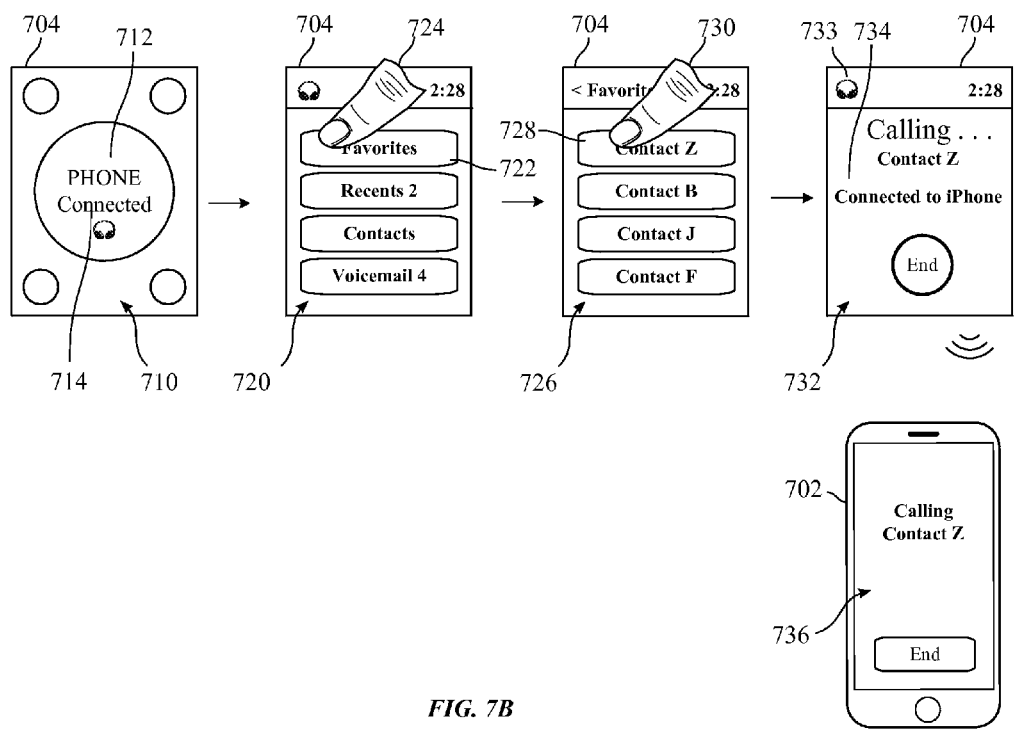

Attention is now directed to how a call may be initiated in this exemplary scenario. Recall from table 1 that in this scenario it is desirable to place the call while requiring little to no user interaction with cellular phone 702. Turning to FIG. 7B, wearable electronic device 704 displays phone affordance 712 for accessing phone functions. Wearable electronic device 704 may, along with affordance 712, display indication 714 of status of connection(s) between devices 702, 704, and/or 706. As shown, status indicator 714 indicates (textually) an operative connection between the wearable electronic device 704 and cellular phone 702, as well as (symbolically via an image) an operative connection between cellular phone 702 and headset 706.

While phone affordance 712 is displayed, a user may select the affordance to access phone landing screen 720. Phone landing screen 720 is screen 610 (FIG. 6A) in some embodiments. A user may select favorite contacts affordance 722 via touch 724 to display phone contacts on screen 726, which is user-designated favorites screen 620 (FIG. 6B) in some embodiments. The listing of contacts includes contact affordance 728 representing "Contact Z." The user may select contact affordance 728 via touch 730 to initiate a call to the represented contact.

To initiate the call, wearable electronic device 704 sends instructions to cellular phone 702 instructing cellular phone 702 to place a call to Contact Z. Upon initiating the call, wearable electronic device 704 displays in-call screen 732 and cellular phone 702 displays calling screen 736. Continuing onto FIG. 7C, after the call has been made (e.g., after a predetermined time or after the call is answered), wearable electronic device 704 displays in-call screen 740, which is in-call screen 660 (FIG. 6F) in some embodiments. In the meantime, cellular phone 702 transitions to displaying exemplary in-call screen 742 which includes an identification for the call and affordance(s) for phone operations such as ending the call. Further, as cellular phone 702 is operatively connected to headset 706, cellular phone 702 communicates with headset 706 so that the headset 706 is used to carry on the call, meaning that a microphone of headset 706 is used to provide input to the call, and a speaker of headset 706 is used to provide output from the call. As shown, in-call screen 740 includes a volume affordance for controlling the output of headset 706.

Figure 7C:
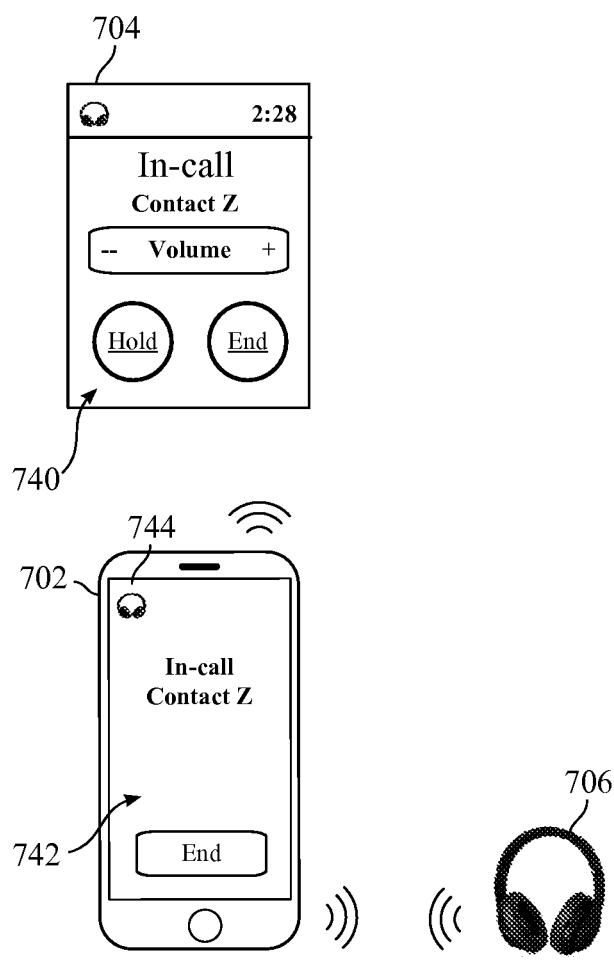
Figure 7D:
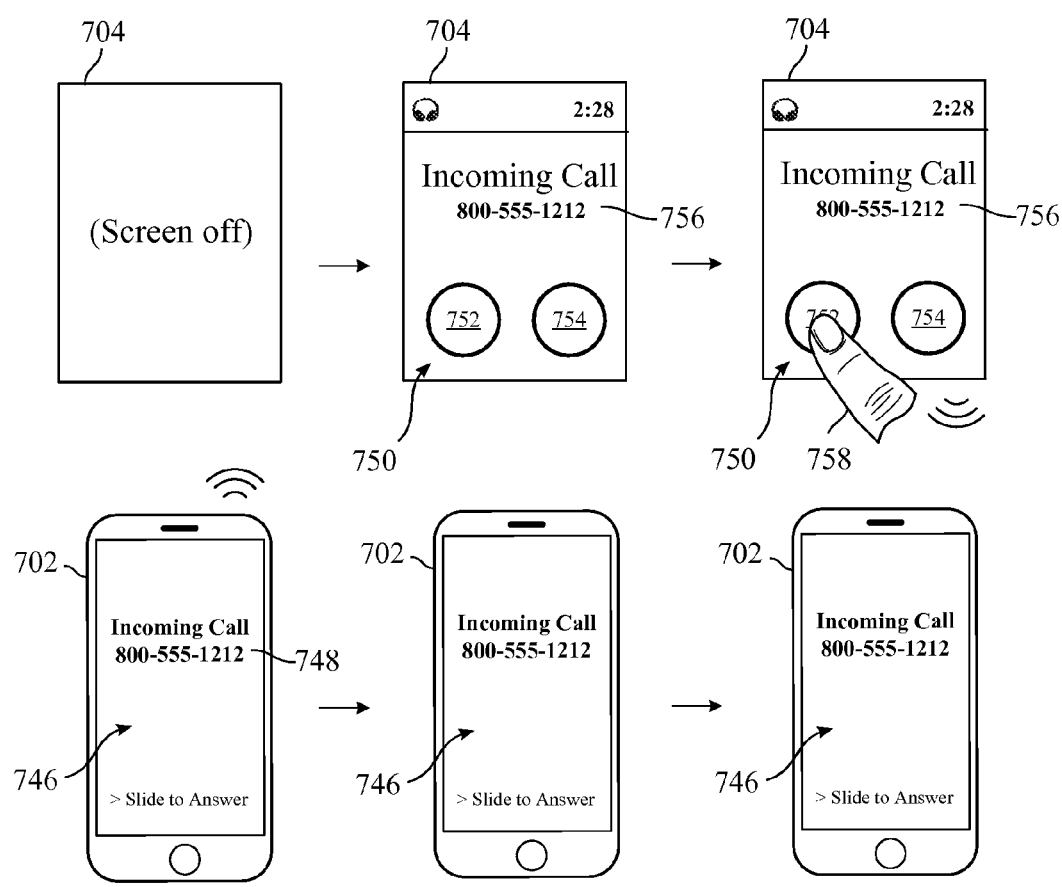
Figure 7E:
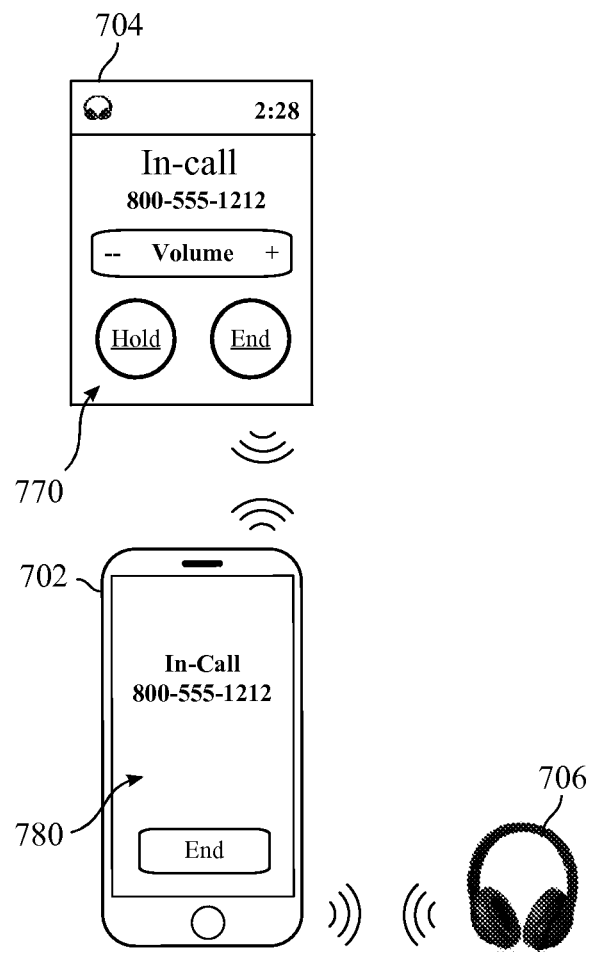

Attention is now directed to how a call may be received in this exemplary device-pairing scenario. Recall from table 1 that in this scenario (1) it is desirable to receive the call while requiring little to no direct user interaction with cellular phone 702. As shown in FIG. 7D, wearable electronic device 704 may have an inactive screen (though the device itself is turned on) while cellular phone 702 receives incoming call 748 and displays incoming call screen 746. Wearable electronic device 704 receives from cellular phone 702 an indication of the incoming call, and in response, displays incoming call screen 750. Incoming call screen 750 has identification 756 identifying the caller. Also, wearable electronic device 704 may produce an audible and/or haptic output alerting the user to the incoming call. Incoming-call screen 750 has exemplary accept affordance 752 for accepting the call and exemplary decline affordance 754 for declining the call.

If a user selects accept affordance 752 as indicated by touch 758, wearable electronic device 704 sends an indication to cellular phone 702 indicating user acceptance. Continuing onto FIG. 7E, in response to the user acceptance, cellular phone 702 answers the incoming call and uses headset 706 for carrying on the answered call. Wearable device 704 then displays in-call screen 770, which is in-call screen 660 (FIG. 6F) in some embodiments. In-call screen 770 includes a volume affordance for controlling the output of headset 706.

Although not shown, it is possible for the user to select decline affordance 754 while incoming-call screen 750 is displayed on wearable electronic device 704. When this occurs, wearable electronic device 704 sends an indication to cellular phone 706 indicating the user's refusal of the incoming call. Cellular phone 702, in turn, declines the incoming call and ceases to display incoming-call screen 730, thereby returning to the user interface screen that was displayed prior to incoming-call screen 750 (or turns off its display if no prior user interface screen was being displayed). Also, although not shown, headset 706 may be wired (or wireless).

Turning to FIGS. 8A-8E, FIG. 8A illustrates an exemplary scenario (2) in which user 800 has possession of cellular phone 802 and wearable electronic device 804, but no headset. Cellular phone 802 is device 100 (FIG. 1A) in some embodiments. Wearable electronic device 804 is device 500 (FIG. 5A) in some embodiments. In the illustrated scenario, wearable electronic device 804 is paired with and operatively connected to cellular phone 802. Cellular phone 802 is not operatively connected to a headset, even though it may be paired with one.

Attention is now directed to how a call may be initiated in this scenario. Recall from table 1 that in this scenario (2) it is desirable to permit wearable electronic device 804 to queue a call onto cellular phone 802, thereby allowing user 800 to primarily interact with wearable electronic device 804 to initiate a call, but carry on the phone call using the microphone and speaker (e.g., earphone) of cellular phone 806. (The use of cellular phone 806 in this instance avoids the use of a speakerphone on wearable electronic device 804, which may be less private.) In situations where wearable electronic device 804 is more conveniently accessible than cellular phone 806, this feature reduces the burdens placed on the user-particularly when answering an incoming call—thereby improving the overall user experience.

Figure 8A:
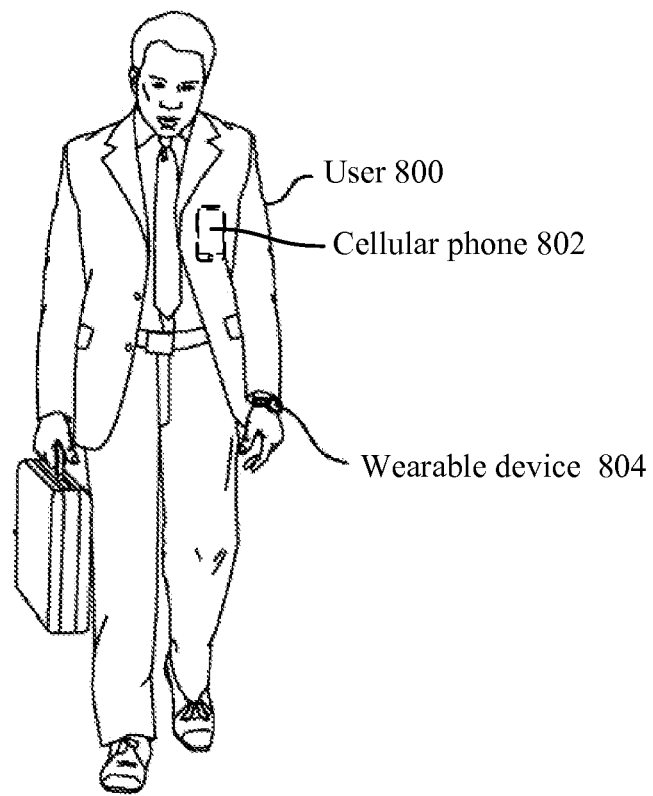
FIGS. 8A-8E illustrate exemplary user interfaces for accessing phone features among multiple devices.
Figure 8B:
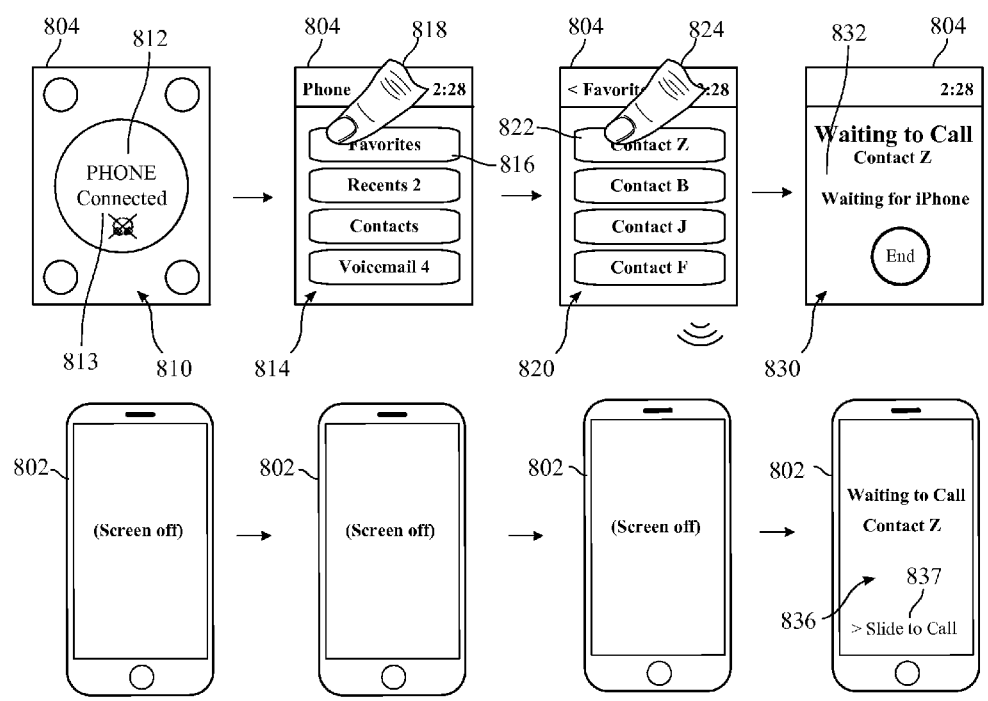

As shown in FIG. 8B, wearable electronic device 804 displays phone affordance 812 for accessing phone functions. Wearable electronic device 804 may determine that wearable electronic device 804 is operatively connected to cellular phone 802, but cellular phone 802 is not operatively connected to a headset. Wearable electronic device 804 may display, along with affordance 812, indications of these connection statuses. As shown, affordance. 812 has indication 813 which textually indicates that wearable electronic device 804 is operatively connected to cellular phone 802, and symbolically indicates that cellular phone 802 is not operatively connected to a headset.

As shown, a user may select affordance 812 to access phone landing screen 814. Phone landing screen 814 is screen 610 (FIG. 6A) in some embodiments. A user may select user-designated favorites affordance 816 to retrieve a listing of phone contacts on user-designated favorites screen 820, via touch 818. Screen 820 includes affordance 822 representing "Contact Z." The user may select contact affordance 820 to initiate a call to the represented contact (e.g., Contact A), via touch 824.

To initiate the call, wearable electronic device 804 sends instructions to cellular phone 802 instructing cellular phone 802 to initiate a call to Contact Z. Instead of placing the call immediately, however, cellular phone 802 displays call-queuing screen 832. Call-queuing screen 832 indicates that cellular phone 802 is ready to place a call, but that an additional user input is required. In the illustrated example the required user input is a swipe input, as indicated by instruction text 837, though other inputs such as a touch or activation of a button may be used. In the meantime, wearable electronic device 804 displays call-queuing screen 830 to indicate that the call to Contact Z is being queued on cellular phone 802.

Figure 8C:
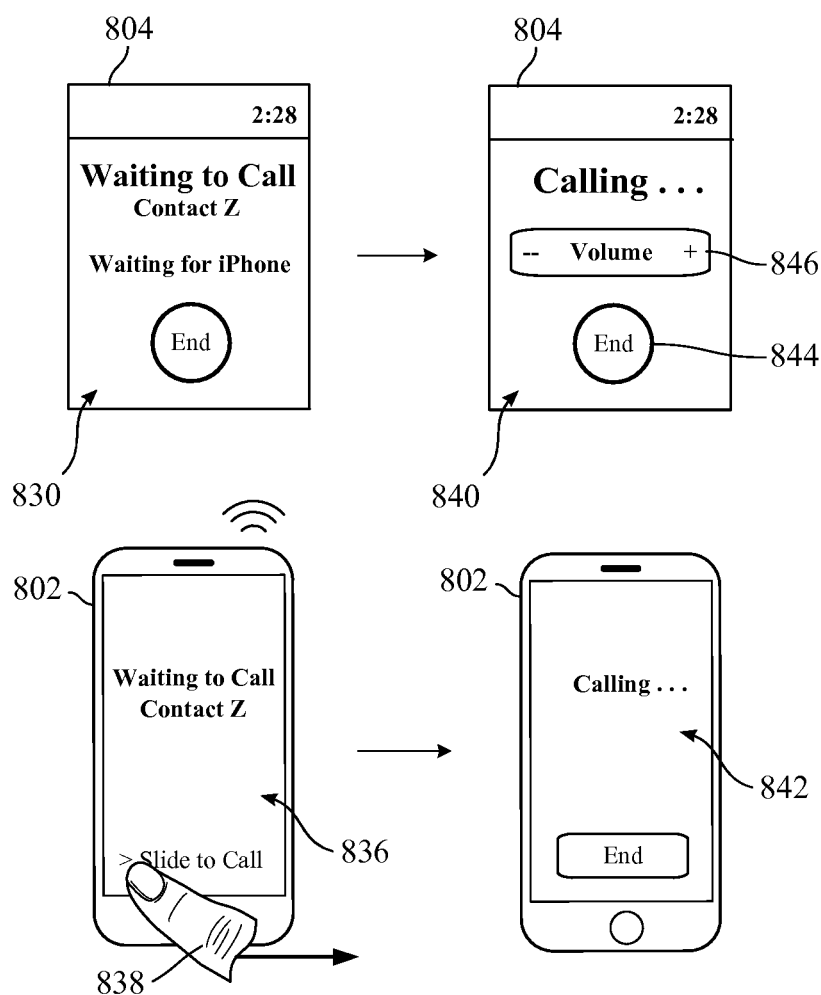

Continuing to FIG. 8C, when cellular phone 802 receives swipe input 838, it places the call to Contact Z and displays calling screen 842. Cellular phone 802 may also send data to wearable electronic device 804 indicating that the call has been placed. In response, wearable electronic device 804 displays calling screen 842. Calling screen 840 includes affordance 844 for ending the call and volume affordance 846 for controlling a volume of the speaker of cellular phone 802, which is being used for carrying on the call, as there is no connected headset.

In the above-described technique, cellular phone 802 queues up a requested call instead of calling immediately so as to provide user 800 an opportunity to retrieve cellular phone 802 from a nearby location (e.g., pocket, table). Because the phone call, once placed, would utilize the speaker and microphone of cellular phone 802, it is beneficial to allow user 800 an opportunity to gain physical control of cellular phone 802 before initiating the call.

Figure 8D:
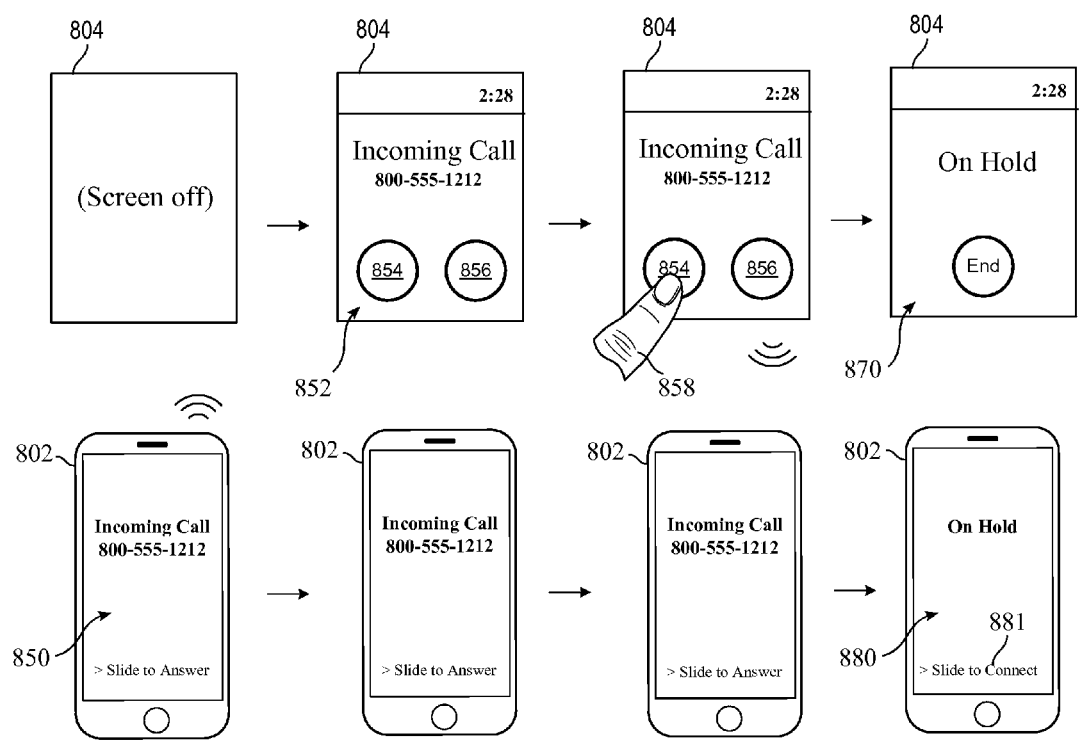

Attention is now directed to how a call may be received in this exemplary device-pairing scenario. As shown in FIG. 8D, wearable electronic device 804 may be inactive (though powered-on) when cellular phone 802 receives an incoming call. Wearable electronic device 804 may receive from cellular phone 802 an indication of the incoming call, and in response, display in-coming call screen 852. Wearable electronic device 804 may also produce an audible and/or haptic output alerting user 800 to the incoming call. Incoming-call screen 852 has affordance 854 for accepting the call and affordance 856 for declining the call.

In response to a user selection of affordance 854 (e.g., via touch 858), wearable electronic device 804 sends an indication to cellular phone 802 indicating user acceptance of the call. Instead of enabling the speaker and microphone of cellular phone 802 immediately, however, cellular phone 802 holds call and displays call-holding screen 880 to indicate that the incoming call has been held. Call-holding screen 880 indicates in region 881 that the call will be un-held if a user provides a swipe input. In the meantime, wearable electronic device 804 displays call-holding screen 870 to indicate that the incoming call has been held.

Figure 8E:
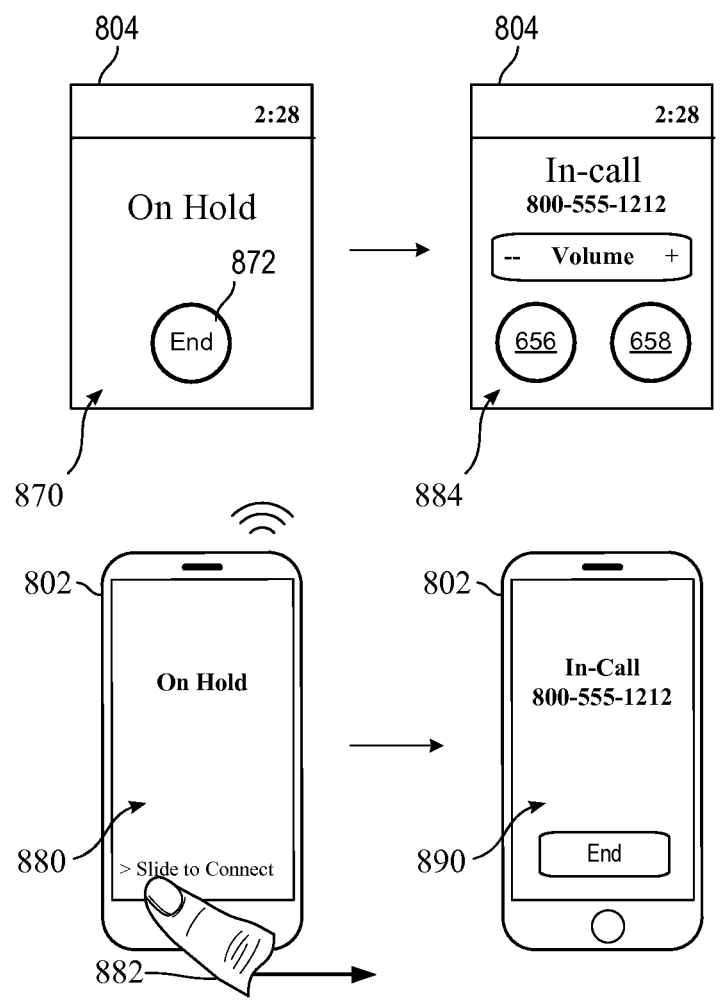

Continuing to FIG. 8E, in response to swipe input 884 on slide-to-connect affordance 862, cellular phone 804 un-holds the call and displays in-call screen 890. Once un-held, cellular phone 802 enables its microphone and speaker so user 800 may participate in the call. Cellular phone 802 also sends data to wearable electronic device 804 indicating that the call has been un-held. In response, wearable electronic device 804 replaces the display of call-holding screen 870 with in-call screen 884. In-call screen 884 is screen 660 (FIG. 6F) in some embodiments.

Returning to call-holding screen 870, while call-holding screen 870 is displayed by wearable electronic device 804, a user may select end-call affordance 872 to hang-up the incoming phone call that has been held. Optionally, while the call is being held, an audio message is played to the caller informing the caller that the phone call is being held. The message may also ask the caller to hold the line so as to permit user 800 an opportunity to participate verbally in the call.

Figure 9A:
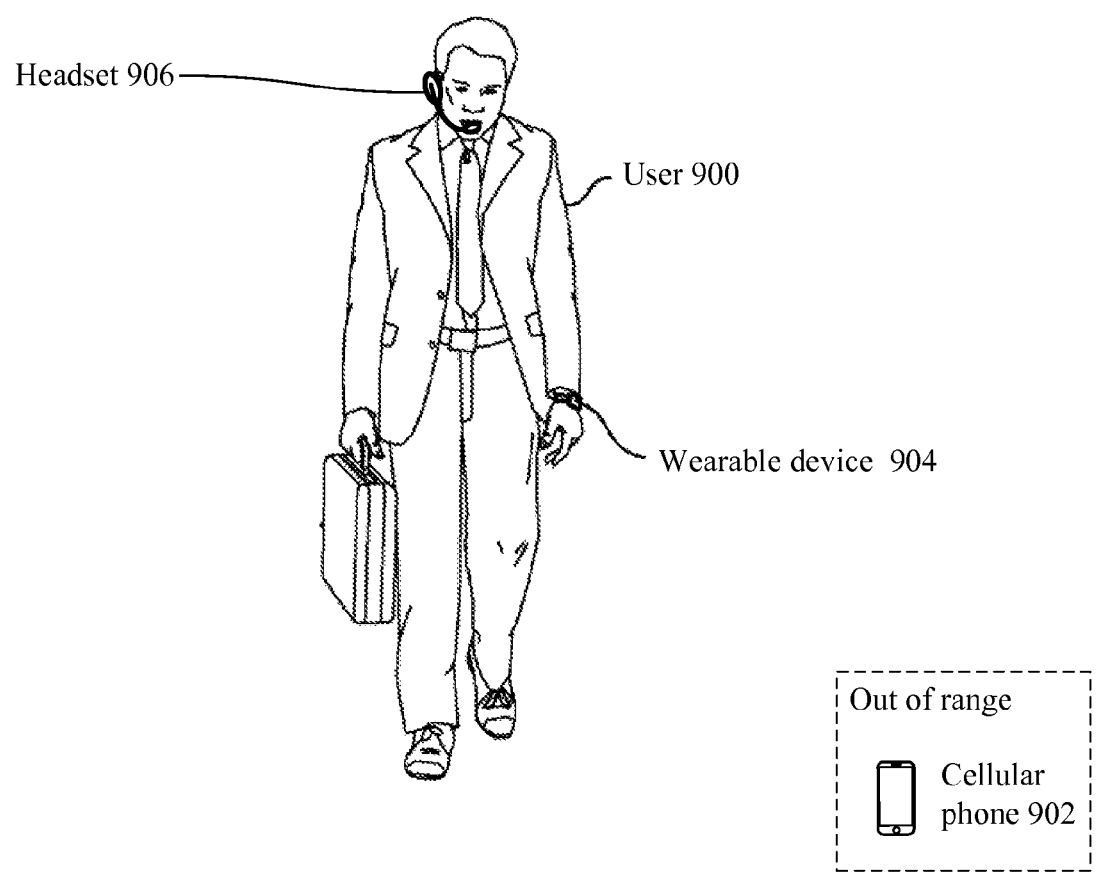
FIGS. 9A-9B illustrate exemplary user interfaces for accessing phone features among multiple devices.
Figure 9B:
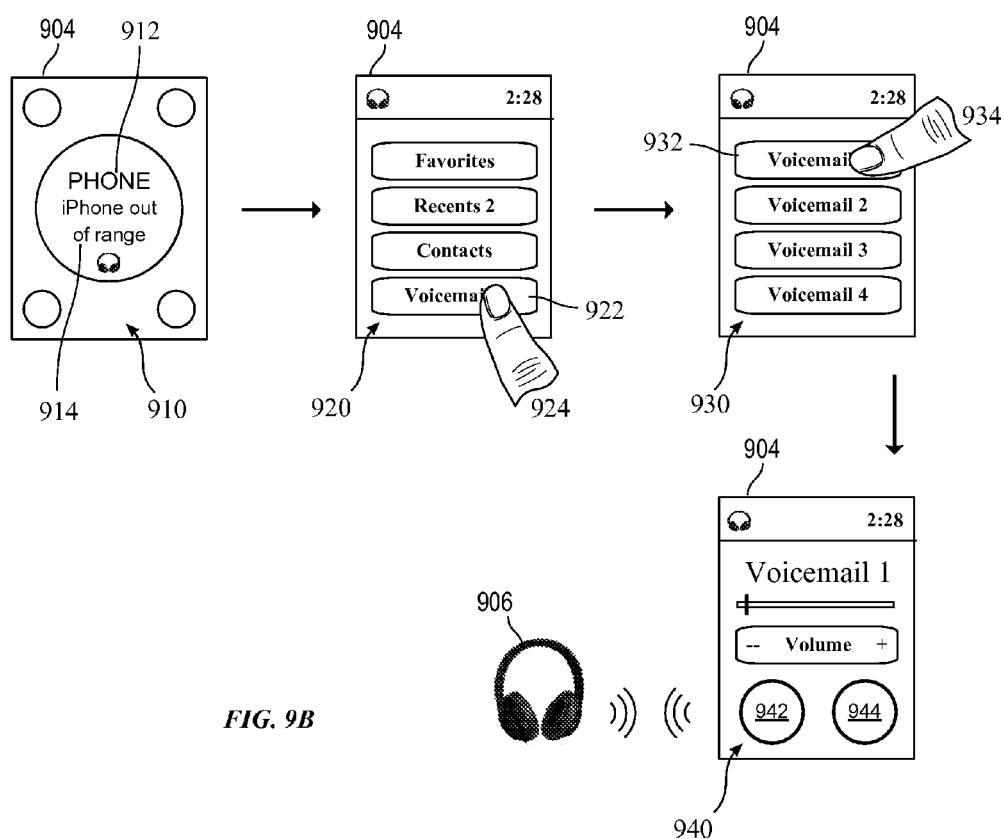

Turning to FIG. 9A-9B, FIG. 9A illustrate an exemplary scenario (3) in which user 900 has in his possession wearable electronic device 904 and headset 906, but not cellular phone 902. Wearable electronic device 904 is device 500 (FIG. 5A) in some embodiments. Cellular phone 902 may be unavailable because it is out of range.

Recall from table 1 that in this scenario it is still preferable for wearable electronic device 904 to provide some phone-related functionalities. For instance, wearable electronic device 904 may permit the retrieval of voicemail messages. This aspect is discussed with respect to FIG. 9B. As shown in FIG. 9B, wearable electronic device 904 displays user interface screen 910 having phone affordance 912. Phone affordance 912 may include indication 914 of the wearable electronic device's communication status with cellular phone 902 and headset 906. In response to a selection of phone affordance 912, wearable electronic device 904 displays phone landing screen 920. Landing screen 920 is landing screen 610 (FIG. 6A), or a modified instance thereof, in some embodiments. For instance, landing screen 910 may have a reduced number of affordances as compared with landing screen 610, excluding an affordance for accessing phone contacts that may be stored on cellular phone 902, for example.

In the illustrated example, landing screen 910 includes voicemail affordance 922 for accessing voicemail even when wearable electronic device 904 is not operatively connected to a cellular phone. In response to a user selection of voicemail affordance 922 via touch 924, wearable electronic device 904 displays voicemail screen 930. Voicemail screen 930 may have affordances representing voicemail messages, including affordance 932. In response to a user selection of voicemail affordance 932, wearable electronic device 904 displays voicemail playback screen 940, which indicates the voicemail message being played, and has affordances for accessing the voicemail message, such as affordance 942 to play the message and affordance 944 to delete the message. In response to a selection of playback affordance 942, wearable electronic device 902 initiates playback of the message on headset 906, meaning that the audio portion of the voicemail message is played on a speaker of headset 906. In some embodiments, when headset 906 is not operatively connected to wearable electronic device 902 (not shown), wearable electronic device 902 may playback the voicemail message on its internal speaker.

Wearable electronic device 904 also may be able to perform other phone-related functions. In some embodiments, wearable electronic device 904 can display recent calls. In some embodiments, wearable electronic device 904 can display notification regarding missed calls, which may be received via a communication (e.g., WiFi) unit of device 904.

3. Phone and Headset Transitions

When a wearable electronic device is operatively connected to a cellular phone and the cellular phone is in turn operatively connected to a headset, a user may find it useful under some circumstances to carry on a phone call using the headset, and at other times, using the internal speaker and microphone of the cellular phone. Attention is now directed to user interfaces for making this transition, with reference to FIGS. 10A-10C and 11A-11C.

In some embodiments, user interfaces for transitioning between headset and cellular phone usage are responsive to the touch intensity of user input. Because wearable electronic devices are compact in design, they tend to have small surface areas for the configuration of touch-sensitive and/or mechanical input mechanisms (e.g., buttons). The addition of a touch-intensity based input modality is helpful in that it permits additional user interaction techniques to be incorporated while preserving the overall form factor of the device. This aspect is discussed with reference to FIGS. 10A-10C.

Figure 10A:
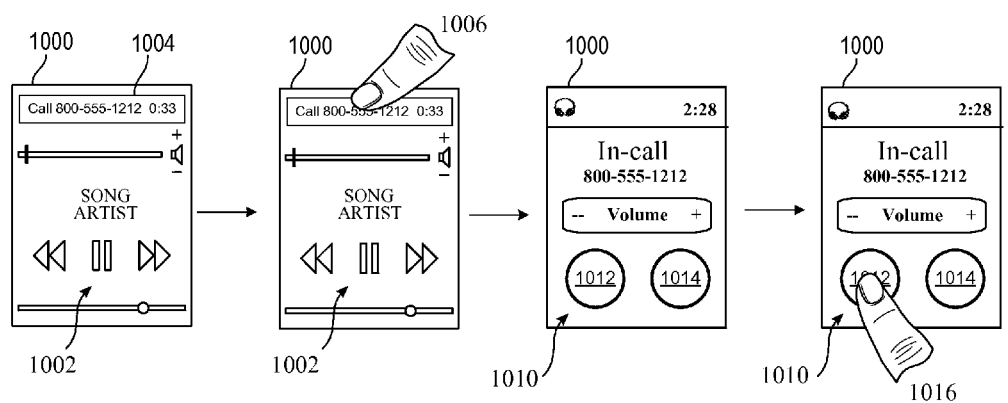
FIG. 10A-10C illustrate exemplary user interfaces for accessing phone features among multiple devices.

FIG. 10A depicts wearable electronic device 1000 which is device 500 (FIG. 5A) in some embodiments. As shown, wearable electronic device 1000 has determined that a phone call is in-progress. In this example, the cellular communications of the phone call are being handled by a companion cellular phone 1040, while the input to and output from the phone call are handled by a headset that is operatively connected to cellular phone 1040.

Wearable electronic device 1000 is displaying music playback screen 1002. Music playback screen 1002 is displayed in some embodiments in response to a user's selection of the music application during the phone call. Music screen 1000 includes in-call indicator 1004 indicative of the in-progress call. In-call indicator 1004 is responsive to user input, such as touch 1006, in that in-call indicator 1004, when selected, causes device 1000 to display in-call screen 1010. In-call screen has affordance 1012 for placing the in-progress phone call on hold, and affordance 1014 for ending the call. A user may access additional phone-related features through a high-intensity touch 1016 on device 1000. In the illustrated example, high-intensity touch 1016 is received at a position of affordance 1012.

Figure 10B:
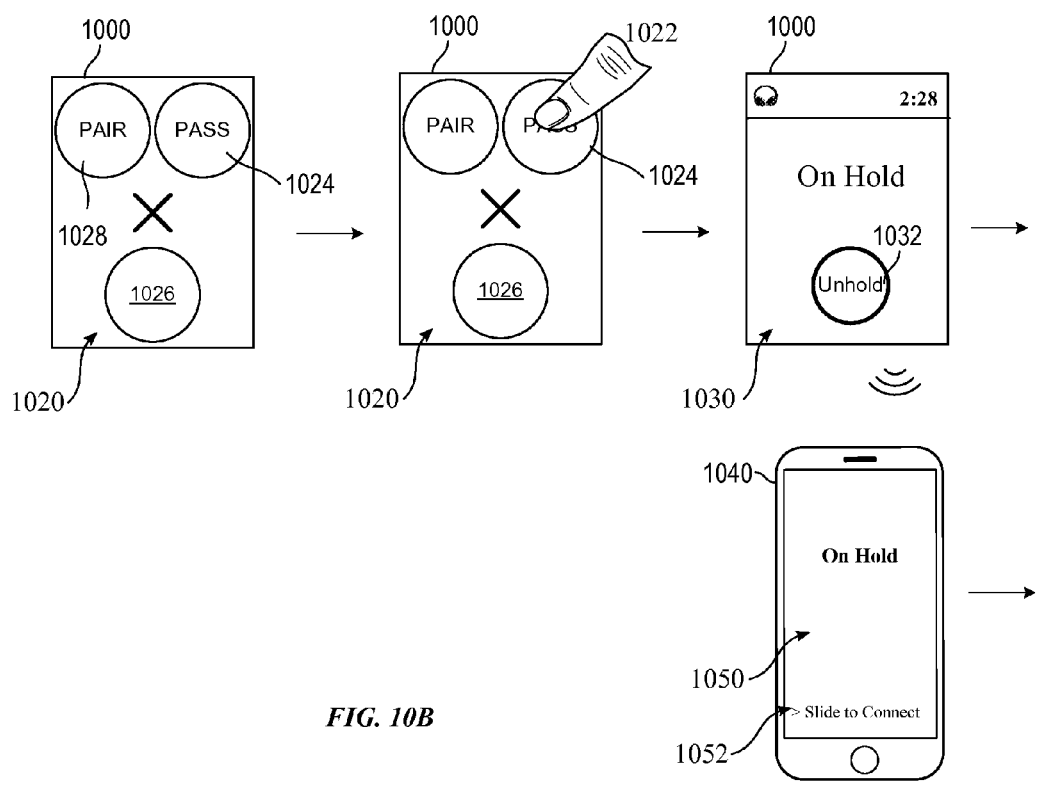

Continuing to FIG. 10B, because the touch is of high intensity (e.g., high characteristic intensity), instead of carrying out a feature corresponding to affordance 1012, device 1000 displays exemplary user interface screen 1020, which has affordances for accessing additional phone-related features (if touch 1016 is of a low intensity, device 1000 carries out the feature associated with affordance 1012 instead, e.g., holding the call).

Secondary features screen 1020 includes affordance 1024 for transferring the in-progress call to a cellular phone, meaning to use the internal speaker and microphone of the cellular phone to carry on the call, instead of the headset. Screen 1020 also includes affordance 1028 for configuring device pairings. For example, a user can select affordance 1028 to pair additional headsets. Screen 1020 may also include additional affordance(s) (e.g., 1026) for invoking other functions, such as for displaying a telephone keypad for navigating an interactive voice response system.

In response to user selection 1022 of affordance 1024, device 1000 sends an instruction to cellular phone 1040 instructing cellular phone 1040 to take over the phone call from the headset. In response, cellular phone 1040 places the call on hold and displays call-holding screen 1040. In the meantime, wearable electronic device 1000 also transitions to call-holding screen 1030. Call-holding screen 1050 on cellular phone 1040 includes label 1022 informing the user the call may be retrieved via user input, e.g., a swipe input. Call-holding screen 1030 on wearable electronic device 1000 includes affordance 1032 for un-holding and continuing with the call using the headset as before. Restated, the user may "pull back" the call even after selecting affordance 1024 to pass the call the cellular phone 1040.

Although not illustrated, in some embodiments, in response to user input 1022, cellular phone 1040 does not place in-progress call on hold; rather, the call continues via the headset while cellular phone 1040 awaits user input (e.g., a swipe input). When the swipe input is detected, cellular phone 1040 switches to its microphone and speaker (and disables those on the headset) to that the user may continue the phone call on cellular phone 1040. In these embodiments, it is also not necessary for wearable electronic device to display on-hold screen 1030. Instead, wearable electronic device may transition from secondary functions screen 1020 to in-call screen 1010 while the in-progress call is transitioned from the headset over to the internal microphone and speaker of cellular phone 1040.

Figure 10C:
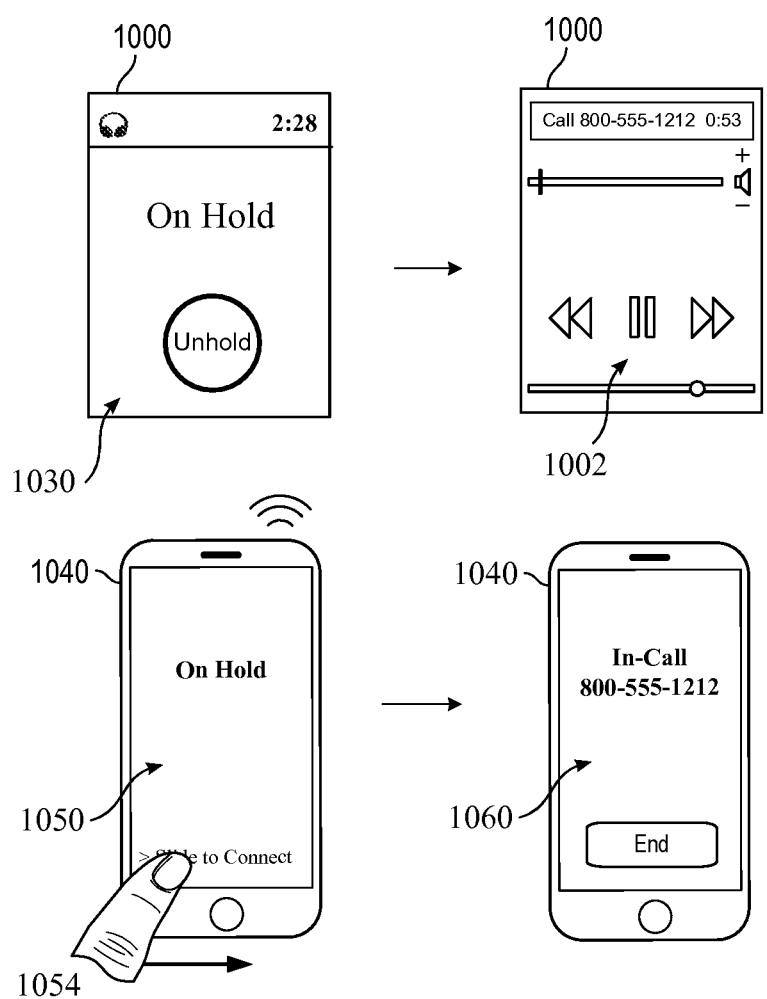

Turning to FIG. 10C, in response to swipe input 1054, cellular phone 1040 un-holds the call, enables its speaker and microphone for purposes of participating in the call, and displays in-call screen 1040. In the meantime, wearable electronic device 1000 returns to music playback screen 1002.

Figure 11A:
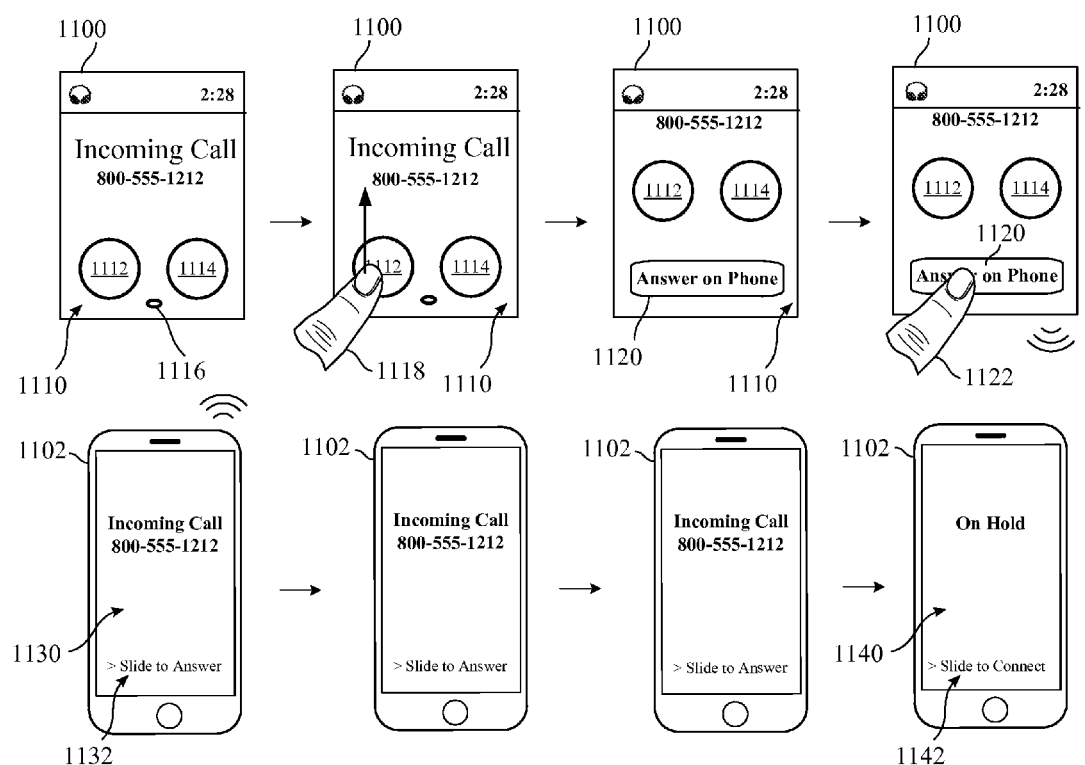
FIGS. 11A-11C illustrate exemplary user interfaces for accessing phone features among multiple devices.
Figure 11B:
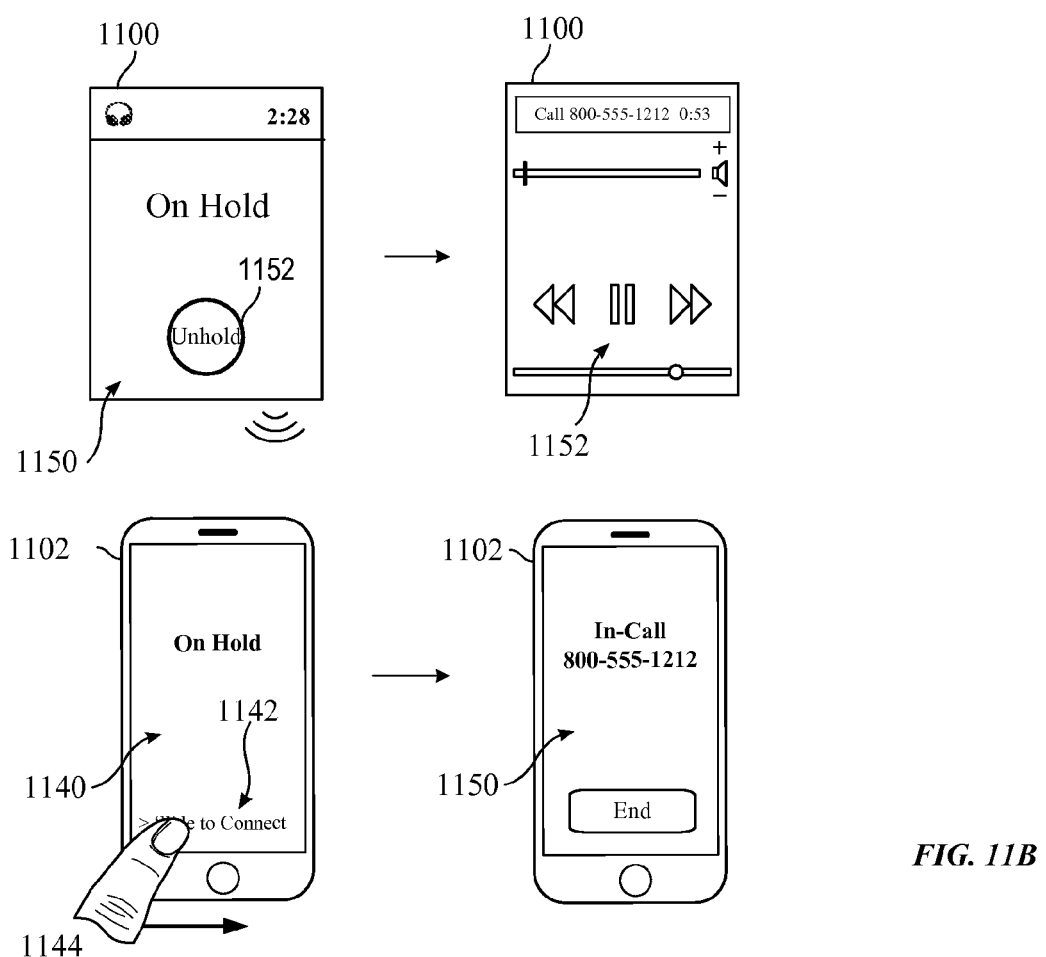
Figure 11C:
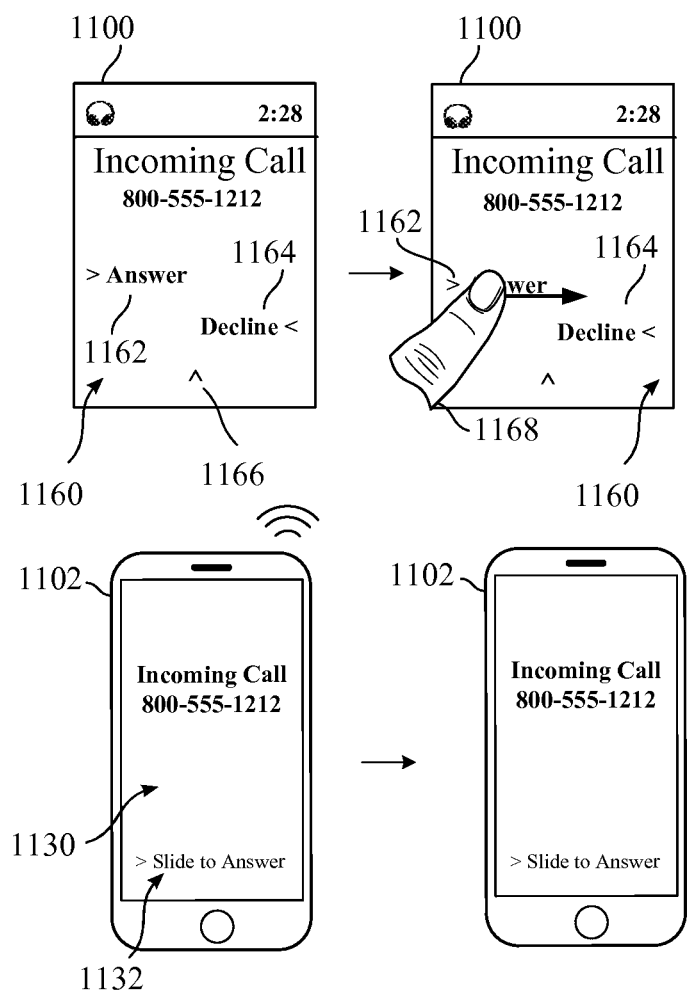

Additional exemplary user interfaces for transitioning between headset and cellular phone usage are discussed with reference to FIGS. 11A-11C. As shown in FIG. 11A, cellular phone 1102 is receiving an incoming call and displays incoming-call screen 1130. Cellular phone 1102 is device 100 (FIG. 1A) in some embodiments. Wearable electronic device 1100 receives an indication of the incoming call from cellular phone 1102 and also displays incoming-call screen 1110. Wearable electronic device 1100 is device 500 (FIG. 5A) in some embodiments. Optionally, wearable electronic device 1100 may issue a haptic or audio alert informing the user of the incoming call.

Incoming-call screen includes affordance 1112 for answering call. Consistent with the discussion above regarding usage scenarios, if affordance 1112 is selected to answer the incoming call while cellular phone 1102 is operatively connected to a headset, the headset will be used for carrying on the call. A user may wish, however, to participate on the call using another device, such as by using the internal speaker and microphone of cellular phone 1102. In this situation, while incoming-call screen 1110 is displayed on wearable electronic device 1100, the user may provide swipe input 1118 to reveal affordance 1120. Affordance 1120, when selected, causes the incoming call to be placed on hold so that the user can access cellular phone 1102 to answer the call. As shown in FIG. 11A and continuing onto FIG. 11B, in response to selection 1122 of affordance 1120, the incoming call is placed on hold, and cellular phone 1102 displays on-hold screen 1140 informing the user via instruction label 1142 that the phone call can be retrieved by certain user input, in this case a swipe input. In the illustrated example, incoming call screen 1110 has affordance 1116 indicating the availability of additional features that are not displayed, such as affordance 1112 for answering the call cellular phone 1102.

The user can retrieve the call on cellular phone 1102 by swipe input 1144, which causes cellular phone 1102 to un-hold the call and enable its speaker and microphone for participation in the call. As shown, responsive to swipe input 1144, device 1150 un-holds the phone call and transitions to in-call screen 1150. In the meantime, wearable electronic device 1100 returns to user interface screen 1152, in this case a music playback screen that was displayed prior to the incoming call. Note that, while call-holding screen 1150 is displayed on wearable electronic device 1100, the user may select un-hold affordance 1152 to continue with the call as before, meaning to continue using the headset for communication. Restated, the user may "pull back" the call even after selecting affordance 1120 (FIG. 11A) to pass the call to cellular phone 1102.

In addition to affordance 1120, incoming-call screen 1110 may include affordances for accessing other phone-related features. For example, instead of verbally answering the incoming call, a user may wish to reply with a text message stating that the user is busy and cannot talk at the moment. The user may also wish to send other messages such as those containing emoji. U.S. Provisional Patent Application Ser.

No. 62/044,923, entitled "USER INTERFACE FOR RECEIVING USER INPUT," filed Sep. 2, 2014; and U.S. Provisional Patent Application Ser. No. 62/127,800, entitled "USER INTERFACE FOR RECEIVING USER INPUT," filed Mar. 3, 2015 describe user interfaces for efficiently obtaining user input that would be helpful in the context of incoming-calls screen 1110. Each of these applications which is hereby incorporated by reference in their entirety. For example, incoming-calls screen 1110 can provide access to affordances for ignoring an incoming call and sending a suggested response, such as "can I call you back?" to the caller. As another example, incoming-calls screen 1110 can provide access to affordances for selecting and customizing an emoji to be sent to the caller. As an additional example, incoming-calls screen 1110 can provide access to an interface for transcribing a user's speech utterance into a message for the caller. As yet another example, incoming-calls screen 1110 can provide access to a reduce-sized keyboard interface for inputting a message for the caller.

In some embodiments, an incoming call may be answered or rejected using any form of user input, including a touch input and/or a swipe input. For example, as shown in FIG. 11C, cellular phone 1102 is receiving an incoming call and displays incoming-call screen 1130. Cellular phone 1102 is device 100 (FIG. 1A) in some embodiments. Wearable electronic device 1100 receives an indication of the incoming call from cellular phone 1102 and displays incoming-call screen 1160. Wearable electronic device 100 is device 500 (FIG. 5A) in some embodiments. Optionally, wearable electronic device 1100 may issue a haptic or audio alert informing the user of the incoming call.

Incoming-call screen 1160 includes visual object 1162. The visual object 1162 may be indicative of a first direction (e.g., a first horizontal direction). In response to a user input 1168 (e.g., a swipe input) anywhere on the display of the wearable electronic device in the indicated first direction (e.g., left to right), the incoming call may be answered. Incoming-call screen 1160 further includes visual object 1164 for declining the call. The visual object 1164 may be indicative of a second direction (e.g., different than the first direction) (e.g., a second horizontal direction). In response to a user input (e.g., a swipe input) anywhere on the display of the electronic device in the indicated second direction (e.g., right to left), the incoming call may be declined. In some examples, the visual object 1162 may be a first affordance, and a user may select the first affordance by dragging the first affordance in a first direction (e.g., rightward direction) to answer an incoming call. In some examples, the visual objet 1164 may be a second affordance and a user may select the second affordance by dragging the second affordance in a second direction (e.g., leftward direction) to decline the incoming call.

In some instances, a user may wish to participate on the call using another device, such as by using the internal speaker and microphone of cellular phone 1102. In this situation, while incoming-call screen 1160 is displayed on wearable electronic device 1100, the user may provide a user input (e.g., a swipe input) in a third direction (e.g., different than the first direction and/or different than the second direction) to reveal one or more affordances, such as the affordance 1120 (FIG. 11A), as described. In some examples, the incoming-call screen 1160 may include a visual object 1166 indicative of the third direction.

Consistent with the discussion above regarding usage scenarios, if the user input is provided to answer the incoming call while cellular phone 1102 is operatively connected to a headset, the headset will be used for carrying on the call.

In some embodiments, the electronic device may be incompatible with one or more types of incoming calls. Accordingly, in some instances, the electronic device can determine whether an incoming call is of a first type (e.g., calls incompatible with the electronic device including one or more types of audio calls, such as FaceTime audio calls, and/or one or more types of video calls, such as FaceTime video calls). In accordance with a determination that a call is of the first type, the electronic device displays a first affordance (e.g., affordance 1120 of FIG. 11A) that, when activated, causes the call to be placed on hold (e.g., display "answer on phone" affordance causing call to be answered and automatically placed on hold). In accordance with a determination that the incoming call is not of the first type, the electronic device displays a second affordance that, when activated, causes the incoming call to be answered (e.g., and not automatically placed on hold).

In some embodiments, in accordance with a determination that the incoming call is of the first type (e.g., the call is incompatible), the electronic device forgoes displaying the second affordance (e.g., does not display "answer on electronic device" affordance), and in accordance with a determination that the incoming call is not of the particular type, the electronic device forgoes displaying the first affordance (e.g., does not display "answer" affordance).

While displaying the first affordance, the electronic device can detect a user input activating the first affordance (e.g., the user performs a light press at a location of the hold affordance). In response to detecting the user input activating the first affordance, the electronic device displays a third affordance and a fourth affordance (e.g., the user performs a light press at a location of the hold affordance and a new screen having "find my phone" and "end-call" affordances is displayed). The third affordance, when activated, causes a cellular phone in wireless communication with the electronic device to provide at least one of an audible output, a visual output, or a haptic output, and the fourth affordance, when activated, causes the call to be ended.

4. Exemplary Processes

Figure 12:
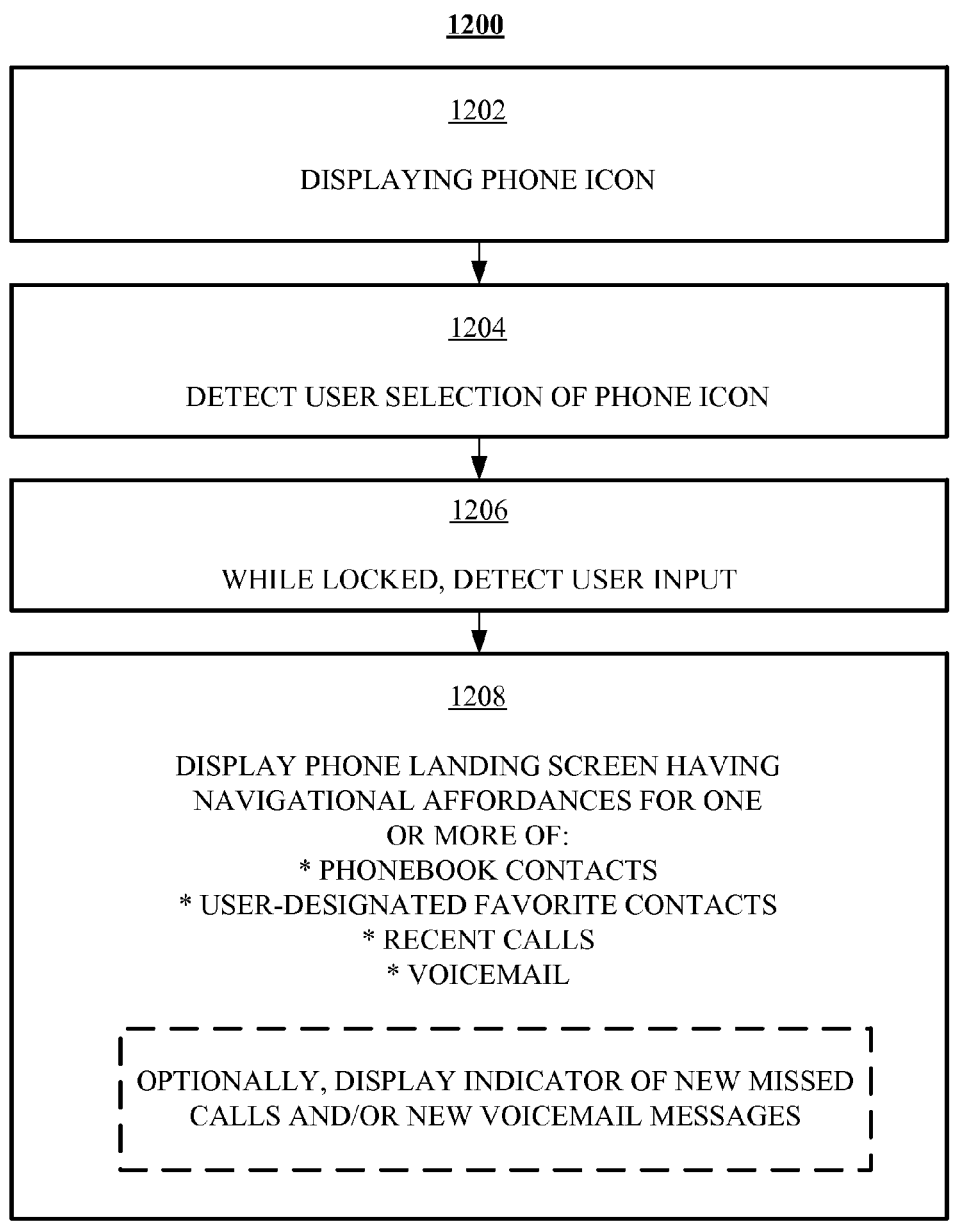
FIG. 12 is a flow diagram illustrating a process for accessing phone features in accordance with some embodiments.

FIG. 12 is a flow diagram illustrating process 1200 for handling phone calls. Process 1200 may be carried out by electronic devices such as devices 100, 300, and/or 500 (FIGS. 1A, 3A, 5A) in various embodiments. At block 1202, a phone icon is displayed. The phone icon may be among a plurality of other icons for launching applications. At block 1204, user selection of the phone icon is detected. Processing proceeds to block 1206, where in response to the user selection, a phone landing screen is displayed. The phone landing screen is screen 610 (FIG. 6A) in some embodiments. The phone landing screen may have one or more affordances for accessing features such as phonebook contacts, user-designated favorite contacts, recent incoming and/or outgoing calls, and voicemail messages. Phone contacts are displayed responsive to a user selection of the contact or user-designated favorites affordance. Optionally, the recent calls affordance and the voicemail affordance may have a numeral that is displayed when there are new missed calls and voicemail messages. In some embodiments the phone landing screen is responsive to input from a rotatable input mechanism.

FIG. 13 is a flow diagram illustrating process 1300 for handling phone calls between devices. Process 1300 may be carried out by electronic devices such as devices 100, 300, and/or 500 (FIGS. 1A, 3A, 5A) in various embodiments. At block 1302, a first communication status between a phone headset and the electronic device is determined. This first communication status indicates whether the phone headset is operatively connected to the electronic device. At block 1304, a second communication status is determined. This second communication indicates whether the phone headset and the cellular phone are operatively connected. At block 1306, an indication of at least one of the first and second statutes is displayed. In some embodiments this status is indicator 611 (FIG. 6A). In some embodiments this status is indicator is indicator 714 (FIG. 7B). In some embodiments, this status indicator is indicator 733 (FIG. 7B). In some embodiments, this status indicator is indicator 744 (FIG. 7C). In some embodiments, processing after block 1306 proceeds to block 1308 where a third communication status is determined. The third communication status indicates whether the electronic device is operatively connected to the cellular phone. This third status is displayed in some embodiments as part of affordance 714 (FIG. 7B), affordance 813 (FIG. 8B) and/or affordance 914 (FIG. 9B), for example. The first, second, and/or third communication statuses may be used to control the handling of phone call operations between multiple electronic devices under the scenarios summarized in table 1 and described with respect to FIGS. 7A-7E, 8A-8E, and 9A-B.

Figure 14:
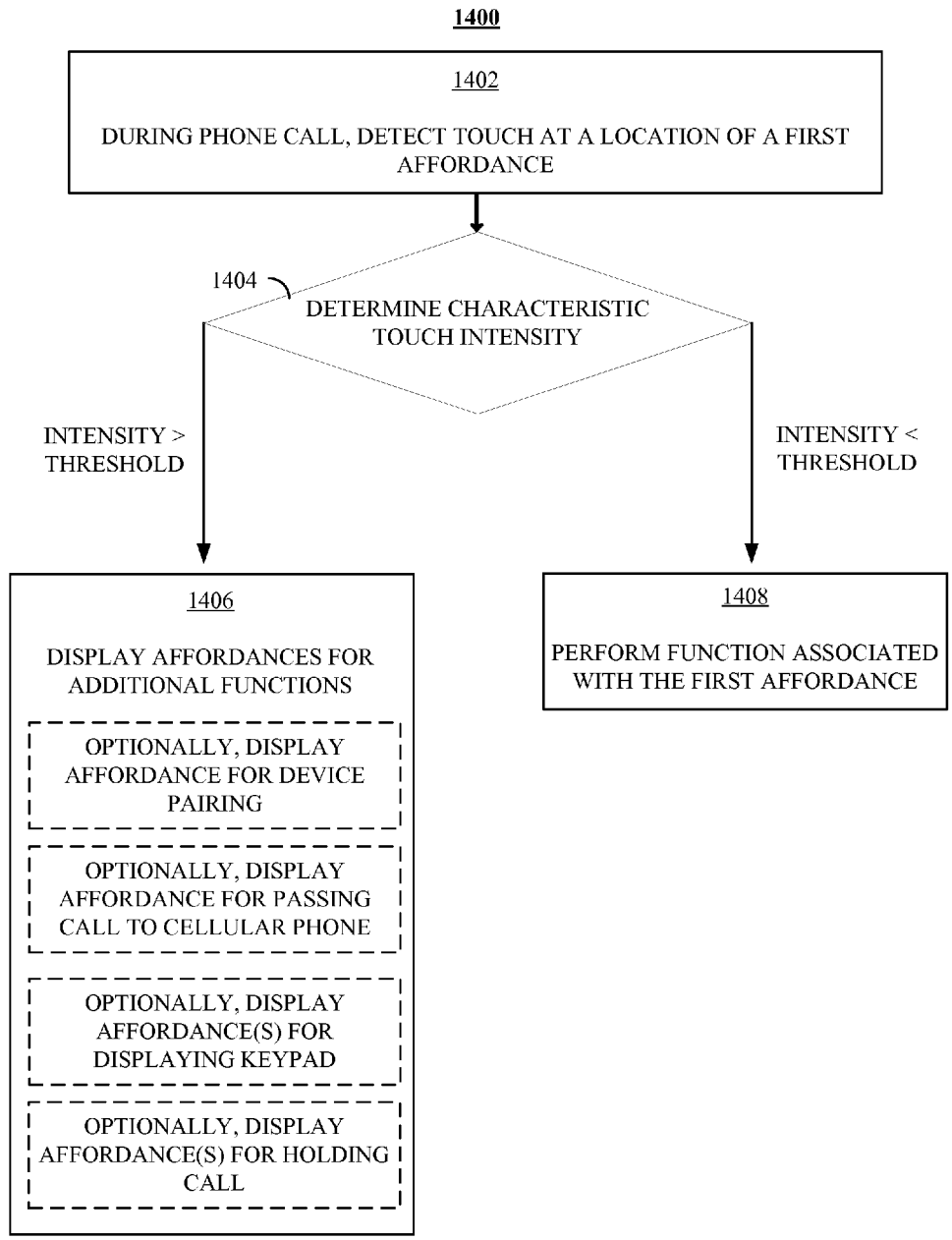
FIG. 14 is a flow diagram illustrating a process for accessing phone features in accordance with some embodiments.

FIG. 14 is a flow diagram illustrating process 1400 for handling phone calls between devices. Process 1400 may be carried out by electronic devices such as devices 100, 300, and/or 500 (FIGS. 1A, 3A, 5A) in various embodiments. At block 1402, during an active phone call, a touch on the touch-sensitive display is detected as having a characteristic intensity. The touch may be located at the position of a first affordance. As used herein, "active" phone calls includes calls being made (where the recipient has not answered), incoming calls (where the user of the electronic device has not answered), and in-progress calls (where the user of the electronic device and at least one other party is connected). At block 1404, the device determines whether the characteristic intensity exceeds a predetermined threshold intensity. If the characteristic intensity exceeds a predetermined threshold intensity, processing proceeds to block 1406 where the electronic device sends an instruction to a cellular phone instructing the cellular phone to display a second affordance. Optionally, the electronic device may display a secondary functions screen such as 1020 (FIG. 10B), and wait for an optional user input such as a selection of affordance 1024 (FIG. 10B), before sending the instruction. The second affordance, if selected, causes the cellular phone to retrieve the active phone call, and to utilize its microphone and speaker to carry on the call. If the characteristic intensity is below the predetermined threshold intensity, processing proceeds to block 1408, where the electronic device performs a function associated with the first affordance at the location of the lower intensity touch.

FIG. 15 is a flow diagram illustrating process 1500 for handling phone calls between devices. Process 1500 may be carried out by electronic devices such as devices 100, 300, and/or 500 (FIGS. 1A, 3A, 5A) in various embodiments. At block 1502, displaying, on the touch-sensitive display of an electronic device, an indication of an incoming call that is being received on a cellular phone that is within communications range of the electronic device. At block 1504, the electronic device displays at least an affordance for answering the call and an affordance for declining call. At block 1506, the electronic device receives user input other than a selection of the accept and decline affordances, which causes the electronic device to, at block 1508, display an affordance for passing the call to the cellular phone by placing the call on hold and by sending an instruction to the cellular phone instructing the cellular phone to display a second answer affordance, where the second answer affordance, when selected, causes the cellular phone to answer the incoming call. In some embodiments, the user input other than the selection of the accept and decline affordances is an upward swipe.

Figure 16:
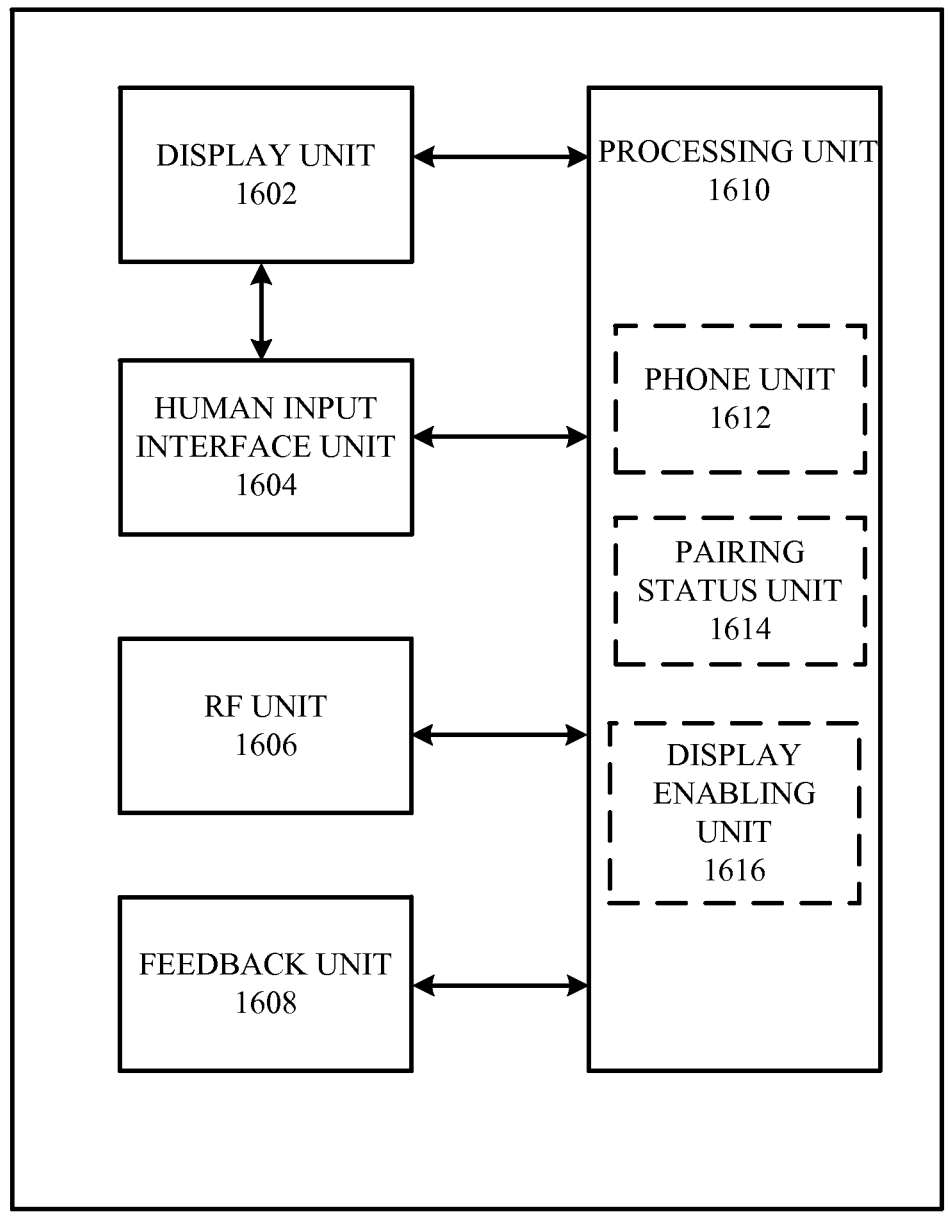
FIG. 16 is a functional block diagram of an electronic device in accordance with some embodiments.

FIG. 16 shows exemplary functional blocks of an electronic device 1600 that, in some embodiments, performs the above-described features. As shown in FIG. 16, an electronic device 1600 may include display unit 1602 configured to display graphical objects; human input interface unit 1604 configured to receive user input; one or more RF units 1606 configured to detect and communicate with external electronic devices; one or more feedback unit configured to provide user with haptic, audio, and/or visual feedback; and processing unit 1610 coupled to display unit 1602, human input interface unit 1604, RF unit(s) 1606, and feedback unit 1608. In some embodiments, processing unit 1612 is configured to support a phone unit 1612, a pairing status unit 1614, and a display enabling unit 1616.

In some embodiments, display enabling unit 1616 is configured to cause a display of a user interface (or portions of a user interface) in conjunction with the display unit 1602. For example, the display enabling unit 1616 may be used for display one or more of the user interface screens described with reference to FIGS. 6A-6H.

In some embodiments, pairing status unit 1614 is configured to determine the connection status between (i) a wearable electronic device and a headset; (ii) a wearable electronic device and a cellular phone, and/or (iii) a cellular phone and a headset. This status information is provided to display enabling unit 1616 so that display unit 1602 can display one or more of the status. This status information is also provided to phone unit 1612 so that phone unit 1612 can handle incoming and outgoing calls appropriate as discussed, for example, with reference to FIGS. 7A-7E, 8A-8E, 9A-B, 10A-10C, and/or 11A-11B.

In some embodiments, phone unit 1612 is configured to receive information from, among others, pairing status unit 1614 to determine what devices are to be used to carry on a call. For example, when pairing status unit 1614 determines that a headset is operatively connected to a cellular phone that is in turn operatively connected to device 1600, upon answering the call, phone unit 1612 may cause the headset to be used for carrying on the call. As another example, when pairing status unit 1614 determines that a headset is operatively connected to device 1600, but a cellular phone is not operatively connected to device 1600, phone unit 1612 may present a subset of phone functions for operation on device 1600.

The units of FIG. 16 may be used to implement the various techniques and methods described above with respect to FIGS. 6-15. The units of device 1600 are, optionally, implemented by hardware, software, or a combination of hardware and software to carry out the principles of the various described examples. It is understood by persons of skill in the art that the functional blocks described in FIG. 16 are, optionally, combined or separated into sub-blocks to implement the principles of the various described examples. Therefore, the description herein optionally supports any possible combination or separation or further definition of the functional blocks described herein.

Figure 17:
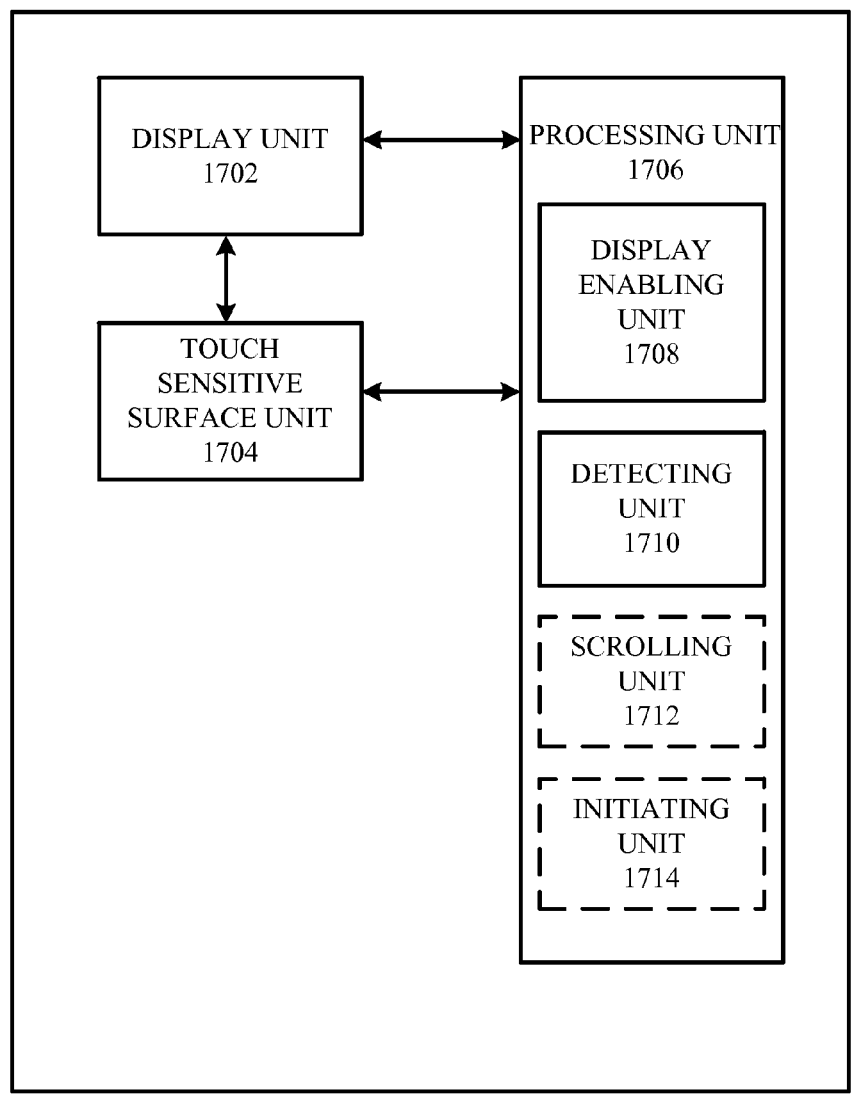
FIG. 17 is a functional block diagram of an electronic device in accordance with some embodiments.

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 includes a display unit 1702 configured to display a graphic user interface, a touch sensitive surface unit 1704 configured to receive contacts, and a processing unit 1706 coupled to the display unit 1702 and the touch-sensitive surface unit 1704. In some embodiments, the processing unit includes a display enabling unit 1708, a detecting unit 1710, a scrolling unit 1712, and an initiating unit 1714.

The processing unit 1706 is configured to enable display (e.g., with the display enabling unit 1708) of a phone icon; and detect (e.g., with the detecting unit 1710) user selection of the phone icon. The processing unit 1706 is further configured to, in response to the user selection, enable display (e.g., with the display enabling unit 1708) of at least two affordances comprising: a first affordance, wherein the first affordance, when selected, enables display of a plurality of phone contacts; and a second affordance, wherein the second affordance, when selected, enables display of a user-designed subset of the plurality of phone contacts. The processing unit is further configured to, while enabling display of the first and second affordances, detect (e.g., with the detecting unit 1710) user input comprising at least a selection of a displayed affordance; and in response to detecting the user input, enable display (e.g., with the display enabling unit 1708) of one or more phone contacts.

In some embodiments, the processing unit is further configured to, in response to the user selection, enable display (e.g., with the display enabling unit 1708) of a third affordance, wherein the third affordance when selected causes the electronic device to display a plurality of affordances representing voice mail messages.

In some embodiments, the processing unit is further configured to, in response to the user selection, enable display (e.g., with the display enabling unit 1708) of a fourth affordance, wherein the fourth affordance when selected causes the electronic device to display a plurality of recent calls.

In some embodiments, the second affordance includes, within its perimeter, an indication of a number of missed incoming calls.

In some embodiments, the fourth affordance includes, within its perimeter, an indication of a number of new voicemail messages.

In some embodiments, detecting user input comprises detecting a user selection of the first affordance. The processing unit may further be configured to, in response to detecting the user selection of the first affordance, enable display (e.g., with the display enabling unit 1708) of a plurality of contact affordances representing a plurality of phone contacts.

In some embodiments, the electronic device has a rotatable input mechanism and the processing unit is further configured to detect (e.g., with the detecting unit 1710) user input representing movement of the rotatable input mechanism and scroll (e.g., with the scrolling unit 1712) the displayed plurality of contact affordances in accordance with the detected user input.

In some embodiments, a displayed contact affordance of the plurality of contact affordances includes a contact information affordance, and the processing unit is further configured to, in response to detecting a user selection of the contact information affordance, enable display (e.g., with the display enabling unit 1708) of a name and number associated with a phone contact represented by the displayed contact affordance, and a call affordance, where the call affordance, when selected, causes the processor to initiate a call to the phone contact.

In some embodiments, a displayed contact affordance of the plurality of contact affordances includes a contact information affordance, and the processing unit is further configured to, in response to detecting a user selection of the contact information affordance, enable display (e.g., with the display enabling unit 1708) of a name of a phone contact represented by the displayed contact affordance, and a video call affordance, where the video call affordance, when selected, causes the processing unit to initiate a video call to the phone contact.

In some embodiments, a displayed contact affordance of the plurality of contact affordances includes a contact information affordance, and the processing unit is further configured to, in response to detecting a user selection of the contact information affordance, enable display (e.g., with the display enabling unit 1708) of a name and an email address associated with a phone contact represented by the displayed contact affordance, and an email affordance, where the email affordance, when selected, causes the processor to initiate a draft email to the email address.

In some embodiments, a displayed contact affordance of the plurality of contact affordances includes a contact information affordance, and the processing unit is further configured to, in response to detecting a user selection of the contact information affordance, enable display (e.g., with the display enabling unit 1708) of a name associated with a phone contact represented by the displayed contact affordance, and a message affordance, where the message affordance, when selected, causes the processor to initiate a draft short message to the phone contact.

In some embodiments, a displayed contact affordance of the plurality of contact affordances includes a contact information affordance, and the processing unit is further configured to, in response to detecting a user selection of the contact information affordance, enable display (e.g., with the display enabling unit 1708) of a name associated with a phone contact represented by the displayed contact affordance, and a map affordance, wherein the map affordance, when selected, causes the processing unit to display a map of a location associated with the phone contact.

In some embodiments, the processing unit is further configured to, in response to detecting a user selection of the second affordance, enable display (e.g., with the display enabling unit 1708) of a plurality of recent calls affordances representing recently incoming and outgoing calls, where a recent call affordance of the plurality of recent calls affordance comprises an indication of the time of the call.

In some embodiments, the processing unit is further configured to, in response to detecting a user selection of the second affordance, enable display (e.g., with the display enabling unit 1708) of a plurality of recent calls affordances representing recently incoming and outgoing calls, wherein a recent call affordance of the plurality of recent calls affordance comprises an indication of the duration of the call.

In some embodiments, the processing unit is further configured to initiate (e.g., with the initiating unit 1714) a call to a displayed phone contact; and after initiating the call, enable display (e.g., with the display enabling unit 1708) of the phone icon in response to detecting user input, and detect (e.g., with the detecting unit 1710) a user selection of the displayed phone icon. The processing unit is further configured to, in response to detecting the user selection of the displayed phone icon, enable display (e.g., with the display enabling unit 1708) of an indication of the initiated call, and at least the first affordance.

In some embodiments, the indication comprises text indicating the called phone contact and a duration of the call.

In some embodiments, the processing unit is further configured to, in response to detecting a user selection of the indication, enable display (e.g., with the display enabling unit 1708) of an end-call affordance, where the end-call affordance, when selected, causes the electronic device to end the call.

In some embodiments, initiating the phone operation comprises sending an instruction to a cellular phone instructing the cellular phone to place a phone call.

In some embodiments, initiating the phone operation comprises obtaining a voicemail message and causing playback of the obtained voicemail message.

In some embodiments, the touch-sensitive surface unit comprises one or more sensors to detect the intensity of touches, and detecting user input comprising at least a selection of a displayed affordance includes detecting a touch on the touch-sensitive surface unit where the touch has a characteristic intensity and is located at the position of one of the displayed first or second affordances; determining whether the characteristic intensity exceeds a predetermined threshold intensity; in response to a determination that the characteristic intensity exceeds the predetermined threshold intensity, ceasing to enable display of the first and second affordances and enabling display of additional affordances representing additional phone-related operations; and in response to a determination that the characteristic intensity does not exceed the predetermined threshold intensity, performing a function associated with the first or second displayed affordance.

In some embodiments, enabling display of additional affordances comprises enabling display of a keypad affordance, where the keypad affordance, when selected, causes the processing unit to enable display of phone keypad.

In some embodiments, enabling display of additional affordances comprises enabling display of a pairing affordance, where the pairing affordance, when selected, causes the processing unit to detect (e.g., with the detecting unit 1710) a cellular phone within wireless communication range of the electronic device, wherein the cellular phone is configured to pair with the electronic device.

In some embodiments, the electronic device is a wearable electronic device.

The operations described above with reference to FIG. 12 are, optionally, implemented by components depicted in FIGS. 1A-1B or FIG. 17. For example, displaying operations 1202 and 1208 and detecting operations 1204 and 1206 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 18:
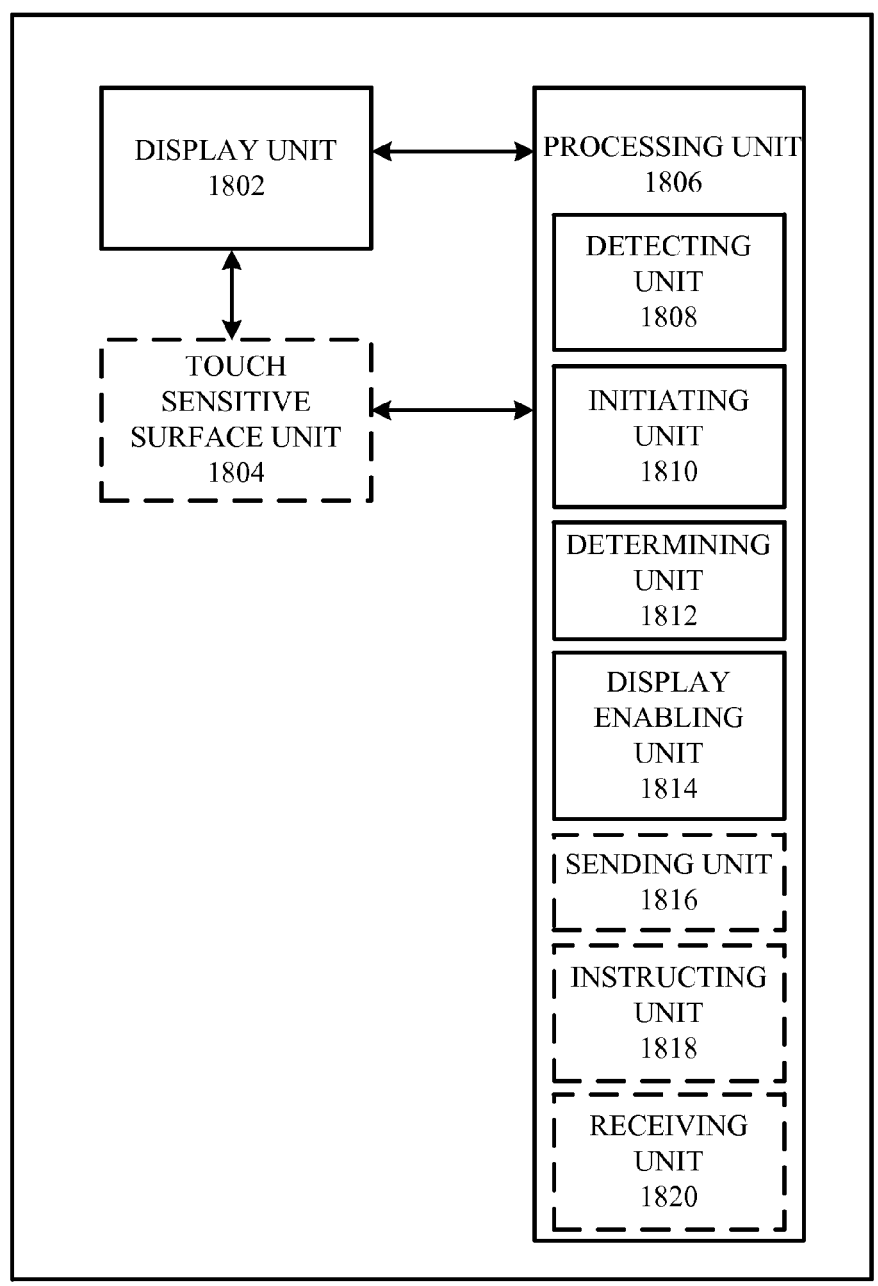
FIG. 18 is a functional block diagram of an electronic device in accordance with some embodiments.

In accordance with some embodiments, FIG. 18 shows a functional block diagram of an electronic device 1800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, an electronic device 1800 includes a display unit 1802 configured to display a graphic user interface, optionally, a touch sensitive surface unit 1804 configured to receive contacts, and a processing unit 1806 coupled to the display unit 1802 and optionally, the touch-sensitive surface unit 1804. In some embodiments, the processing unit includes a detecting unit 1808, an initiating unit 1810, a determining unit 1812, a display enabling unit 1814, a sending unit 1816, an instructing unit 1818, and a receiving unit 1820.

The processing unit is configured to detect (e.g., with the detecting unit 1808) a selection of a displayed affordance representing a phone contact; initiate (e.g., with the initiating unit 1810) a phone operation involving the phone contact; determine (e.g., with the determining unit 1812) a first communication status between a phone headset and the electronic device, where the first communication status indicates whether the phone headset is operatively connected to the electronic device; determine (e.g., with the determining unit 1812) a second communication status between the phone headset and a cellular phone, where the second communication status indicates whether the phone headset is operatively connected to the cellular phone; and enable display (e.g., with the display enabling unit 1814) of a headset indicator indicating at least one of the first communication status and the second communication status.

In some embodiments, the processing unit is further configured to, in accordance with a determination that the phone headset is not operatively connected with the cellular phone: enable display (e.g., with the display enabling unit 1814) of an indication that the cellular phone is not operatively connected to the phone headset, and send (e.g., with the sending unit 1816) an instruction instructing the cellular phone to display an indication of the phone contact and a call affordance, where the call affordance, when selected, causes the cellular phone to place a call to the phone contact.

In some embodiments, the processing unit is further configured to enable display (e.g., with the display enabling unit 1814) of an indication that the call will be placed after the cellular phone detects user input to place the call.

In some embodiments, the processing unit is further configured to enable display (e.g., with the display enabling unit 1814) of an end-call affordance, wherein the end-call affordance, when selected, causes the cellular phone to end the phone operation.

In some embodiments, the end-call affordance, when selected, causes the cellular phone to cease displaying the call affordance.

In some embodiments, in accordance with a determination that the cellular phone is operatively connected to the phone headset:

In some embodiments, the processing unit is further configured to enable display (e.g., with the display enabling unit 1814) of an indication that the cellular phone is operatively connected to the phone headset; and instruct (e.g., with the instructing unit 1818) the cellular phone to place a call to the phone contact, in response to detecting the selection of the displayed affordance representing the phone contact.

In some embodiments, the electronic device is operatively connected to the phone headset, the electronic device is not operatively connected to the cellular phone, and enabling display of the headset indicator comprises enabling display of an indication that the electronic device is operatively connected to the phone headset, and initiating the phone operation comprises obtaining a voicemail message and playing the obtained voicemail message on the connected headset.

In some embodiments, the processing unit is further configured to enable display (e.g., with the display enabling unit 1814) of a plurality of voicemail affordances representing a plurality of voicemail messages; and detect (e.g., with the detecting unit 1808) a selection of a displayed voicemail affordance, where obtaining the voicemail message comprises obtaining the voicemail message corresponding to the selected voicemail affordance.

In some embodiments, the processing unit is further configured to receive (e.g., with the receiving unit 1820) data representing an incoming call; detect (e.g., with the detecting unit 1808) user acceptance of the incoming call; in accordance with a determination that the electronic device is operatively connected to the phone headset and the electronic device is not operatively connected to the cellular phone, enable display (e.g., with the display enabling unit 1814) of an indication that the electronic device is operatively connected to the phone headset; detect (e.g., with the detecting unit 1808) a presence of the cellular phone via wireless communication; and in response to detecting the cellular phone, send (e.g., with the sending unit 1816) an instruction to the cellular phone instructing the cellular phone to display an accept affordance, wherein the accept affordance, when selected, causes the cellular phone to accept the incoming call.

In some embodiments, initiating the phone operation comprises: causing playback of an audio message to a caller of the incoming call.

In some embodiments, the audio message informs the caller to wait.

In some embodiments, the processing unit is further configured to enable display (e.g., with the display enabling unit 1814) of an end-call affordance, wherein the end-call affordance, when selected, ends the phone operation.

In some embodiments, the electronic device is a wearable electronic device.

The operations described above with reference to FIG. 13 are, optionally, implemented by components depicted in FIGS. 1A-1B or FIG. 18. For example, determining operations 1302, 1304, displaying operation 1306, and optionally, determining operation 1308 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application Similarly, it would be clear to a person having ordinary skill in the art how other processes can be implemented based on the components depicted in FIGS. 1A-1B.

Figure 19:
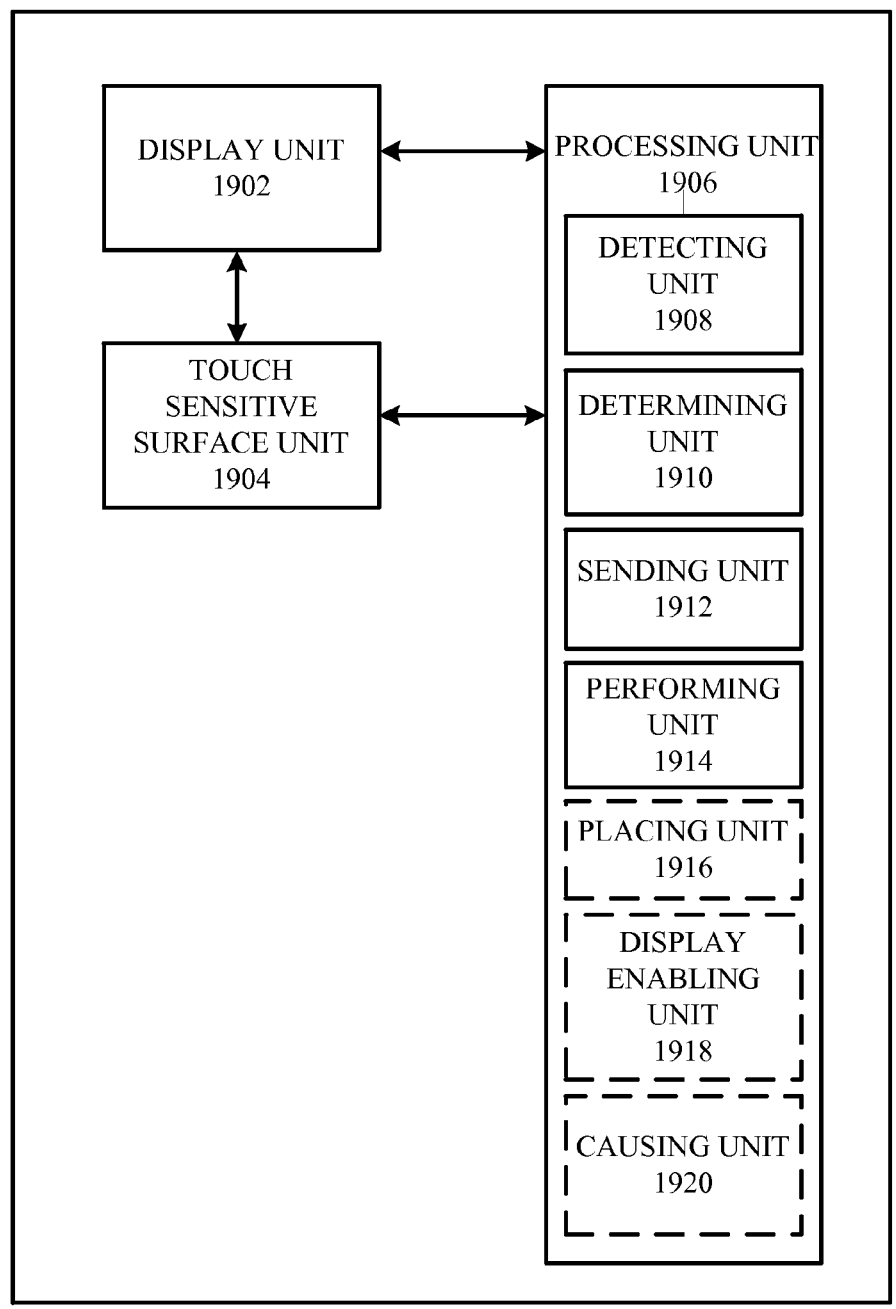
FIG. 19 is a functional block diagram of an electronic device in accordance with some embodiments.

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 includes a display unit 1902 configured to display a graphic user interface, a touch sensitive surface unit 1904 configured to receive contacts, and a processing unit 1906 coupled to the display unit 1902 and the touch-sensitive surface unit 1904. In some embodiments, the processing unit includes a detecting unit 1908, a determining unit 1910, a sending unit 1912, a performing unit 1914, a placing unit 1916, a display enabling unit 1918, and a causing unit 1920.

The processing unit 1906 is configured to, during an active phone call, detect (e.g., with the detecting unit 1908) a touch on the touch-sensitive surface unit, where the touch has a characteristic intensity and is located at the position of a first affordance; determine (e.g., with the determining unit 1910) whether the characteristic intensity exceeds a predetermined threshold intensity; in response to at least a determination that the characteristic intensity exceeds the predetermined threshold intensity, send (e.g., with the sending unit 1912) an instruction to a cellular phone instructing the cellular phone to display a second affordance, where the second affordance, when selected, causes the cellular phone to retrieve the active phone call; and in response to at least a determination that the characteristic intensity is below the predetermined threshold intensity, perform (e.g., with the performing unit 1914) a function associated with the first affordance.

In some embodiments, the processing unit is further configured to, in response to at least a determination that the characteristic intensity exceeds the predetermined threshold intensity, place (e.g., with the placing unit 1916) the active phone call on hold.

In some embodiments, the second affordance, when selected, causes a cellular phone having a speaker and a microphone to provide input into the active phone call using the microphone and to provide output from the call using the speaker.

In some embodiments, the processing unit is further configured to, after placing the active phone call on hold, enable display (e.g., with the display enabling unit 1918) of an un-hold affordance, where the un-hold affordance, when selected un-holds the held call and causes the processing unit to enable display of an end-call affordance, wherein the end-call affordance, when selected, ends the active phone call.

In some embodiments, the electronic device is operatively connected to a headset, and un-holding the held call comprises providing input into the call using the headset and providing output from the call using the headset.

In some embodiments, un-holding the held call comprises providing input into the call using a microphone of the electronic device and providing output from the call using a speaker of the electronic device.

In some embodiments, the processing unit is further configured to, after placing the call on hold, cause (e.g., with the causing unit 1920) playback of an audio message to a participant of the active phone call, the audio message informing the participant that the active phone call is on hold.

In some embodiments, the electronic device is a wearable electronic device.

The operations described above with reference to FIG. 14 are, optionally, implemented by components depicted in FIGS. 1A-1B or FIG. 19. For example, detecting operation 1402, determining operation 1404, display operation 1406, and performing operation 1408 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application Similarly, it would be clear to a person having ordinary skill in the art how other processes can be implemented based on the components depicted in FIGS. 1A-1B.

Figure 20:
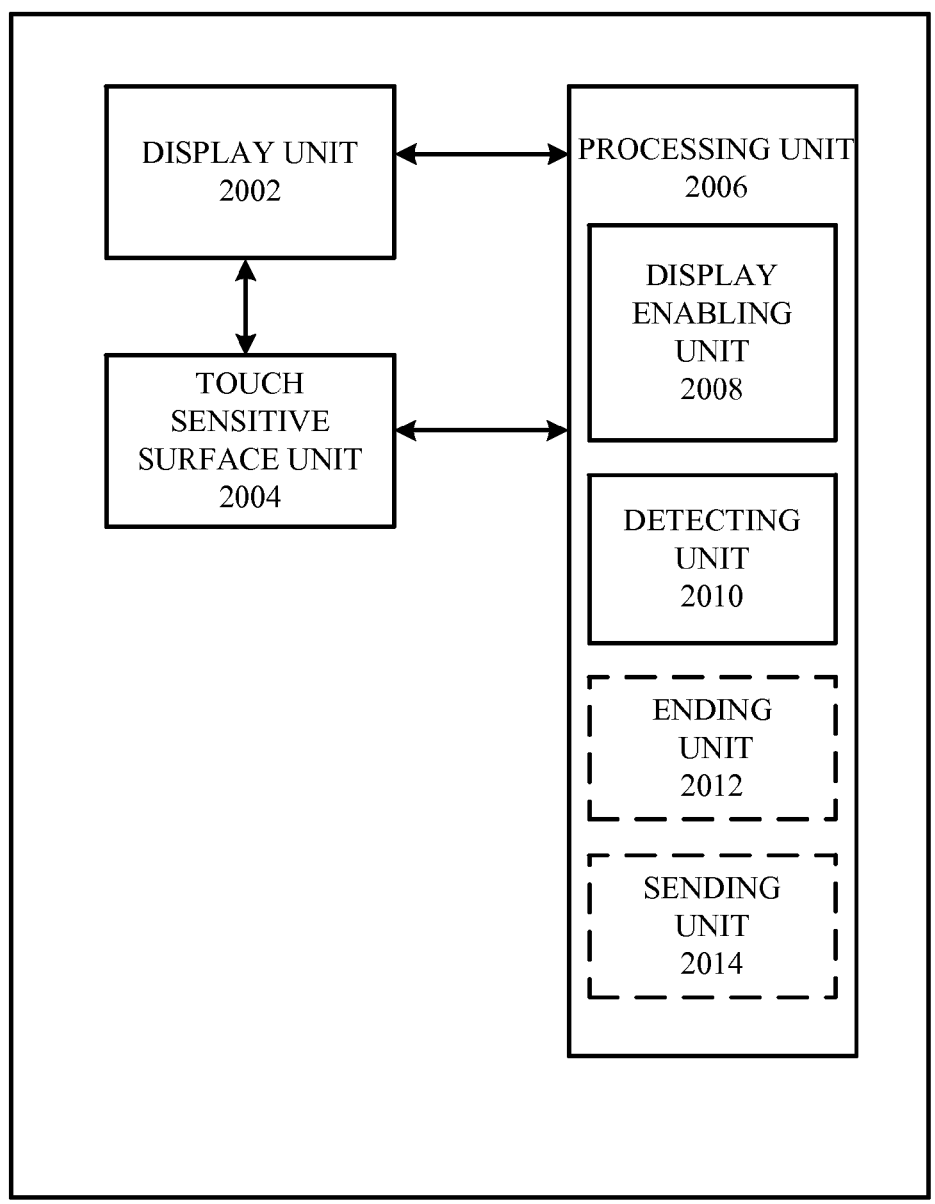
FIG. 20 is a functional block diagram of an electronic device in accordance with some embodiments.

In accordance with some embodiments, FIG. 20 shows a functional block diagram of an electronic device 2000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, an electronic device 2000 includes a display unit 2002 configured to display a graphic user interface, a touch sensitive surface unit 2004 configured to receive contacts, and a processing unit 2006 coupled to the display unit 2002 and the touch-sensitive surface unit 2004. In some embodiments, the processing unit includes a display enabling unit 2008, a detecting unit 2010, an ending unit 2012, and a sending unit 2014.

The processing unit 2006 is configured to enable display (e.g., with the display enabling unit 2008), on the display unit, of an indication of an incoming call; enable display (e.g., with the display enabling unit 2008) of a first answer affordance, where the first answer affordance, when selected, causes the incoming call to be answered; enable display (e.g., with the display enabling unit 2008) of a decline affordance, wherein the decline affordance, when selected, causes the incoming call to be ended; detect (e.g., with the detecting unit 2010) user input; in response to the detected user input, enable display (e.g., with the display enabling unit 2008) of an additional affordance, wherein the additional affordance, when selected, causes the processing unit to send an instruction to the cellular phone instructing the cellular phone to display a second answer affordance, where the second answer affordance, when selected, causes the cellular phone to answer the incoming call.

In some embodiments, causing the cellular phone to answer the incoming call comprises causing a speaker operatively connected to the cellular phone to provide input into the call, and causing a microphone operatively connected to the cellular phone to provide output from the call.

In some embodiments, the processing unit is further configured to, while enabling display of the first answer affordance and the end-call affordance, detect (e.g., with the detecting unit 2010) a swipe on the touch-sensitive surface unit; and in response to detecting the swipe, enable display of the additional affordance.

In some embodiments, detecting the swipe comprises detecting a touch on the touch-sensitive surface unit followed by a movement of the swipe in a substantially upward direction.

In some embodiments, the processing unit is further configured to enable display (e.g., with the display enabling unit 2008) of a message affordance; in response to detecting a selection of the message affordance, enable display (e.g., with the display enabling unit 2008) of a plurality of affordances representing predetermined responses to the caller; in response to detecting a selection of an affordance representing a predetermined response end (e.g., with the ending unit 2012) the call and send (e.g., with the sending unit 2014) the predetermined response to the caller as a message.

In some embodiments, detecting user input while enabling display of the indication of the incoming call comprises detecting a swipe in a direction and enabling display of the message affordance in response to the detected swipe.

In some embodiments, the direction is substantially in the up direction.

In some embodiments, the predetermined response is a text and the message is a text message.

In some embodiments, the predetermined response comprises an emoji character.

In some embodiments, the electronic device is a wearable electronic device.

The operations described above with reference to FIG. 15 are, optionally, implemented by components depicted in FIGS. 1A-1B or FIG. 20. For example, displaying operations 1502, 1504, and 1508 and receiving operation 1506 are, optionally, implemented by event sorter 170, event recognizer 180, and event handler 190. Event monitor 17 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 21:
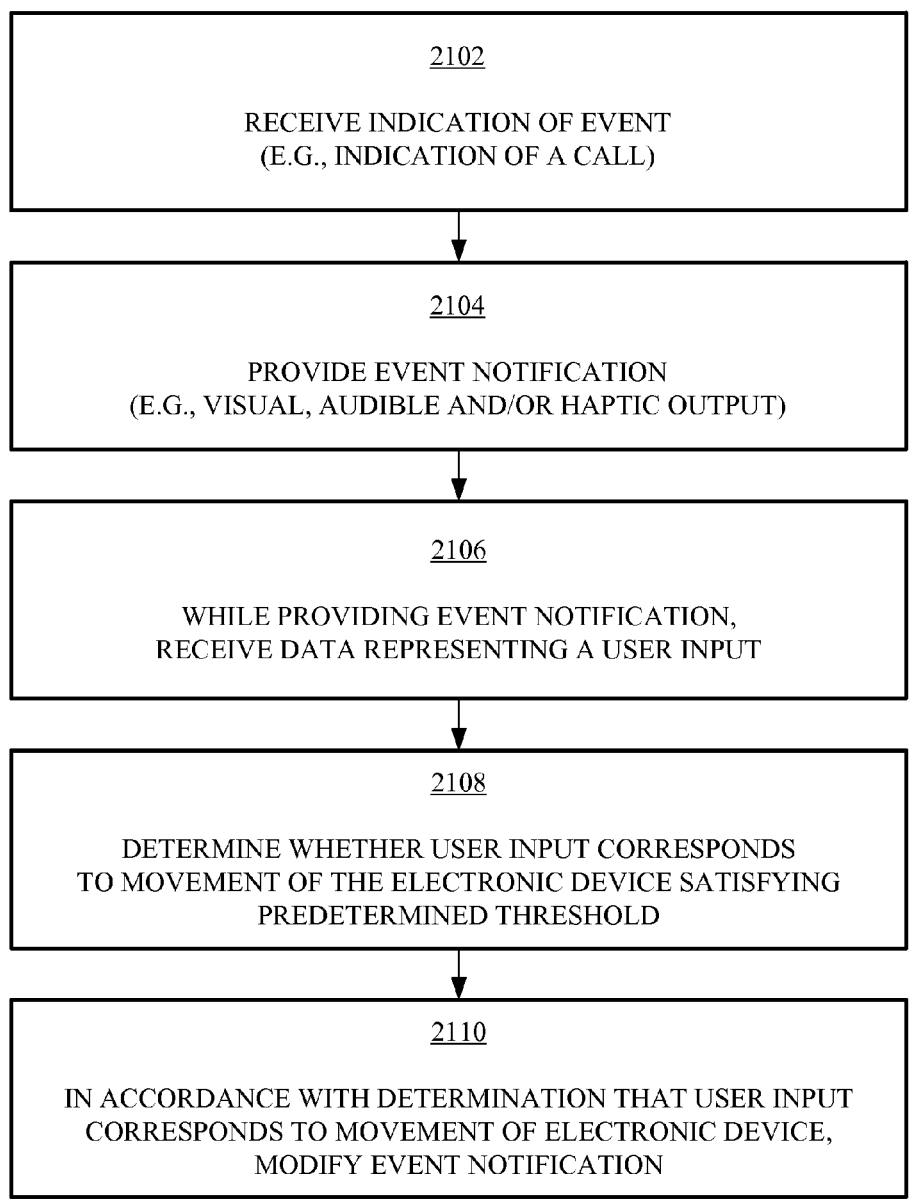
FIG. 21 is a flow diagram illustrating a process for modifying event notifications in accordance with some embodiments.

FIG. 21 is a flow diagram illustrating process 1200 for modifying event notifications. Process 2100 may be carried out by electronic devices such as devices 100, 300, and/or 500 (FIGS. 1A, 3A, 5A) in various embodiments. At block 2102, the electronic device may receive an indication of an event. The indication may be an indication of an incoming call and may be received from a cellular phone or another connected to an electronic device. At block 2104, in response to receiving the indication, the electronic device may provide an event notification. Providing an event notification may include providing an output (e.g., a visual output such as a flashing light or indication on a display, an audible output such as a ringtone, a haptic output such as vibration) to notify a user of an incoming call. At block 2106, while providing the event notification, the electronic device may receive data, from one or more motion sensors, representing a user input. The user input may correspond to a user physically raising a wrist. At block 2108, the electronic device may determine, based on the data representing the user input, whether the user input corresponds to movement of the electronic device satisfying predetermined condition. The predetermined condition may include a wrist raise, that the electronic device is moved to a particular position (e.g., rotated), activation of an input device such as a push button or a rotatable input device, or a touch on a touch-sensitive surface or display. At block 2110, in accordance with a determination that the user input corresponds to movement of the electronic device satisfying the predetermined condition (e.g., wrist raise), the electronic device may modify the event notification. Modifying the event notification may include varying, increasing, or decreasing (e.g., attenuating) visual intensity, haptic intensity, and/or a volume level of the notification, for instance, to a non-negative value including zero.

In some embodiments, in accordance with a determination that the user input does not correspond to movement of the electronic device satisfying the predetermined condition, the electronic device may forgo modification of the event notification.

In some embodiments, the electronic device wirelessly communicates with a cellular phone, and the indication of the event is an indication of a call received at the cellular phone.

In some embodiments, the predetermined condition is based on an amount of lifting of the electronic device during a time interval, the amount of lifting determined from an accelerometer of the electronic device, the predetermined condition is based on smoothness of a lifting of the electronic device during a time interval, the smoothness of the lifting determined from an accelerometer of the electronic device, and/or the predetermined condition comprises a minimum period of dwell time in a position in accordance with the lifting of the electronic device.

In some embodiments, in accordance with providing the event notification, the electronic device may provide the event notification while a display of the electronic device is inactive (e.g., display of electronic device is turned off).

In some embodiments, in accordance with modifying the event notification, the electronic device may activate the display of the electronic device. For example, the electronic device may activate a display of the electronic device in response to the predetermined condition being satisfied.

In some embodiments, in accordance with determining, based on the data representing the user input, whether the user input corresponds to movement of the electronic device satisfying a predetermined condition, the electronic device may determine whether the user input corresponds to activation an input device of the electronic device, and further in accordance with a determination that the user input corresponds to activation of the input device, may modify the event notification. By way of example, when determining whether the user input corresponds to movement of the electronic device, the electronic device can determine if a user input causes a display (or other input device) of the electronic device to be enabled, and in accordance with that determination, can modify/attenuate the notification.

In some embodiments, the electronic device may be configured to wirelessly communicate with a cellular phone, and in accordance with a determination that the user input corresponds to movement of the electronic device satisfying the predetermined condition, the electronic device may modify an event notification provided by the cellular phone. By way of example, in accordance with a determination that the user input corresponds to movement of the electronic device satisfying the predetermined threshold, the electronic device can modify a notification provided by an operatively and/or wirelessly connected cellular phone.

Figure 22:
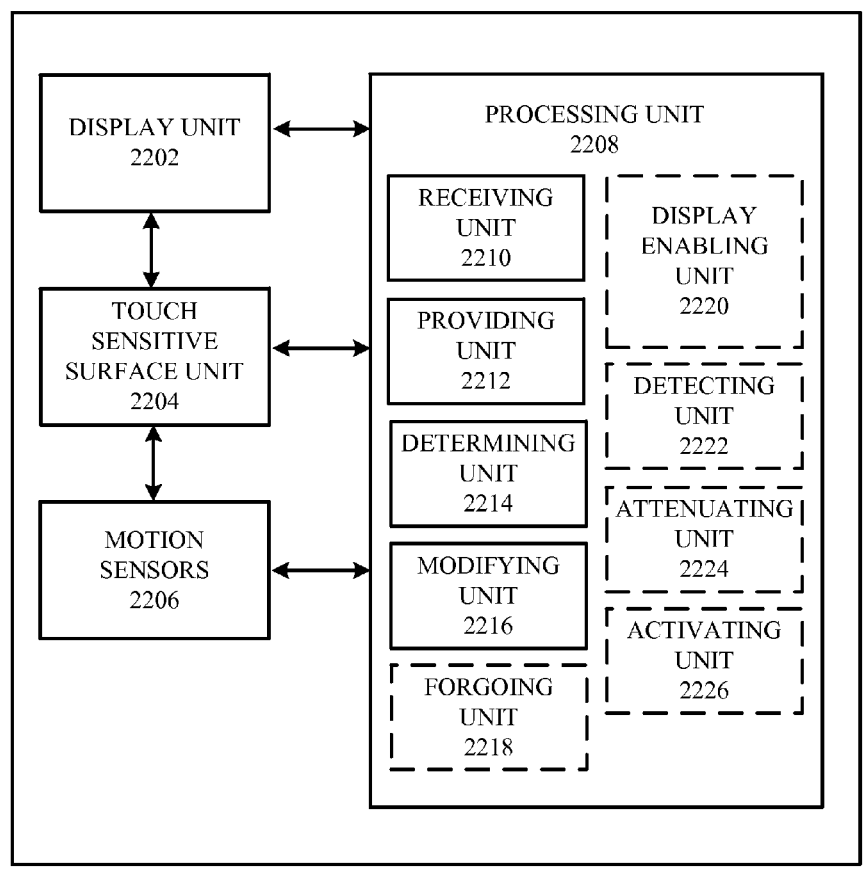
FIG. 22 is a functional block diagram of an electronic device in accordance with some embodiments.

In accordance with some embodiments, FIG. 22 shows a functional block diagram of an electronic device 2100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 22 are, optionally, combined or separated into sub-blocks to implement the principles of the various described embodiments. Therefore, the description herein optionally supports any possible combination or separation or further definition of the functional blocks described herein.

As shown in FIG. 22, an electronic device 2200 includes a display unit 2202 configured to display a graphic user interface, a touch sensitive surface unit 2204 configured to receive contacts, one or more motion sensors 2204, and a processing unit 2208 coupled to the display unit 2202, the touch-sensitive surface unit 2204, and the one or more motion sensors 2206. In some embodiments, the processing unit includes a receiving unit 2210, a providing unit 2212, a determining unit 2214, a modifying unit 2216, a forgoing unit 2218, display enabling unit 2220, a detecting unit 2222, an attenuating unit 2224, and an activating unit 2226.

The processing unit 2208 is configured to receive (e.g., with the receiving unit 2210) an indication of an event; in response to receiving the indication, provide (e.g., with the providing unit 2212) an event notification; while providing the event notification, receive (e.g., with the receiving unit 2210) data, from the one or more motion sensors 2206, representing a user input; determine (e.g., with the determining unit 2214), based on the data representing the user input, whether the user input corresponds to movement of the electronic device satisfying a predetermined condition; in accordance with a determination that the user input corresponds to movement of the electronic device satisfying the predetermined condition, modify (e.g., with the modifying unit 2216) the event notification.

In some embodiments, the processing unit 2208 is further configured to, in accordance with a determination that the user input does not correspond to movement of the electronic device satisfying the predetermined condition, forgo (e.g., with the forgoing unit 2218) modification of the event notification.

In some embodiments, the electronic device is configured to wirelessly communicate with a cellular phone, and the indication of the event is an indication of a call received at the cellular phone.

In some embodiments, the processing unit 2208 is further configured to determine (e.g., with the determining unit 2214) whether the call is a call of a first type; and in accordance with the determination that the call is of the first type, enable display (e.g., with the display enabling unit 2220) of a first affordance, where the first affordance, when activated, causes the call to be placed on hold.

In some embodiments, the processing unit 2208 is further configured to determine (e.g., with the determining unit 2214) whether the call is a call of a first type and in accordance with the determination that the call is not of the first type, enable display (e.g., with the display enabling unit 2220) of a second affordance, wherein the second affordance, when activated, causes the call to be answered.

In some embodiments, the processing unit 2208 is further configured to, in accordance with the determination that the call is of the first type, forgo (e.g., with the forgoing unit 2216) displaying the second affordance.

In some embodiments, the processing unit 2208 is further configured to, while displaying the first affordance, detect (e.g., with the detecting unit 2222) a second user input activating the first affordance; and in response to detecting the second user input activating the first affordance, enable display (e.g., with the display enabling unit 2220) of a third affordance and a fourth affordance, wherein the third affordance, when activated, causes a cellular phone in wireless communication with the electronic device to provide at least one of an audible output, a visual output, or a haptic output and wherein the fourth affordance, when activated, causes the call to be ended.

In some embodiments, the predetermined condition is based on an amount of lifting of the electronic device during a time interval, the amount of lifting determined from an accelerometer of the electronic device.

In some embodiments, the predetermined condition is based on smoothness of a lifting of the electronic device during a time interval, the smoothness of the lifting determined from an accelerometer of the electronic device.

In some embodiments, the predetermined condition comprises a minimum period of dwell time in a position in accordance with the lifting of the electronic device.

In some embodiments, the event notification is an audible notification.

In some embodiments, the processing unit 2208 is further configured to, in accordance with modifying the event notification, attenuate (e.g., with the attenuating unit 2224) a volume level of the audible notification.

In some embodiments, the event notification is a haptic notification.

In some embodiments, the processing unit 2208 is further configured to in accordance with modifying the event notification, attenuate (e.g., with the attenuating unit 2224) motion of the haptic notification.

In some embodiments, the event notification is a visual notification.

In some embodiments, the processing unit 2208 is further configured to in accordance with modifying the event notification, attenuate (e.g., with the attenuating unit 2224) an intensity of the visual notification.

In some embodiments, the processing unit 2208 is further configured to in accordance with providing the event notification, provide (e.g., with the providing unit 2212) the event notification while a display of the electronic device is inactive.

In some embodiments, the processing unit 2208 is further configured to, in accordance with modifying the event notification, activate (e.g., with the activating unit 2226) the display of the electronic device.

In some embodiments, the processing unit 2208 is further configured to, in accordance with determining, based on the data representing the user input, whether the user input corresponds to movement of the electronic device satisfying a predetermined condition, determine (e.g., with the determining unit 2214) whether the user input corresponds to activation an input device of the electronic device; and in accordance with a determination that the user input corresponds to activation of the input device, modify (e.g., with the modifying unit 2216) the event notification.

In some embodiments, the electronic device is configured to wirelessly communicate with a cellular phone, the processing unit 2208 further configured to, in accordance with a determination that the user input corresponds to movement of the electronic device satisfying the predetermined condition, modify (e.g., with the modifying unit 2216) an event notification provided by the cellular phone.

The operations described above with reference to FIG. 21 are, optionally, implemented by components depicted in FIGS. 1A-1B or FIG. 22. For example, receiving operations 2102 and 2106, providing operation 2104, determining operation 2108, and modifying operation 2110 are, optionally, implemented by event sorter 170, event recognizer 180, and event handler 190. Event monitor 17 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Figure 23A:
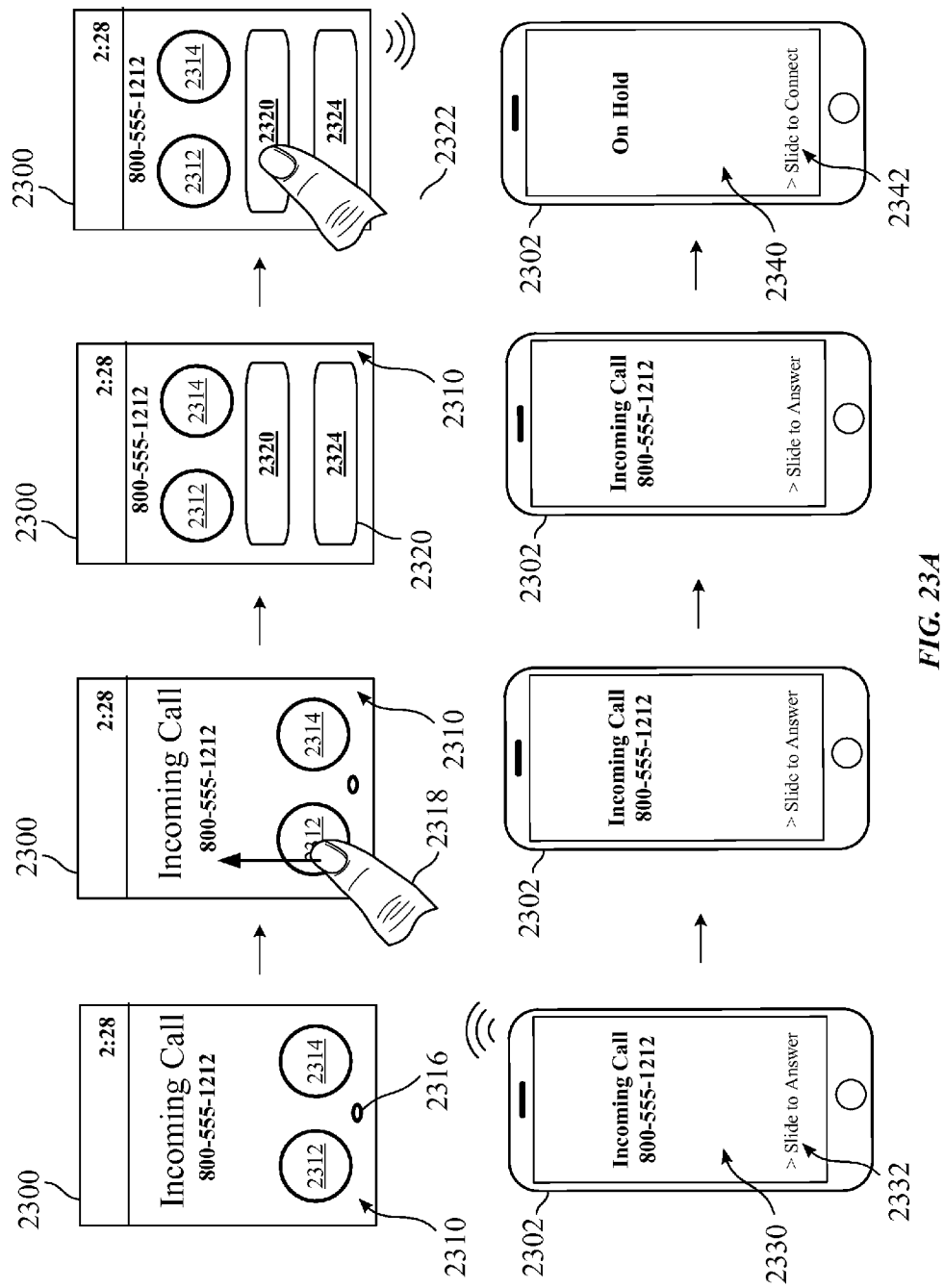
FIGS. 23A-23B illustrate exemplary user interfaces for accessing phone features among multiple devices.
Figure 23B:
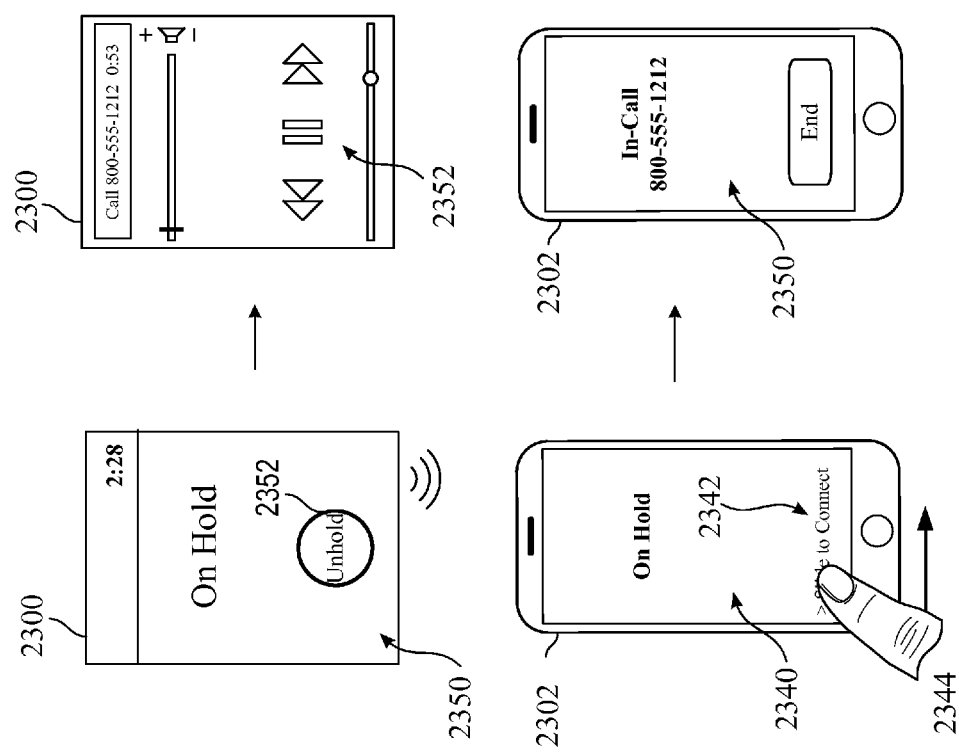

Additional exemplary user interfaces for transitioning between wearable electronic device and cellular phone usage are discussed with reference to FIGS. 23A-B. As shown in FIG. 23A, cellular phone 2302 is receiving an incoming call and displays incoming-call screen 2330. Cellular phone 2302 is device 100 (FIG. 1A) in some embodiments. Wearable electronic device 2300 receives an indication of the incoming call from cellular phone 2302 and also displays incoming-call screen 2310. Wearable electronic device 2300 is device 500 (FIG. 5A) in some embodiments. Optionally, wearable electronic device 2300 may issue a haptic or audio alert informing the user of the incoming call.

Incoming-call screen includes affordance 2312 for answering the call. Consistent with the discussion above regarding usage scenarios, if affordance 2312 is selected to answer the incoming call while cellular phone 2302 is operatively connected to a headset, the headset will be used for carrying on the call. A user may wish, however, to participate on the call using another device, such as by using the internal speaker and microphone of cellular phone 2302.

In this situation, while incoming-call screen 2310 is displayed on wearable electronic device 2300, the user may provide swipe input 2318 to reveal affordance 2320. Affordance 2320, when selected, causes the incoming call to be placed on hold so that the user can access cellular phone 2302 to answer the call. As shown in FIG. 23A and continuing onto FIG. 23B, in response to selection 2322 of affordance 2320, the incoming call is placed on hold, and cellular phone 2302 displays on-hold screen 2340 informing the user via instruction label 2342 that the phone call can be retrieved by certain user input, in this case a swipe input. In the illustrated example, incoming call screen 2310 has affordance 2316 indicating the availability of additional features that are not displayed, such as affordance 2312 for answering the call cellular phone 2302.

The user can retrieve the call on cellular phone 2302 by swipe input 2344, which causes cellular phone 2302 to un-hold the call and enable its speaker and microphone for participation in the call. As shown, responsive to swipe input 2344, device 2350 un-holds the phone call and transitions to in-call screen 2350. In the meantime, wearable electronic device 2300 returns to user interface screen 2352, in this case a music playback screen that was displayed prior to the incoming call. Note that, while call-holding screen 2350 is displayed on wearable electronic device 2300, the user may select un-hold affordance 2352 to continue with the call as before, meaning to continue using the headset for communication. Restated, the user may "pull back" the call even after selecting affordance 2320 (FIG. 23A) to pass the call to cellular phone 2302.

In addition to affordance 2320, incoming-call screen 2310 may include affordances for accessing other phone-related features. For example, with reference to FIG. 23A, the user may provide swipe input 2318 to reveal affordance 2324 in addition to affordance 2420. Affordance 2324, when selected, may allow a user may reply with a text message (e.g., using a messaging dialog box), instead of verbally answering the incoming call. By way of example, a user may for instance, indicate that the user is busy and cannot talk with the caller at the time of the call. In some instances, a user may also wish to send other messages such as those containing emoji. It will be appreciated by those in the art that a user may provide any message to the caller using one or more known formats and/or lengths. U.S. Provisional Patent Application Ser. No. 62/044,923, entitled "USER INTERFACE FOR RECEIVING USER INPUT," filed Sep. 2, 2014; and U.S. Provisional Patent Application Ser. No. 62/127,800, entitled "USER INTERFACE FOR RECEIVING USER INPUT," filed Mar. 3, 2015 describe user interfaces for efficiently obtaining user input that would be helpful in the context of incoming-calls screen 2310. Each of these applications which is hereby incorporated by reference in their entirety. For example, incoming-calls screen 2310 can provide access to affordances for ignoring an incoming call and sending a suggested response, such as "can I call you back?" to the caller. As another example, incoming-calls screen 2310 can provide access to affordances for selecting and customizing an emoji to be sent to the caller. As an additional example, incoming-calls screen 2310 can provide access to an interface for transcribing a user's speech utterance into a message for the caller. As yet another example, incoming-calls screen 2310 can provide access to a reduce-sized keyboard interface for inputting a message for the caller.

In some examples, a user may wish to learn and/or confirm the location of the cellular phone prior to or after selecting the affordance 2320. Accordingly, in some examples, the incoming call screen 2310, and/or one or more other screens displayed by the electronic device, may include additional affordances, such as an affordance directed to "pinging" the cellular phone. The pinging affordance, when selected, may cause the cellular phone to provide an audible, haptic, and/or visual output. An audible output, for example, can be a short, ringing sound for useful for attracting the user's attention. Once the output has been provided, the user may thereafter locate the phone based on the output. In some embodiments, the affordance to ping the phone is displayed in response selecting affordance 2320 to place the call on hold.

FIG. 24 is a flow diagram illustrating process 2400 for handling phone calls between devices. Process 2400 may be carried out by electronic devices such as devices 100, 300, and/or 500 (FIGS. 1A, 3A, 5A) in various embodiments. At block 2402, displaying, on the touch-sensitive display of an electronic device, is an indication of an incoming call. In some examples, the call is being received on a cellular phone that is within communications range of the electronic device. At block 2404, the electronic device displays at least an affordance for answering the call and at least one an affordance for declining call. At block 2406, the electronic device receives user input other than a selection of the accept and decline affordances. The user input causes the electronic device to, at block 2408, display an affordance for messaging the caller. In some embodiments, the user input other than the selection of the accept and decline affordances is an upward swipe.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer readable storage medium storing one or more programs, the one or more programs comprising instructions, which when executed by one or more processors of an electronic device with a display and having one or more motion sensors, cause the device to:
    receive an indication of an event;
    in response to receiving the indication, provide an event notification;
    while providing the event notification, receive data, from the one or more motion sensors, representing movement of the electronic device and;
    in response to detecting movement of the electronic device:
        in accordance with a determination that the movement of the electronic device corresponds to movement of the electronic device satisfying a predetermined condition, wherein the predetermined condition includes a requirement that the electronic device is lifted to a lifted position and then remains in the lifted position for at least a minimum period of dwell time in order for the predetermined condition to be met, maintain the even notification while modifying the event notification; and
        in accordance with a determination that the movement of the device does not correspond to movement of the electronic device satisfying the predetermined condition, maintain the event notification without modifying the event notification.

2. The non-transitory computer readable storage medium according to claim 1, wherein the electronic device is configured to wirelessly communicate with a cellular phone, and wherein the indication of the event is an indication of a call received at the cellular phone.

3. The non-transitory computer readable storage medium according to claim 1, wherein the predetermined condition is based on an amount of lifting of the electronic device during a time interval, the amount of lifting determined from an accelerometer of the electronic device.

4. The non-transitory computer readable storage medium according to claim 3, wherein the predetermined condition is based on smoothness of a lifting of the electronic device during a time interval, the smoothness of the lifting determined from an accelerometer of the electronic device.

5. The non-transitory computer readable storage medium according to claim 1, wherein the event notification is an audible notification.

6. The non-transitory computer readable storage medium according to claim 5, wherein modifying the event notification comprises attenuating a volume level of the audible notification.

7. The non-transitory computer readable storage medium according to claim 1, wherein the event notification is a haptic notification.

8. The non-transitory computer readable storage medium according to claim 7, wherein modifying the event notification comprises attenuating motion of the haptic notification.

9. The non-transitory computer readable storage medium according to claim 1, wherein the event notification is a visual notification.

10. The non-transitory computer readable storage medium according to claim 9, wherein modifying the event notification comprises attenuating an intensity of the visual notification.

11. The non-transitory computer readable storage medium according to claim 1, wherein the non-transitory computer-readable storage medium further comprises instructions, which when executed by the electronic device, cause the electronic device to:
    in accordance with providing the event notification, provide the event notification while a display of the electronic device is inactive.

12. The non-transitory computer readable storage medium according to claim 11, wherein the non-transitory computer-readable storage medium further comprises instructions, which when executed by the electronic device, cause the electronic device to:
    in accordance with maintaining the event notification while modifying the event notification, maintain the event notification while activating the display of the electronic device.

13. The non-transitory computer readable storage medium according to claim 1, wherein the non-transitory computer-readable storage medium further comprises instructions, which when executed by the electronic device, cause the electronic device to:
    in accordance with determining that the movement of the electronic device corresponds to movement of the electronic device satisfying the predetermined condition, determine whether the movement of the electronic device corresponds to activation of an input device of the electronic device; and
    in accordance with a determination that the user input corresponds to activation of the input device, maintain the event notification while modifying the event notification.

14. The non-transitory computer readable storage medium according to claim 1, wherein the electronic device is configured to wirelessly communicate with a cellular phone, and wherein the non-transitory computer-readable storage medium further comprises instructions, which when executed by the electronic device, cause the electronic device to:
    in accordance with a determination that the movement of the electronic device corresponds to movement of the electronic device satisfying the predetermined condition, modify an event notification provided by the cellular phone.

15. A method, comprising:
at an electronic device having one or more motion sensors:
receiving an indication of an event;
in response to receiving the indication, providing an event notification;
while providing the event notification, receiving data, from the one or more motion sensors, representing movement of the electronic device; and
in response to detecting movement of the electronic device:
in accordance with a determination that the movement of the electronic device corresponds to movement of the electronic device satisfying a predetermined condition, wherein the predetermined condition includes a requirement that the electronic device is lifted to a lifted position and then remains in the lifted position for at least a minimum period of dwell time in order for the predetermined condition to be met, maintaining the event notification while modifying the event notification; and
in accordance with a determination that the movement of the device does not correspond to movement of the electronic device satisfying the predetermined condition, maintaining the event notification without modifying the event notification.

16. An electronic device, comprising:
a display,
one or more processors;
one or more motion sensors
a memory; and
one or more programs, wherein the one or more programs are stored in the memory and configured to be executed by the one or more processors, the one or more programs including instructions for:
receiving an indication of an event;
in response to receiving the indication, providing an event notification;
while providing the event notification, receiving data, from the one or more motion sensors, representing movement of the electronic device; and
in response to detecting movement of the electronic device:
in accordance with a determination that the movement of the electronic device corresponds to movement of the electronic device satisfying a predetermined condition, wherein the predetermined condition includes a requirement that the electronic device is lifted to a lifted position and then remains in the lifted position for at least a minimum period of dwell time in order for the predetermined condition to be met, maintaining the event notification while modifying the event notification; and
in accordance with a determination that the movement of the device does not correspond to movement of the electronic device satisfying the predetermined condition, maintaining the event notification without modifying the event notification.

17. The non-transitory computer readable storage medium according to claim 1, wherein modifying the event notification comprises decreasing an intensity of the notification.

18. The non-transitory computer readable storage medium according to claim 3, wherein the non-transitory computer-readable storage medium further comprises instructions, which when executed by the electronic device, cause the electronic device to:
determine whether the call is a call of a first type;
in accordance with the determination that the call is of the first type, display a first affordance, wherein the first affordance, when activated, causes the call to be placed on hold.

19. The non-transitory computer readable storage medium according to claim 3, wherein the non-transitory computer-readable storage medium further comprises instructions, which when executed by the electronic device, cause the electronic device to:
determine whether the call is a call of a first type
in accordance with the determination that the call is not of the first type, display a second affordance, wherein the second affordance, when activated, causes the call to be answered.

20. The non-transitory computer readable storage medium according to claim 19, wherein the non-transitory computer-readable storage medium further comprises instructions, which when executed by the electronic device, cause the electronic device to:
in accordance with the determination that the call is of the first type, forgo displaying the second affordance.

21. The non-transitory computer readable storage medium according to claim 19, wherein the non-transitory computer-readable storage medium further comprises instructions, which when executed by the electronic device, cause the electronic device to:
while displaying the first affordance, detect a second user input activating the first affordance; and
in response to detecting the second user input activating the first affordance, display a third affordance and a fourth affordance, wherein the third affordance, when activated, causes a cellular phone in wireless communication with the electronic device to provide at least one of an audible output, a visual output, or a haptic output and wherein the fourth affordance, when activated, causes the call to be ended.

22. The method according to claim 15, wherein the electronic device is configured to wirelessly communicate with a cellular phone, and wherein the indication of the event is an indication of a call received at the cellular phone.

23. The method according to claim 22, further comprising:
determining whether the call is a call of a first type;
in accordance with the determination that the call is of the first type, displaying a first affordance, wherein the first affordance, when activated, causes the call to be placed on hold.

24. The method according to claim 22, further comprising:
determining whether the call is a call of a first type
in accordance with the determination that the call is not of the first type, displaying a second affordance, wherein the second affordance, when activated, causes the call to be answered.

25. The method according to claim 24, further comprising:
in accordance with the determination that the call is of the first type, forgoing displaying the second affordance.

26. The method according to claim 24, further comprising:
while displaying the first affordance, detecting a second user input activating the first affordance; and in response to detecting the second user input activating the first affordance, displaying a third affordance and a fourth affordance, wherein the third affordance, when activated, causes a cellular phone in wireless communication with the electronic device to provide at least one of an audible output, a visual output, or a haptic output and wherein the fourth affordance, when activated, causes the call to be ended.

27. The method according to claim 15, wherein the predetermined condition is based on an amount of lifting of the electronic device during a time interval, the amount of lifting determined from an accelerometer of the electronic device.

28. The method according to claim 27, wherein the predetermined condition is based on smoothness of a lifting of the electronic device during a time interval, the smoothness of the lifting determined from an accelerometer of the electronic device.

29. The method according to claim 15, wherein the event notification is an audible notification.

30. The method according to claim 29, wherein modifying the event notification comprises attenuating a volume level of the audible notification.

31. The method according to claim 15, wherein the event notification is a haptic notification.

32. The method according to claim 31, wherein modifying the event notification comprises attenuating motion of the haptic notification.

33. The method according to claim 15, wherein the event notification is a visual notification.

34. The method according to claim 33, wherein modifying the event notification comprises attenuating an intensity of the visual notification.

35. The method according to claim 15, further comprising:
in accordance with providing the event notification, providing the event notification while a display of the electronic device is inactive.

36. The method according to claim 35, further comprising:
in accordance with maintaining the event notification while modifying the event notification, maintaining the event notification while activating the display of the electronic device.

37. The method according to claim 15, further comprising:
in accordance with determining that the movement of the electronic device corresponds to movement of the electronic device satisfying the predetermined condition, determining whether the movement of the electronic device corresponds to activation of an input device of the electronic device; and
in accordance with a determination that the user input corresponds to activation of the input device, maintaining the event notification while modifying the event notification.

38. The method according to claim 15, wherein the electronic device is configured to wirelessly communicate with a cellular phone, the method further comprising:
in accordance with a determination that the movement of the electronic device corresponds to movement of the electronic device satisfying the predetermined condition, modifying an event notification provided by the cellular phone.

39. The method according to claim 15, wherein modifying the event notification comprises decreasing an intensity of the notification.

40. The electronic device according to claim 16, wherein the electronic device is configured to wirelessly communicate with a cellular phone, and wherein the indication of the event is an indication of a call received at the cellular phone.

41. The electronic device according to claim 40, the one or more programs further including instructions for:
determining whether the call is a call of a first type;
in accordance with the determination that the call is of the first type, displaying a first affordance, wherein the first affordance, when activated, causes the call to be placed on hold.

42. The electronic device according to claim 40, the one or more programs further including instructions for:
determining whether the call is a call of a first type;
in accordance with the determination that the call is not of the first type, displaying a second affordance, wherein the second affordance, when activated, causes the call to be answered.

43. The electronic device according to claim 42, the one or more programs further including instructions for:
in accordance with the determination that the call is of the first type, forgoing displaying the second affordance.

44. The electronic device according to claim 42, the one or more programs further including instructions for:
while displaying the first affordance, detecting a second user input activating the first affordance; and
in response to detecting the second user input activating the first affordance, displaying a third affordance and a fourth affordance, wherein the third affordance, when activated, causes a cellular phone in wireless communication with the electronic device to provide at least one of an audible output, a visual output, or a haptic output and wherein the fourth affordance, when activated, causes the call to be ended.

45. The electronic device according to claim 16, wherein the predetermined condition is based on an amount of lifting of the electronic device during a time interval, the amount of lifting determined from an accelerometer of the electronic device.

46. The electronic device according to claim 45, wherein the predetermined condition is based on smoothness of a lifting of the electronic device during a time interval, the smoothness of the lifting determined from an accelerometer of the electronic device.

47. The electronic device according to claim 16, wherein the event notification is an audible notification.

48. The electronic device according to claim 47, wherein modifying the event notification comprises attenuating a volume level of the audible notification.

49. The electronic device according to claim 16, wherein the event notification is a haptic notification.

50. The electronic device according to claim 49, wherein modifying the event notification comprises attenuating motion of the haptic notification.

51. The electronic device according to claim 16, wherein the event notification is a visual notification.

52. The electronic device according to claim 51, wherein modifying the event notification comprises attenuating an intensity of the visual notification.

53. The electronic device according to claim 16, the one or more programs further including instructions for:
in accordance with providing the event notification, providing the event notification while a display of the electronic device is inactive.

54. The electronic device according to claim 53, the one or more programs further including instructions for:

in accordance with maintaining the event notification while modifying the event notification, maintaining the event notification while activating the display of the electronic device.

55. The electronic device according to claim 16, the one or more programs further including instructions for:
in accordance with determining that the movement of the electronic device corresponds to movement of the electronic device satisfying the predetermined condition, determining whether the movement of the electronic device corresponds to activation of an input device of the electronic device; and
in accordance with a determination that the user input corresponds to activation of the input device, maintaining the event notification while modifying the event notification.

56. The electronic device according to claim 16, wherein the electronic device is configured to wirelessly communicate with a cellular phone, the electronic device the one or more programs further including instructions for:
in accordance with a determination that the movement of the electronic device corresponds to movement of the electronic device satisfying the predetermined condition, modifying an event notification provided by the cellular phone.

57. The electronic device according to claim 16, wherein modifying the event notification comprises decreasing an intensity of the notification.

* * * * *

UNITED STATES PATENT AND TRADEMARK OFFICE
CERTIFICATE OF CORRECTION

PATENT NO. : 10,015,298 B2  
APPLICATION NO. : 14/841623  
DATED : July 3, 2018  
INVENTOR(S) : Lawrence Y. Yang et al.

Page 1 of 1

It is certified that error appears in the above-identified patent and that said Letters Patent is hereby corrected as shown below:

On the Title Page

Item [72] Lines 4-5, after 'Stephen O. Lemay,' delete "San Francisco" and insert -- Palo Alto --.

In the Claims

Column 59, Claim 1, Line 35, delete "device and;" and insert -- device; and --.

Signed and Sealed this  
Thirtieth Day of October, 2018

Andrei Iancu  
*Director of the United States Patent and Trademark Office*